United States Patent
Rawlins et al.

(10) Patent No.: US 7,991,815 B2
(45) Date of Patent: Aug. 2, 2011

(54) METHODS, SYSTEMS, AND COMPUTER PROGRAM PRODUCTS FOR PARALLEL CORRELATION AND APPLICATIONS THEREOF

(75) Inventors: Gregory S. Rawlins, Heathrow, FL (US); Ray Kassel, Gaithersburg, MD (US)

(73) Assignee: ParkerVision, Inc., Jacksonville, FL (US)

( * ) Notice: Subject to any disclaimer, the term of this patent is extended or adjusted under 35 U.S.C. 154(b) by 861 days.

(21) Appl. No.: 12/010,425

(22) Filed: Jan. 24, 2008

(65) Prior Publication Data

US 2008/0294708 A1 Nov. 27, 2008

Related U.S. Application Data

(60) Division of application No. 10/719,058, filed on Nov. 24, 2003, now Pat. No. 7,454,453, which is a continuation-in-part of application No. 09/987,193, filed on Nov. 13, 2001, now Pat. No. 7,010,559.

(60) Provisional application No. 60/248,001, filed on Nov. 14, 2000.

(51) Int. Cl.
G06F 17/15 (2006.01)
(52) U.S. Cl. ........................................................ 708/425
(58) Field of Classification Search .................... None
See application file for complete search history.

(56) References Cited

U.S. PATENT DOCUMENTS

| | | | |
|---|---|---|---|
| 2,057,613 A | 10/1936 | Gardner | |
| 2,241,078 A | 5/1941 | Vreeland | |
| 2,270,385 A | 1/1942 | Skillman | |
| 2,283,575 A | 5/1942 | Roberts | |
| 2,358,152 A | 9/1944 | Earp | |
| 2,410,350 A | 10/1946 | Labin et al. | |
| 2,451,430 A | 10/1948 | Barone | |
| 2,462,069 A | 2/1949 | Chatterjea et al. | |
| 2,462,181 A | 2/1949 | Grosselfinger | |
| 2,472,798 A | 6/1949 | Fredendall | |
| 2,497,859 A | 2/1950 | Boughtwood et al. | |

(Continued)

FOREIGN PATENT DOCUMENTS

DE 1936252 1/1971

(Continued)

OTHER PUBLICATIONS

English-language Abstract of Japanese Patent Publication No. JP 7-169292, data supplied by ep.espacenet.com, 1 page (Jul. 4, 1995—Date of publication of application).

(Continued)

*Primary Examiner* — David H Malzahn

(74) *Attorney, Agent, or Firm* — Sterne Kessler Goldstein & Fox, P.L.L.C.

(57) ABSTRACT

A fast correlator transform (FCT) algorithm and methods and systems for implementing same, correlate an encoded data word $(X_0\text{-}X_{M-1})$ with encoding coefficients $(C_0\text{-}C_{M-1})$, wherein each of $(X_0\text{-}X_{M-1})$ is represented by one or more bits and each said coefficient is represented by one or more bits, wherein each coefficient has k possible states, and wherein M is greater than 1. Substantially the same hardware can be utilized for processing in-phase and quadrature phase components of the data word $(X_0\text{-}X_{M-1})$. The coefficients $(C_0\text{-}C_{M-1})$ can represent real numbers and/or complex numbers. The coefficients $(C_0\text{-}C_{M-1})$ can be represented with a single bit or with multiple bits (e.g., magnitude). The coefficients $(C_0\text{-}C_{M-1})$ represent, for example, a cyclic code keying ("CCK") code set substantially in accordance with IEEE 802.11 WLAN standard.

30 Claims, 30 Drawing Sheets

U.S. PATENT DOCUMENTS

| | | |
|---|---|---|
| 2,499,279 A | 2/1950 | Peterson |
| 2,530,824 A | 11/1950 | King |
| 2,802,208 A | 8/1957 | Hobbs |
| 2,985,875 A | 5/1961 | Grisdale et al. |
| 3,023,309 A | 2/1962 | Foulkes |
| 3,069,679 A | 12/1962 | Sweeney et al. |
| 3,104,393 A | 9/1963 | Vogelman |
| 3,114,106 A | 12/1963 | McManus |
| 3,118,117 A | 1/1964 | King et al. |
| 3,226,643 A | 12/1965 | McNair |
| 3,246,084 A | 4/1966 | Kryter |
| 3,258,694 A | 6/1966 | Shepherd |
| 3,383,598 A | 5/1968 | Sanders |
| 3,384,822 A | 5/1968 | Miyagi |
| 3,454,718 A | 7/1969 | Perreault |
| 3,523,291 A | 8/1970 | Pierret |
| 3,548,342 A | 12/1970 | Maxey |
| 3,555,428 A | 1/1971 | Perreault |
| 3,614,627 A | 10/1971 | Runyan et al. |
| 3,614,630 A | 10/1971 | Rorden |
| 3,617,892 A | 11/1971 | Hawley et al. |
| 3,617,898 A | 11/1971 | Janning, Jr. |
| 3,621,402 A | 11/1971 | Gardner |
| 3,622,885 A | 11/1971 | Kruszynski et al. |
| 3,623,160 A | 11/1971 | Giles et al. |
| 3,626,417 A | 12/1971 | Gilbert |
| 3,629,696 A | 12/1971 | Bartelink |
| 3,643,168 A | 2/1972 | Manicki |
| 3,662,268 A | 5/1972 | Gans et al. |
| 3,689,841 A | 9/1972 | Bello et al. |
| 3,694,754 A | 9/1972 | Baltzer |
| 3,702,440 A | 11/1972 | Moore |
| 3,714,577 A | 1/1973 | Hayes |
| 3,716,730 A | 2/1973 | Cerny, Jr. |
| 3,717,844 A | 2/1973 | Barret et al. |
| 3,719,903 A | 3/1973 | Goodson |
| 3,735,048 A | 5/1973 | Tomsa et al. |
| 3,736,513 A | 5/1973 | Wilson |
| 3,737,778 A | 6/1973 | Van Gerwen et al. |
| 3,739,282 A | 6/1973 | Bruch et al. |
| 3,740,636 A | 6/1973 | Hogrefe et al. |
| 3,764,921 A | 10/1973 | Huard |
| 3,767,984 A | 10/1973 | Shinoda et al. |
| 3,806,811 A | 4/1974 | Thompson |
| 3,809,821 A | 5/1974 | Melvin |
| 3,852,530 A | 12/1974 | Shen |
| 3,868,601 A | 2/1975 | MacAfee |
| 3,940,697 A | 2/1976 | Morgan |
| 3,949,300 A | 4/1976 | Sadler |
| 3,967,202 A | 6/1976 | Batz |
| 3,980,945 A | 9/1976 | Bickford |
| 3,987,280 A | 10/1976 | Bauer |
| 3,991,277 A | 11/1976 | Hirata |
| 4,003,002 A | 1/1977 | Snijders et al. |
| 4,004,237 A | 1/1977 | Kratzer |
| 4,013,966 A | 3/1977 | Campbell |
| 4,016,366 A | 4/1977 | Kurata |
| 4,017,798 A | 4/1977 | Gordy et al. |
| 4,019,140 A | 4/1977 | Swerdlow |
| 4,032,847 A | 6/1977 | Unkauf |
| 4,035,732 A | 7/1977 | Lohrmann |
| 4,045,740 A | 8/1977 | Baker |
| 4,047,121 A | 9/1977 | Campbell |
| 4,048,598 A | 9/1977 | Knight |
| 4,051,475 A | 9/1977 | Campbell |
| 4,066,841 A | 1/1978 | Young |
| 4,066,919 A | 1/1978 | Huntington |
| 4,080,573 A | 3/1978 | Howell |
| 4,081,748 A | 3/1978 | Batz |
| 4,115,737 A | 9/1978 | Hongu et al. |
| 4,130,765 A | 12/1978 | Arakelian et al. |
| 4,130,806 A | 12/1978 | Van Gerwen et al. |
| 4,132,952 A | 1/1979 | Hongu et al. |
| 4,142,155 A | 2/1979 | Adachi |
| 4,143,322 A | 3/1979 | Shimamura |
| 4,145,659 A | 3/1979 | Wolfram |
| 4,158,149 A | 6/1979 | Otofuji |
| 4,170,764 A | 10/1979 | Salz et al. |
| 4,173,164 A | 11/1979 | Adachi et al. |
| 4,204,171 A | 5/1980 | Sutphin, Jr. |
| 4,210,872 A | 7/1980 | Gregorian |
| 4,220,977 A | 9/1980 | Yamanaka |
| 4,241,451 A | 12/1980 | Maixner et al. |
| 4,245,355 A | 1/1981 | Pascoe et al. |
| 4,250,458 A | 2/1981 | Richmond et al. |
| 4,253,066 A | 2/1981 | Fisher et al. |
| 4,253,067 A | 2/1981 | Caples et al. |
| 4,253,069 A | 2/1981 | Nossek |
| 4,286,283 A | 8/1981 | Clemens |
| 4,308,614 A | 12/1981 | Fisher et al. |
| 4,313,222 A | 1/1982 | Katthän |
| 4,320,361 A | 3/1982 | Kikkert |
| 4,320,536 A | 3/1982 | Dietrich |
| 4,334,324 A | 6/1982 | Hoover |
| 4,346,477 A | 8/1982 | Gordy |
| 4,355,401 A | 10/1982 | Ikoma et al. |
| 4,356,558 A | 10/1982 | Owen et al. |
| 4,360,867 A | 11/1982 | Gonda |
| 4,363,132 A | 12/1982 | Collin |
| 4,363,976 A | 12/1982 | Minor |
| 4,365,217 A | 12/1982 | Berger et al. |
| 4,369,522 A | 1/1983 | Cerny, Jr. et al. |
| 4,370,572 A | 1/1983 | Cosand et al. |
| 4,380,828 A | 4/1983 | Moon |
| 4,384,357 A | 5/1983 | deBuda et al. |
| 4,389,579 A | 6/1983 | Stein |
| 4,392,255 A | 7/1983 | Del Giudice |
| 4,393,352 A | 7/1983 | Volpe et al. |
| 4,393,395 A | 7/1983 | Hacke et al. |
| 4,405,835 A | 9/1983 | Jansen et al. |
| 4,409,877 A | 10/1983 | Budelman |
| 4,430,629 A | 2/1984 | Betzl et al. |
| 4,439,787 A | 3/1984 | Mogi et al. |
| 4,441,080 A | 4/1984 | Saari |
| 4,446,438 A | 5/1984 | Chang et al. |
| 4,456,990 A | 6/1984 | Fisher et al. |
| 4,463,320 A | 7/1984 | Dawson |
| 4,470,145 A | 9/1984 | Williams |
| 4,472,785 A | 9/1984 | Kasuga |
| 4,479,226 A | 10/1984 | Prabhu et al. |
| 4,481,490 A | 11/1984 | Huntley |
| 4,481,642 A | 11/1984 | Hanson |
| 4,483,017 A | 11/1984 | Hampel et al. |
| 4,484,143 A | 11/1984 | French et al. |
| 4,485,347 A | 11/1984 | Hirasawa et al. |
| 4,485,488 A | 11/1984 | Houdart |
| 4,488,119 A | 12/1984 | Marshall |
| 4,504,803 A | 3/1985 | Lee et al. |
| 4,510,467 A | 4/1985 | Chang et al. |
| 4,517,519 A | 5/1985 | Mukaiyama |
| 4,517,520 A | 5/1985 | Ogawa |
| 4,518,935 A | 5/1985 | van Roermund |
| 4,521,892 A | 6/1985 | Vance et al. |
| 4,562,414 A | 12/1985 | Linder et al. |
| 4,563,773 A | 1/1986 | Dixon, Jr. et al. |
| 4,571,738 A | 2/1986 | Vance |
| 4,577,157 A | 3/1986 | Reed |
| 4,583,239 A | 4/1986 | Vance |
| 4,591,736 A | 5/1986 | Hirao et al. |
| 4,591,930 A | 5/1986 | Baumeister |
| 4,596,046 A | 6/1986 | Richardson et al. |
| 4,602,220 A | 7/1986 | Kurihara |
| 4,603,300 A | 7/1986 | Welles, II et al. |
| 4,612,464 A | 9/1986 | Ishikawa et al. |
| 4,612,518 A | 9/1986 | Gans et al. |
| 4,616,191 A | 10/1986 | Galani et al. |
| 4,621,217 A | 11/1986 | Saxe et al. |
| 4,628,517 A | 12/1986 | Schwarz et al. |
| 4,633,510 A | 12/1986 | Suzuki et al. |
| 4,634,998 A | 1/1987 | Crawford |
| 4,648,021 A | 3/1987 | Alberkrack |
| 4,651,034 A | 3/1987 | Sato |
| 4,651,210 A | 3/1987 | Olson |
| 4,653,117 A | 3/1987 | Heck |
| 4,660,164 A | 4/1987 | Leibowitz |
| 4,663,744 A | 5/1987 | Russell et al. |
| 4,675,882 A | 6/1987 | Lillie et al. |

| | | | | | |
|---|---|---|---|---|---|
| 4,688,237 A | 8/1987 | Brault | 5,015,963 A | 5/1991 | Sutton |
| 4,688,253 A | 8/1987 | Gumm | 5,016,242 A | 5/1991 | Tang |
| 4,716,376 A | 12/1987 | Daudelin | 5,017,924 A | 5/1991 | Guiberteau et al. |
| 4,716,388 A | 12/1987 | Jacobs | 5,020,149 A | 5/1991 | Hemmie |
| 4,718,113 A | 1/1988 | Rother et al. | 5,020,154 A | 5/1991 | Zierhut |
| 4,726,041 A | 2/1988 | Prohaska et al. | 5,020,745 A | 6/1991 | Stetson, Jr. |
| 4,733,403 A | 3/1988 | Simone | 5,052,050 A | 9/1991 | Collier et al. |
| 4,734,591 A | 3/1988 | Ichitsubo | 5,058,107 A | 10/1991 | Stone et al. |
| 4,737,969 A | 4/1988 | Steel et al. | 5,062,122 A | 10/1991 | Pham et al. |
| 4,740,675 A | 4/1988 | Brosnan et al. | 5,063,387 A | 11/1991 | Mower |
| 4,740,792 A | 4/1988 | Sagey et al. | 5,065,409 A | 11/1991 | Hughes et al. |
| 4,743,858 A | 5/1988 | Everard | 5,083,050 A | 1/1992 | Vasile |
| 4,745,463 A | 5/1988 | Lu | 5,091,921 A | 2/1992 | Minami |
| 4,751,468 A | 6/1988 | Agoston | 5,095,533 A | 3/1992 | Loper et al. |
| 4,757,538 A | 7/1988 | Zink | 5,095,536 A | 3/1992 | Loper |
| 4,761,798 A | 8/1988 | Griswold, Jr. et al. | 5,111,152 A | 5/1992 | Makino |
| 4,768,187 A | 8/1988 | Marshall | 5,113,094 A | 5/1992 | Grace et al. |
| 4,769,612 A | 9/1988 | Tamakoshi et al. | 5,113,129 A | 5/1992 | Hughes |
| 4,771,265 A | 9/1988 | Okui et al. | 5,115,409 A | 5/1992 | Stepp |
| 4,772,853 A | 9/1988 | Hart | 5,122,765 A | 6/1992 | Pataut |
| 4,785,463 A | 11/1988 | Janc et al. | 5,124,592 A | 6/1992 | Hagino |
| 4,789,837 A | 12/1988 | Ridgers | 5,126,682 A | 6/1992 | Weinberg et al. |
| 4,791,584 A | 12/1988 | Greivenkamp, Jr. | 5,131,014 A | 7/1992 | White |
| 4,801,823 A | 1/1989 | Yokoyama | 5,136,267 A | 8/1992 | Cabot |
| 4,806,790 A | 2/1989 | Sone | 5,140,705 A | 8/1992 | Kosuga |
| 4,810,904 A | 3/1989 | Crawford | 5,150,124 A | 9/1992 | Moore et al. |
| 4,810,976 A | 3/1989 | Cowley et al. | 5,151,661 A | 9/1992 | Caldwell et al. |
| 4,811,362 A | 3/1989 | Yester, Jr. et al. | 5,157,687 A | 10/1992 | Tymes |
| 4,811,422 A | 3/1989 | Kahn | 5,159,710 A | 10/1992 | Cusdin |
| 4,814,649 A | 3/1989 | Young | 5,164,985 A | 11/1992 | Nysen et al. |
| 4,816,704 A | 3/1989 | Fiori, Jr. | 5,170,414 A | 12/1992 | Silvian |
| 4,819,252 A | 4/1989 | Christopher | 5,172,019 A | 12/1992 | Naylor et al. |
| 4,833,445 A | 5/1989 | Buchele | 5,172,070 A | 12/1992 | Hiraiwa et al. |
| 4,841,265 A | 6/1989 | Watanabe et al. | 5,179,731 A | 1/1993 | Tränkle et al. |
| 4,845,389 A | 7/1989 | Pyndiah et al. | 5,191,459 A | 3/1993 | Thompson et al. |
| 4,855,894 A | 8/1989 | Asahi et al. | 5,196,806 A | 3/1993 | Ichihara |
| 4,857,928 A | 8/1989 | Gailus et al. | 5,204,642 A | 4/1993 | Asghar et al. |
| 4,862,121 A | 8/1989 | Hochschild et al. | 5,212,827 A | 5/1993 | Meszko et al. |
| 4,866,441 A | 9/1989 | Conway et al. | 5,214,787 A | 5/1993 | Karkota, Jr. |
| 4,868,654 A | 9/1989 | Juri et al. | 5,218,562 A | 6/1993 | Basehore et al. |
| 4,870,659 A | 9/1989 | Oishi et al. | 5,220,583 A | 6/1993 | Solomon |
| 4,871,987 A | 10/1989 | Kawase | 5,220,680 A | 6/1993 | Lee |
| 4,873,492 A | 10/1989 | Myer | 5,222,144 A | 6/1993 | Whikehart |
| 4,885,587 A | 12/1989 | Wiegand et al. | 5,222,250 A | 6/1993 | Cleveland et al. |
| 4,885,671 A | 12/1989 | Peil | 5,230,097 A | 7/1993 | Currie et al. |
| 4,885,756 A | 12/1989 | Fontanes et al. | 5,239,496 A | 8/1993 | Vancraeynest |
| 4,888,557 A | 12/1989 | Puckette, IV et al. | 5,239,686 A | 8/1993 | Downey |
| 4,890,302 A | 12/1989 | Muilwijk | 5,239,687 A | 8/1993 | Chen |
| 4,893,316 A | 1/1990 | Janc et al. | 5,241,561 A | 8/1993 | Barnard |
| 4,893,341 A | 1/1990 | Gehring | 5,249,203 A | 9/1993 | Loper |
| 4,894,766 A | 1/1990 | De Agro | 5,251,218 A | 10/1993 | Stone et al. |
| 4,896,152 A | 1/1990 | Tiemann | 5,251,232 A | 10/1993 | Nonami |
| 4,902,979 A | 2/1990 | Puckette, IV | 5,260,970 A | 11/1993 | Henry et al. |
| 4,908,579 A | 3/1990 | Tawfik et al. | 5,260,973 A | 11/1993 | Watanabe |
| 4,910,752 A | 3/1990 | Yester, Jr. et al. | 5,263,194 A | 11/1993 | Ragan |
| 4,914,405 A | 4/1990 | Wells | 5,263,196 A | 11/1993 | Jasper |
| 4,920,510 A | 4/1990 | Senderowicz et al. | 5,263,198 A | 11/1993 | Geddes et al. |
| 4,922,452 A | 5/1990 | Larsen et al. | 5,267,023 A | 11/1993 | Kawasaki |
| 4,931,716 A | 6/1990 | Jovanovic et al. | 5,278,826 A | 1/1994 | Murphy et al. |
| 4,931,921 A | 6/1990 | Anderson | 5,282,023 A | 1/1994 | Scarpa |
| 4,943,974 A | 7/1990 | Motamedi | 5,282,222 A | 1/1994 | Fattouche et al. |
| 4,944,025 A | 7/1990 | Gehring et al. | 5,287,516 A | 2/1994 | Schaub |
| 4,955,079 A | 9/1990 | Connerney et al. | 5,293,398 A | 3/1994 | Hamao et al. |
| 4,965,467 A | 10/1990 | Bilterijst | 5,303,417 A | 4/1994 | Laws |
| 4,967,160 A | 10/1990 | Quievy et al. | 5,307,517 A | 4/1994 | Rich |
| 4,968,958 A | 11/1990 | Hoare | 5,315,583 A | 5/1994 | Murphy et al. |
| 4,970,703 A | 11/1990 | Hariharan et al. | 5,319,799 A | 6/1994 | Morita |
| 4,972,436 A | 11/1990 | Halim et al. | 5,321,852 A | 6/1994 | Seong |
| 4,982,353 A | 1/1991 | Jacob et al. | 5,325,204 A | 6/1994 | Scarpa |
| 4,984,077 A | 1/1991 | Uchida | 5,337,014 A | 8/1994 | Najle et al. |
| 4,995,055 A | 2/1991 | Weinberger et al. | 5,339,054 A | 8/1994 | Taguchi |
| 5,003,621 A | 3/1991 | Gailus | 5,339,395 A | 8/1994 | Pickett et al. |
| 5,005,169 A | 4/1991 | Bronder et al. | 5,339,459 A | 8/1994 | Schiltz et al. |
| 5,006,810 A | 4/1991 | Popescu | 5,345,239 A | 9/1994 | Madni et al. |
| 5,006,854 A | 4/1991 | White et al. | 5,353,306 A | 10/1994 | Yamamoto |
| 5,010,585 A | 4/1991 | Garcia | 5,355,114 A | 10/1994 | Sutterlin et al. |
| 5,012,245 A | 4/1991 | Scott et al. | 5,361,408 A | 11/1994 | Watanabe et al. |
| 5,014,130 A | 5/1991 | Heister et al. | 5,369,404 A | 11/1994 | Galton |
| 5,014,304 A | 5/1991 | Nicollini et al. | 5,369,789 A | 11/1994 | Kosugi et al. |

| | | | | | |
|---|---|---|---|---|---|
| 5,369,800 A | 11/1994 | Takagi et al. | 5,557,642 A | 9/1996 | Williams |
| 5,375,146 A | 12/1994 | Chalmers | 5,559,468 A | 9/1996 | Gailus et al. |
| 5,379,040 A | 1/1995 | Mizomoto et al. | 5,559,809 A | 9/1996 | Jeon et al. |
| 5,379,141 A | 1/1995 | Thompson et al. | 5,563,550 A | 10/1996 | Toth |
| 5,388,063 A | 2/1995 | Takatori et al. | 5,564,097 A | 10/1996 | Swanke |
| 5,389,839 A | 2/1995 | Heck | 5,574,755 A | 11/1996 | Persico |
| 5,390,215 A | 2/1995 | Antia et al. | 5,579,341 A | 11/1996 | Smith et al. |
| 5,390,364 A | 2/1995 | Webster et al. | 5,579,347 A | 11/1996 | Lindquist et al. |
| 5,400,084 A | 3/1995 | Scarpa | 5,584,068 A | 12/1996 | Mohindra |
| 5,400,363 A | 3/1995 | Waugh et al. | 5,589,793 A | 12/1996 | Kassapian |
| 5,404,127 A | 4/1995 | Lee et al. | 5,592,131 A | 1/1997 | Labreche et al. |
| 5,410,195 A | 4/1995 | Ichihara | 5,600,680 A | 2/1997 | Mishima et al. |
| 5,410,270 A | 4/1995 | Rybicki et al. | 5,602,847 A | 2/1997 | Pagano et al. |
| 5,410,541 A | 4/1995 | Hotto | 5,602,868 A | 2/1997 | Wilson |
| 5,410,743 A | 4/1995 | Seely et al. | 5,604,592 A | 2/1997 | Kotidis et al. |
| 5,412,352 A | 5/1995 | Graham | 5,604,732 A | 2/1997 | Kim et al. |
| 5,416,449 A | 5/1995 | Joshi | 5,606,731 A | 2/1997 | Pace et al. |
| 5,416,803 A | 5/1995 | Janer | 5,608,531 A | 3/1997 | Honda et al. |
| 5,422,909 A | 6/1995 | Love et al. | 5,610,946 A | 3/1997 | Tanaka et al. |
| 5,422,913 A | 6/1995 | Wilkinson | RE35,494 E | 4/1997 | Nicollini |
| 5,423,082 A | 6/1995 | Cygan et al. | 5,617,451 A | 4/1997 | Mimura et al. |
| 5,428,638 A | 6/1995 | Cioffi et al. | 5,619,538 A | 4/1997 | Sempel et al. |
| 5,428,640 A | 6/1995 | Townley | 5,621,455 A | 4/1997 | Rogers et al. |
| 5,434,546 A | 7/1995 | Palmer | 5,628,055 A | 5/1997 | Stein |
| 5,438,329 A | 8/1995 | Gastouniotis et al. | 5,630,227 A | 5/1997 | Bella et al. |
| 5,438,692 A | 8/1995 | Mohindra | 5,633,610 A | 5/1997 | Maekawa et al. |
| 5,440,311 A | 8/1995 | Gallagher et al. | 5,633,815 A | 5/1997 | Young |
| 5,444,415 A | 8/1995 | Dent et al. | 5,634,207 A | 5/1997 | Yamaji et al. |
| 5,444,416 A | 8/1995 | Ishikawa et al. | 5,636,140 A | 6/1997 | Lee et al. |
| 5,444,865 A | 8/1995 | Heck et al. | 5,638,396 A | 6/1997 | Klimek |
| 5,446,421 A | 8/1995 | Kechkaylo | 5,640,415 A | 6/1997 | Pandula |
| 5,446,422 A | 8/1995 | Mattila et al. | 5,640,424 A | 6/1997 | Banavong et al. |
| 5,448,602 A | 9/1995 | Ohmori et al. | 5,640,428 A | 6/1997 | Abe et al. |
| 5,449,939 A | 9/1995 | Horiguchi et al. | 5,640,698 A | 6/1997 | Shen et al. |
| 5,451,899 A | 9/1995 | Lawton | 5,642,071 A | 6/1997 | Sevenhans et al. |
| 5,454,007 A | 9/1995 | Dutta | 5,648,985 A | 7/1997 | Bjerede et al. |
| 5,454,009 A | 9/1995 | Fruit et al. | 5,650,785 A | 7/1997 | Rodal |
| 5,461,646 A | 10/1995 | Anvari | 5,659,372 A | 8/1997 | Patel et al. |
| 5,463,356 A | 10/1995 | Palmer | 5,661,424 A | 8/1997 | Tang |
| 5,463,357 A | 10/1995 | Hobden | 5,663,878 A | 9/1997 | Walker |
| 5,465,071 A | 11/1995 | Kobayashi et al. | 5,663,986 A | 9/1997 | Striffler |
| 5,465,410 A | 11/1995 | Hiben et al. | 5,668,836 A | 9/1997 | Smith et al. |
| 5,465,415 A | 11/1995 | Bien | 5,675,392 A | 10/1997 | Nayebi et al. |
| 5,465,418 A | 11/1995 | Zhou et al. | 5,678,220 A | 10/1997 | Fournier |
| 5,471,162 A | 11/1995 | McEwan | 5,678,226 A | 10/1997 | Li et al. |
| 5,471,665 A | 11/1995 | Pace et al. | 5,680,078 A | 10/1997 | Ariie |
| 5,479,120 A | 12/1995 | McEwan | 5,680,418 A | 10/1997 | Croft et al. |
| 5,479,447 A | 12/1995 | Chow et al. | 5,682,099 A | 10/1997 | Thompson et al. |
| 5,481,570 A | 1/1996 | Winters | 5,689,413 A | 11/1997 | Jaramillo et al. |
| 5,483,193 A | 1/1996 | Kennedy et al. | 5,694,096 A | 12/1997 | Ushiroku et al. |
| 5,483,245 A | 1/1996 | Ruinet | 5,697,074 A | 12/1997 | Makikallio et al. |
| 5,483,549 A | 1/1996 | Weinberg et al. | 5,699,006 A | 12/1997 | Zele et al. |
| 5,483,600 A | 1/1996 | Werrbach | 5,703,584 A | 12/1997 | Hill |
| 5,483,691 A | 1/1996 | Heck et al. | 5,705,949 A | 1/1998 | Alelyunas et al. |
| 5,483,695 A | 1/1996 | Pardoen | 5,705,955 A | 1/1998 | Freeburg et al. |
| 5,490,173 A | 2/1996 | Whikehart et al. | 5,710,992 A | 1/1998 | Sawada et al. |
| 5,490,176 A | 2/1996 | Peltier | 5,710,998 A | 1/1998 | Opas |
| 5,493,581 A | 2/1996 | Young et al. | 5,714,910 A | 2/1998 | Skoczen et al. |
| 5,493,721 A | 2/1996 | Reis | 5,715,281 A | 2/1998 | Bly et al. |
| 5,495,200 A | 2/1996 | Kwan et al. | 5,721,514 A | 2/1998 | Crockett et al. |
| 5,495,202 A | 2/1996 | Hsu | 5,724,002 A | 3/1998 | Hulick |
| 5,495,500 A | 2/1996 | Jovanovich et al. | 5,724,041 A | 3/1998 | Inoue et al. |
| 5,499,267 A | 3/1996 | Ohe et al. | 5,724,653 A | 3/1998 | Baker et al. |
| 5,500,758 A | 3/1996 | Thompson et al. | 5,729,577 A | 3/1998 | Chen |
| 5,512,946 A | 4/1996 | Murata et al. | 5,729,829 A | 3/1998 | Talwar et al. |
| 5,513,389 A | 4/1996 | Reeser et al. | 5,732,333 A | 3/1998 | Cox et al. |
| 5,515,014 A | 5/1996 | Troutman | 5,734,683 A | 3/1998 | Hulkko et al. |
| 5,517,688 A | 5/1996 | Fajen et al. | 5,736,895 A | 4/1998 | Yu et al. |
| 5,519,890 A | 5/1996 | Pinckley | 5,737,035 A | 4/1998 | Rotzoll |
| 5,523,719 A | 6/1996 | Longo et al. | 5,742,189 A | 4/1998 | Yoshida et al. |
| 5,523,726 A | 6/1996 | Kroeger et al. | 5,745,846 A | 4/1998 | Myer et al. |
| 5,523,760 A | 6/1996 | McEwan | 5,748,683 A | 5/1998 | Smith et al. |
| 5,528,068 A | 6/1996 | Ohmi | 5,751,154 A | 5/1998 | Tsugai |
| 5,535,402 A | 7/1996 | Leibowitz et al. | 5,757,858 A | 5/1998 | Black et al. |
| 5,539,770 A | 7/1996 | Ishigaki | 5,757,864 A | 5/1998 | Petranovich et al. |
| 5,551,076 A | 8/1996 | Bonn | 5,757,870 A | 5/1998 | Miya et al. |
| 5,552,789 A | 9/1996 | Schuermann | RE35,829 E | 6/1998 | Sanderford, Jr. |
| 5,555,453 A | 9/1996 | Kajimoto et al. | 5,760,629 A | 6/1998 | Urabe et al. |
| 5,557,641 A | 9/1996 | Weinberg | 5,760,632 A | 6/1998 | Kawakami et al. |

| | | | | | |
|---|---|---|---|---|---|
| 5,760,645 A | 6/1998 | Comte et al. | 5,920,199 A | 7/1999 | Sauer |
| 5,764,087 A | 6/1998 | Clark | 5,926,065 A | 7/1999 | Wakai et al. |
| 5,767,726 A | 6/1998 | Wang | 5,926,513 A | 7/1999 | Suominen et al. |
| 5,768,118 A | 6/1998 | Faulk et al. | 5,933,467 A | 8/1999 | Sehier et al. |
| 5,768,323 A | 6/1998 | Kroeger et al. | 5,937,013 A | 8/1999 | Lam et al. |
| 5,770,985 A | 6/1998 | Ushiroku et al. | 5,943,370 A | 8/1999 | Smith |
| 5,771,442 A | 6/1998 | Wang et al. | 5,945,660 A | 8/1999 | Nakasuji et al. |
| 5,777,692 A | 7/1998 | Ghosh | 5,949,827 A | 9/1999 | DeLuca et al. |
| 5,777,771 A | 7/1998 | Smith | 5,952,895 A | 9/1999 | McCune, Jr. et al. |
| 5,778,022 A | 7/1998 | Walley | 5,953,642 A | 9/1999 | Feldtkeller et al. |
| 5,781,600 A | 7/1998 | Reeve et al. | 5,955,992 A | 9/1999 | Shattil |
| 5,784,689 A | 7/1998 | Kobayashi | 5,959,850 A | 9/1999 | Lim |
| 5,786,844 A | 7/1998 | Rogers et al. | 5,960,033 A | 9/1999 | Shibano et al. |
| 5,787,125 A | 7/1998 | Mittel | 5,970,053 A | 10/1999 | Schick et al. |
| 5,790,587 A | 8/1998 | Smith et al. | 5,973,570 A | 10/1999 | Salvi et al. |
| 5,793,801 A | 8/1998 | Fertner | 5,982,315 A | 11/1999 | Bazarjani et al. |
| 5,793,817 A | 8/1998 | Wilson | 5,982,329 A | 11/1999 | Pittman et al. |
| 5,793,818 A | 8/1998 | Claydon et al. | 5,982,810 A | 11/1999 | Nishimori |
| 5,801,654 A | 9/1998 | Traylor | 5,986,600 A | 11/1999 | McEwan |
| 5,802,463 A | 9/1998 | Zuckerman | 5,994,689 A | 11/1999 | Charrier |
| 5,805,460 A | 9/1998 | Greene et al. | 5,995,030 A | 11/1999 | Cabler |
| 5,809,060 A | 9/1998 | Cafarella et al. | 5,999,561 A | 12/1999 | Naden et al. |
| 5,812,546 A | 9/1998 | Zhou et al. | 6,005,506 A | 12/1999 | Bazarjani et al. |
| 5,818,582 A | 10/1998 | Fernandez et al. | 6,005,903 A | 12/1999 | Mendelovicz |
| 5,818,869 A | 10/1998 | Miya et al. | 6,011,435 A | 1/2000 | Takeyabu et al. |
| 5,825,254 A | 10/1998 | Lee | 6,014,176 A | 1/2000 | Nayebi et al. |
| 5,825,257 A | 10/1998 | Klymyshyn et al. | 6,014,551 A | 1/2000 | Pesola et al. |
| 5,834,979 A | 11/1998 | Yatsuka | 6,018,262 A | 1/2000 | Noro et al. |
| 5,834,985 A | 11/1998 | Sundegård | 6,018,553 A | 1/2000 | Sanielevici et al. |
| 5,834,987 A | 11/1998 | Dent | 6,026,286 A | 2/2000 | Long |
| 5,841,324 A | 11/1998 | Williams | 6,028,887 A | 2/2000 | Harrison et al. |
| 5,841,811 A | 11/1998 | Song | 6,031,217 A | 2/2000 | Aswell et al. |
| 5,844,449 A | 12/1998 | Abeno et al. | 6,034,566 A | 3/2000 | Ohe |
| 5,844,868 A | 12/1998 | Takahashi et al. | 6,038,265 A | 3/2000 | Pan et al. |
| 5,847,594 A | 12/1998 | Mizuno | 6,041,073 A | 3/2000 | Davidovici et al. |
| 5,859,878 A | 1/1999 | Phillips et al. | 6,047,026 A | 4/2000 | Chao et al. |
| 5,864,754 A | 1/1999 | Hotto | 6,049,573 A | 4/2000 | Song |
| 5,870,670 A | 2/1999 | Ripley et al. | 6,049,706 A | 4/2000 | Cook et al. |
| 5,872,446 A | 2/1999 | Cranford, Jr. et al. | 6,054,889 A | 4/2000 | Kobayashi |
| 5,878,088 A | 3/1999 | Knutson et al. | 6,057,714 A | 5/2000 | Andrys et al. |
| 5,881,375 A | 3/1999 | Bonds | 6,061,551 A | 5/2000 | Sorrells et al. |
| 5,883,548 A | 3/1999 | Assard et al. | 6,061,555 A | 5/2000 | Bultman et al. |
| 5,884,154 A | 3/1999 | Sano et al. | 6,064,054 A | 5/2000 | Waczynski et al. |
| 5,887,001 A | 3/1999 | Russell | 6,067,329 A | 5/2000 | Kato et al. |
| 5,892,380 A | 4/1999 | Quist | 6,072,996 A | 6/2000 | Smith |
| 5,894,239 A | 4/1999 | Bonaccio et al. | 6,073,001 A | 6/2000 | Sokoler |
| 5,894,496 A | 4/1999 | Jones | 6,076,015 A | 6/2000 | Hartley et al. |
| 5,896,304 A | 4/1999 | Tiemann et al. | 6,078,630 A | 6/2000 | Prasanna |
| 5,896,347 A | 4/1999 | Tomita et al. | 6,081,691 A | 6/2000 | Renard et al. |
| 5,896,562 A | 4/1999 | Heinonen | 6,084,465 A | 7/2000 | Dasgupta |
| 5,898,912 A | 4/1999 | Heck et al. | 6,084,922 A | 7/2000 | Zhou et al. |
| 5,900,746 A | 5/1999 | Sheahan | 6,085,073 A | 7/2000 | Palermo et al. |
| 5,900,747 A | 5/1999 | Brauns | 6,088,348 A | 7/2000 | Bell, III et al. |
| 5,901,054 A | 5/1999 | Leu et al. | 6,091,289 A | 7/2000 | Song et al. |
| 5,901,187 A | 5/1999 | Iinuma | 6,091,939 A | 7/2000 | Banh |
| 5,901,344 A | 5/1999 | Opas | 6,091,940 A | 7/2000 | Sorrells et al. |
| 5,901,347 A | 5/1999 | Chambers et al. | 6,091,941 A | 7/2000 | Moriyama et al. |
| 5,901,348 A | 5/1999 | Bang et al. | 6,094,084 A | 7/2000 | Abou-Allam et al. |
| 5,901,349 A | 5/1999 | Guegnaud et al. | 6,097,762 A | 8/2000 | Suzuki et al. |
| 5,903,178 A | 5/1999 | Miyatsuji et al. | 6,098,046 A | 8/2000 | Cooper et al. |
| 5,903,187 A | 5/1999 | Claverie et al. | 6,098,886 A | 8/2000 | Swift et al. |
| 5,903,196 A | 5/1999 | Salvi et al. | 6,112,061 A | 8/2000 | Rapeli |
| 5,903,421 A | 5/1999 | Furutani et al. | 6,121,819 A | 9/2000 | Traylor |
| 5,903,553 A | 5/1999 | Sakamoto et al. | 6,125,271 A | 9/2000 | Rowland et al. |
| 5,903,595 A | 5/1999 | Suzuki | 6,128,746 A | 10/2000 | Clark et al. |
| 5,903,609 A | 5/1999 | Kool et al. | 6,137,321 A | 10/2000 | Bazarjani |
| 5,903,827 A | 5/1999 | Kennan et al. | 6,144,236 A | 11/2000 | Vice et al. |
| 5,903,854 A | 5/1999 | Abe et al. | 6,144,331 A | 11/2000 | Jiang |
| 5,905,433 A | 5/1999 | Wortham | 6,144,846 A | 11/2000 | Durec |
| 5,905,449 A | 5/1999 | Tsubouchi et al. | 6,147,340 A | 11/2000 | Levy |
| 5,907,149 A | 5/1999 | Marckini | 6,147,763 A | 11/2000 | Steinlechner |
| 5,907,197 A | 5/1999 | Faulk | 6,150,890 A | 11/2000 | Damgaard et al. |
| 5,909,447 A | 6/1999 | Cox et al. | 6,151,354 A | 11/2000 | Abbey |
| 5,909,460 A | 6/1999 | Dent | 6,160,280 A | 12/2000 | Bonn et al. |
| 5,911,116 A | 6/1999 | Nosswitz | 6,167,247 A | 12/2000 | Kannell et al. |
| 5,911,123 A | 6/1999 | Shaffer et al. | 6,169,733 B1 | 1/2001 | Lee |
| 5,914,622 A | 6/1999 | Inoue | 6,175,728 B1 | 1/2001 | Mitama |
| 5,915,278 A | 6/1999 | Mallick | 6,178,319 B1 | 1/2001 | Kashima |
| 5,918,167 A | 6/1999 | Tiller et al. | 6,182,011 B1 | 1/2001 | Ward |

| Patent | Kind | Date | Inventor |
|---|---|---|---|
| 6,188,221 | B1 | 2/2001 | Van de Kop et al. |
| 6,192,225 | B1 | 2/2001 | Arpaia et al. |
| 6,195,539 | B1 | 2/2001 | Galal et al. |
| 6,198,941 | B1 | 3/2001 | Aho et al. |
| 6,204,789 | B1 | 3/2001 | Nagata |
| 6,208,636 | B1 | 3/2001 | Tawil et al. |
| RE37,138 | E | 4/2001 | Dent |
| 6,211,718 | B1 | 4/2001 | Souetinov |
| 6,212,369 | B1 | 4/2001 | Avasarala |
| 6,215,475 | B1 | 4/2001 | Meyerson et al. |
| 6,215,828 | B1 | 4/2001 | Signell et al. |
| 6,215,830 | B1 | 4/2001 | Temerinac et al. |
| 6,223,061 | B1 | 4/2001 | Dacus et al. |
| 6,225,848 | B1 | 5/2001 | Tilley et al. |
| 6,230,000 | B1 | 5/2001 | Tayloe |
| 6,246,695 | B1 | 6/2001 | Seazholtz et al. |
| 6,259,293 | B1 | 7/2001 | Hayase et al. |
| 6,266,518 | B1 | 7/2001 | Sorrells et al. |
| 6,275,542 | B1 | 8/2001 | Katayama et al. |
| 6,298,065 | B1 | 10/2001 | Dombkowski et al. |
| 6,307,894 | B2 | 10/2001 | Eidson et al. |
| 6,308,058 | B1 | 10/2001 | Souetinov et al. |
| 6,313,685 | B1 | 11/2001 | Rabii |
| 6,313,700 | B1 | 11/2001 | Nishijima et al. |
| 6,314,279 | B1 | 11/2001 | Mohindra |
| 6,317,589 | B1 | 11/2001 | Nash |
| 6,321,073 | B1 | 11/2001 | Luz et al. |
| 6,327,313 | B1 | 12/2001 | Traylor et al. |
| 6,330,244 | B1 | 12/2001 | Swartz et al. |
| 6,332,007 | B1 | 12/2001 | Sasaki |
| 6,335,656 | B1 | 1/2002 | Goldfarb et al. |
| 6,353,735 | B1 | 3/2002 | Sorrells et al. |
| 6,363,126 | B1 | 3/2002 | Furukawa et al. |
| 6,363,262 | B1 | 3/2002 | McNicol |
| 6,366,622 | B1 | 4/2002 | Brown et al. |
| 6,366,765 | B1 | 4/2002 | Hongo et al. |
| 6,370,371 | B1 | 4/2002 | Sorrells et al. |
| 6,385,439 | B1 | 5/2002 | Hellberg |
| 6,393,070 | B1 | 5/2002 | Reber |
| 6,400,963 | B1 | 6/2002 | Glöckler et al. |
| 6,404,758 | B1 | 6/2002 | Wang |
| 6,404,823 | B1 | 6/2002 | Grange et al. |
| 6,421,534 | B1 | 7/2002 | Cook et al. |
| 6,437,639 | B1 | 8/2002 | Nguyen et al. |
| 6,438,366 | B1 | 8/2002 | Lindfors et al. |
| 6,441,694 | B1 | 8/2002 | Turcotte et al. |
| 6,445,726 | B1 | 9/2002 | Gharpurey |
| 6,459,721 | B1 | 10/2002 | Mochizuki et al. |
| 6,509,777 | B2 | 1/2003 | Razavi et al. |
| 6,512,544 | B1 | 1/2003 | Merrill et al. |
| 6,512,785 | B1 | 1/2003 | Zhou et al. |
| 6,512,798 | B1 | 1/2003 | Akiyama et al. |
| 6,516,185 | B1 | 2/2003 | MacNally |
| 6,531,979 | B1 | 3/2003 | Hynes |
| 6,542,722 | B1 | 4/2003 | Sorrells et al. |
| 6,546,061 | B2 | 4/2003 | Signell et al. |
| 6,560,301 | B1 | 5/2003 | Cook et al. |
| 6,560,451 | B1 | 5/2003 | Somayajula |
| 6,567,483 | B1 | 5/2003 | Dent et al. |
| 6,580,902 | B1 | 6/2003 | Sorrells et al. |
| 6,591,310 | B1 | 7/2003 | Johnson |
| 6,597,240 | B1 | 7/2003 | Walburger et al. |
| 6,600,795 | B1 | 7/2003 | Ohta et al. |
| 6,600,911 | B1 | 7/2003 | Morishige et al. |
| 6,608,647 | B1 | 8/2003 | King |
| 6,611,569 | B1 | 8/2003 | Schier et al. |
| 6,618,579 | B1 | 9/2003 | Smith et al. |
| 6,625,470 | B1 | 9/2003 | Fourtet et al. |
| 6,628,328 | B1 | 9/2003 | Yokouchi et al. |
| 6,633,194 | B2 | 10/2003 | Arnborg et al. |
| 6,634,555 | B1 | 10/2003 | Sorrells et al. |
| 6,639,939 | B1 | 10/2003 | Naden et al. |
| 6,647,250 | B1 | 11/2003 | Bultman et al. |
| 6,647,270 | B1 | 11/2003 | Himmelstein |
| 6,686,879 | B2 | 2/2004 | Shattil |
| 6,687,493 | B1 | 2/2004 | Sorrells et al. |
| 6,690,232 | B2 | 2/2004 | Ueno et al. |
| 6,690,741 | B1 | 2/2004 | Larrick, Jr. et al. |
| 6,694,128 | B1 | 2/2004 | Sorrells et al. |
| 6,697,603 | B1 | 2/2004 | Lovinggood et al. |
| 6,704,549 | B1 | 3/2004 | Sorrells et al. |
| 6,704,558 | B1 | 3/2004 | Sorrells et al. |
| 6,731,146 | B1 | 5/2004 | Gallardo |
| 6,738,609 | B1 | 5/2004 | Clifford |
| 6,741,139 | B2 | 5/2004 | Pleasant et al. |
| 6,741,650 | B1 | 5/2004 | Painchaud et al. |
| 6,775,684 | B1 | 8/2004 | Toyoyama et al. |
| 6,798,351 | B1 | 9/2004 | Sorrells et al. |
| 6,801,253 | B1 | 10/2004 | Yonemoto et al. |
| 6,813,320 | B1 | 11/2004 | Claxton et al. |
| 6,813,485 | B2 | 11/2004 | Sorrells et al. |
| 6,823,178 | B2 | 11/2004 | Pleasant et al. |
| 6,829,311 | B1 | 12/2004 | Riley |
| 6,836,650 | B2 | 12/2004 | Sorrells et al. |
| 6,850,742 | B2 | 2/2005 | Fayyaz |
| 6,853,690 | B1 | 2/2005 | Sorrells et al. |
| 6,865,399 | B2 | 3/2005 | Fujioka et al. |
| 6,873,836 | B1 | 3/2005 | Sorrells et al. |
| 6,876,846 | B2 | 4/2005 | Tamaki et al. |
| 6,879,817 | B1 | 4/2005 | Sorrells et al. |
| 6,882,194 | B2 | 4/2005 | Belot et al. |
| 6,892,057 | B2 | 5/2005 | Nilsson |
| 6,892,062 | B2 | 5/2005 | Lee et al. |
| 6,894,988 | B1 | 5/2005 | Zehavi |
| 6,909,739 | B1 | 6/2005 | Eerola et al. |
| 6,910,015 | B2 | 6/2005 | Kawai |
| 6,917,796 | B2 | 7/2005 | Setty et al. |
| 6,920,311 | B2 | 7/2005 | Rofougaran et al. |
| 6,959,178 | B2 | 10/2005 | Macedo et al. |
| 6,963,626 | B1 | 11/2005 | Shaeffer et al. |
| 6,963,734 | B2 | 11/2005 | Sorrells et al. |
| 6,973,476 | B1 | 12/2005 | Naden et al. |
| 6,975,848 | B2 | 12/2005 | Rawlins et al. |
| 6,999,747 | B2 | 2/2006 | Su |
| 7,006,805 | B1 | 2/2006 | Sorrells et al. |
| 7,010,286 | B2 | 3/2006 | Sorrells et al. |
| 7,010,559 | B2 * | 3/2006 | Rawlins et al. ............... 708/425 |
| 7,016,663 | B2 | 3/2006 | Sorrells et al. |
| 7,027,786 | B1 | 4/2006 | Smith et al. |
| 7,039,372 | B1 | 5/2006 | Sorrells et al. |
| 7,050,508 | B2 | 5/2006 | Sorrells et al. |
| 7,054,296 | B1 | 5/2006 | Sorrells et al. |
| 7,065,162 | B1 | 6/2006 | Sorrells et al. |
| 7,072,390 | B1 | 7/2006 | Sorrells et al. |
| 7,072,427 | B2 | 7/2006 | Rawlins et al. |
| 7,076,011 | B2 | 7/2006 | Cook et al. |
| 7,082,171 | B1 | 7/2006 | Johnson et al. |
| 7,085,335 | B2 | 8/2006 | Rawlins et al. |
| 7,107,028 | B2 | 9/2006 | Sorrells et al. |
| 7,110,435 | B1 | 9/2006 | Sorrells et al. |
| 7,110,444 | B1 | 9/2006 | Sorrells et al. |
| 7,149,487 | B2 | 12/2006 | Yoshizawa |
| 7,190,941 | B2 | 3/2007 | Sorrells et al. |
| 7,193,965 | B1 | 3/2007 | Nevo et al. |
| 7,194,044 | B2 | 3/2007 | Birkett et al. |
| 7,194,246 | B2 | 3/2007 | Sorrells et al. |
| 7,197,081 | B2 | 3/2007 | Saito |
| 7,209,725 | B1 | 4/2007 | Sorrells et al. |
| 7,212,581 | B2 | 5/2007 | Birkett et |
| 7,218,899 | B2 | 5/2007 | Sorrells et al. |
| 7,218,907 | B2 | 5/2007 | Sorrells et al. |
| 7,224,749 | B2 | 5/2007 | Sorrells et al. |
| 7,233,969 | B2 | 6/2007 | Rawlins et al. |
| 7,236,754 | B2 | 6/2007 | Sorrells et al. |
| 7,245,886 | B2 | 7/2007 | Sorrells et al. |
| 7,272,164 | B2 | 9/2007 | Sorrells et al. |
| 7,292,835 | B2 | 11/2007 | Sorrells et al. |
| 7,295,826 | B1 | 11/2007 | Cook et al. |
| 7,308,242 | B2 | 12/2007 | Sorrells et al. |
| 7,321,640 | B2 | 1/2008 | Milne et al. |
| 7,321,735 | B1 | 1/2008 | Smith et al. |
| 7,321,751 | B2 | 1/2008 | Sorrells et al. |
| 7,358,801 | B2 | 4/2008 | Perdoor et al. |
| 7,376,410 | B2 | 5/2008 | Sorrells et al. |
| 7,379,515 | B2 | 5/2008 | Johnson et al. |
| 7,379,883 | B2 | 5/2008 | Sorrells |
| 7,386,292 | B2 | 6/2008 | Sorrells et al. |
| 7,389,100 | B2 | 6/2008 | Sorrells et al. |

| | | | |
|---|---|---|---|
| 7,433,910 B2 | 10/2008 | Rawlins et al. | |
| 7,454,453 B2 | 11/2008 | Rawlins et al. | |
| 7,460,584 B2 | 12/2008 | Parker et al. | |
| 7,483,686 B2 | 1/2009 | Sorrells et al. | |
| 7,496,342 B2 | 2/2009 | Sorrells et al. | |
| 7,515,896 B1 | 4/2009 | Sorrells et al. | |
| 7,529,522 B2 | 5/2009 | Sorrells et al. | |
| 7,539,474 B2 | 5/2009 | Sorrels et al. | |
| 7,546,096 B2 | 6/2009 | Sorrells et al. | |
| 7,554,508 B2 | 6/2009 | Johnson et al. | |
| 7,599,421 B2 | 10/2009 | Sorrells et al. | |
| 7,620,378 B2 | 11/2009 | Sorrells et al. | |
| 7,653,145 B2 | 1/2010 | Sorrells et al. | |
| 7,653,158 B2 | 1/2010 | Rawlins et al. | |
| 7,693,230 B2 | 4/2010 | Sorrells et al. | |
| 7,693,502 B2 | 4/2010 | Sorrells et al. | |
| 7,697,916 B2 | 4/2010 | Sorrells et al. | |
| 7,724,845 B2 | 5/2010 | Sorrells et al. | |
| 2001/0015673 A1 | 8/2001 | Yamashita et al. | |
| 2001/0036818 A1 | 11/2001 | Dobrovolny | |
| 2002/0021685 A1 | 2/2002 | Sakusabe | |
| 2002/0037706 A1 | 3/2002 | Ichihara | |
| 2002/0080728 A1 | 6/2002 | Sugar et al. | |
| 2002/0098823 A1 | 7/2002 | Lindfors et al. | |
| 2002/0124036 A1* | 9/2002 | Rawlins et al. | 708/422 |
| 2002/0132642 A1 | 9/2002 | Hines et al. | |
| 2002/0163921 A1 | 11/2002 | Ethridge et al. | |
| 2003/0045263 A1 | 3/2003 | Wakayama et al. | |
| 2003/0078011 A1 | 4/2003 | Cheng et al. | |
| 2003/0081781 A1 | 5/2003 | Jensen et al. | |
| 2003/0149579 A1 | 8/2003 | Begemann et al. | |
| 2003/0193364 A1 | 10/2003 | Liu et al. | |
| 2004/0125879 A1 | 7/2004 | Jaussi et al. | |
| 2004/0230628 A1* | 11/2004 | Rawlins et al. | 708/422 |
| 2006/0002491 A1 | 1/2006 | Darabi et al. | |
| 2006/0039449 A1 | 2/2006 | Fontana et al. | |
| 2006/0209599 A1 | 9/2006 | Kato et al. | |

FOREIGN PATENT DOCUMENTS

| | | |
|---|---|---|
| DE | 35 41 031 A1 | 5/1986 |
| DE | 42 37 692 C1 | 3/1994 |
| DE | 196 27 640 A1 | 1/1997 |
| DE | 692 21 098 T2 | 1/1998 |
| DE | 196 48 915 A1 | 6/1998 |
| DE | 197 35 798 C1 | 7/1998 |
| EP | 0 035 166 A1 | 9/1981 |
| EP | 0 087 336 A1 | 8/1983 |
| EP | 0 099 265 A1 | 1/1984 |
| EP | 0 087 336 B1 | 7/1986 |
| EP | 0 254 844 A2 | 2/1988 |
| EP | 0 276 130 A2 | 7/1988 |
| EP | 0 276 130 A3 | 7/1988 |
| EP | 0 193 899 B1 | 6/1990 |
| EP | 0 380 351 A2 | 8/1990 |
| EP | 0 380 351 A3 | 2/1991 |
| EP | 0 411 840 A2 | 2/1991 |
| EP | 0 423 718 A2 | 4/1991 |
| EP | 0 411 840 A3 | 7/1991 |
| EP | 0 486 095 A1 | 5/1992 |
| EP | 0 423 718 A3 | 8/1992 |
| EP | 0 512 748 A2 | 11/1992 |
| EP | 0 529 836 A1 | 3/1993 |
| EP | 0 548 542 A1 | 6/1993 |
| EP | 0 512 748 A3 | 7/1993 |
| EP | 0 560 228 A1 | 9/1993 |
| EP | 0 632 288 A2 | 1/1995 |
| EP | 0 632 577 A1 | 1/1995 |
| EP | 0 643 477 A2 | 3/1995 |
| EP | 0 643 477 A3 | 3/1995 |
| EP | 0 411 840 B1 | 10/1995 |
| EP | 0 696 854 A1 | 2/1996 |
| EP | 0 632 288 A3 | 7/1996 |
| EP | 0 732 803 A1 | 9/1996 |
| EP | 0 486 095 B1 | 2/1997 |
| EP | 0 782 275 A2 | 7/1997 |
| EP | 0 785 635 A1 | 7/1997 |
| EP | 0 789 449 A2 | 8/1997 |
| EP | 0 789 449 A3 | 8/1997 |
| EP | 0 795 955 A2 | 9/1997 |
| EP | 0 795 955 A3 | 9/1997 |
| EP | 0 795 978 A2 | 9/1997 |
| EP | 0 817 369 A2 | 1/1998 |
| EP | 0 817 369 A3 | 1/1998 |
| EP | 0 837 565 A1 | 4/1998 |
| EP | 0 862 274 A1 | 9/1998 |
| EP | 0 874 499 A2 | 10/1998 |
| EP | 0 512 748 B1 | 11/1998 |
| EP | 0 877 476 A1 | 11/1998 |
| EP | 0 977 351 A1 | 2/2000 |
| FR | 2 245 130 | 4/1975 |
| FR | 2 669 787 A1 | 5/1992 |
| FR | 2 743 231 A1 | 7/1997 |
| GB | 2 161 344 A | 1/1986 |
| GB | 2 215 945 A | 9/1989 |
| GB | 2 324 919 A | 11/1998 |
| JP | 47-2314 | 2/1972 |
| JP | 55-66057 | 5/1980 |
| JP | 56-114451 | 9/1981 |
| JP | 58-7903 | 1/1983 |
| JP | 58-031622 | 2/1983 |
| JP | 58-133004 | 8/1983 |
| JP | 59-022438 | 2/1984 |
| JP | 59-123318 | 7/1984 |
| JP | 59-144249 | 8/1984 |
| JP | 60-58705 | 4/1985 |
| JP | 60-130203 | 7/1985 |
| JP | 61-30821 | 2/1986 |
| JP | 61-193521 | 8/1986 |
| JP | 61-232706 | 10/1986 |
| JP | 61-245749 | 11/1986 |
| JP | 62-12381 | 1/1987 |
| JP | 62-047214 | 2/1987 |
| JP | 63-54002 | 3/1988 |
| JP | 63-65587 | 3/1988 |
| JP | 63-153691 | 6/1988 |
| JP | 63-274214 | 11/1988 |
| JP | 64-048557 | 2/1989 |
| JP | 2-39632 | 2/1990 |
| JP | 2-131629 | 5/1990 |
| JP | 2-276351 | 11/1990 |
| JP | 4-123614 | 4/1992 |
| JP | 4-127601 | 4/1992 |
| JP | 4-154227 | 5/1992 |
| JP | 5-175730 | 7/1993 |
| JP | 5-175734 | 7/1993 |
| JP | 5-327356 | 12/1993 |
| JP | 6-237276 | 8/1994 |
| JP | 6-284038 | 10/1994 |
| JP | 7-154344 | 6/1995 |
| JP | 7-169292 A | 7/1995 |
| JP | 7-307620 | 11/1995 |
| JP | 8-23359 | 1/1996 |
| JP | 8-32556 | 2/1996 |
| JP | 8-139524 | 5/1996 |
| JP | 8-288882 A | 11/1996 |
| JP | 9-36664 | 2/1997 |
| JP | 9-171399 | 6/1997 |
| JP | 10-22804 A | 1/1998 |
| JP | 10-41860 | 2/1998 |
| JP | 10-96778 | 4/1998 |
| JP | 10-173563 | 6/1998 |
| JP | 11-98205 | 4/1999 |
| WO | WO 80/01633 A1 | 8/1980 |
| WO | WO 91/18445 A1 | 11/1991 |
| WO | WO 94/05087 A1 | 3/1994 |
| WO | WO 95/01006 A1 | 1/1995 |
| WO | WO 95/19073 A2 | 7/1995 |
| WO | WO 96/02977 A1 | 2/1996 |
| WO | WO 96/08078 A1 | 3/1996 |
| WO | WO 96/39750 A1 | 12/1996 |
| WO | WO 97/08839 A2 | 3/1997 |
| WO | WO 97/08839 A3 | 3/1997 |
| WO | WO 97/38490 A1 | 10/1997 |
| WO | WO 98/00953 A1 | 1/1998 |
| WO | WO 98/24201 A1 | 6/1998 |
| WO | WO 98/40968 A2 | 9/1998 |
| WO | WO 98/40968 A3 | 9/1998 |

| | | |
|---|---|---|
| WO | WO 98/53556 A2 | 11/1998 |
| WO | WO 99/23755 A1 | 5/1999 |
| WO | WO 00/31659 A1 | 6/2000 |

OTHER PUBLICATIONS

English-language Abstract of Japanese Patent Publication No. JP 10-22804, data supplied by ep.espacenet.com, 1 page (Jan. 23, 1998—Date of publication of application).

English-language Abstract of Japanese Patent Publication No. JP 8-288882, data supplied by ep.espacenet.com, 1 page (Nov. 1, 1996—Date of publication of application).

Aghvami, H. et al., "Land Mobile Satellites Using the Highly Elliptic Orbits—The UK T-SAT Mobile Payload," *Fourth International Conference on Satellite Systems for Mobile Communications and Navigation*, IEE, pp. 147-153 (Oct. 17-19, 1988).

Akers, N.P. et al., "RF Sampling Gates: a Brief Review," *IEE Proceedings*, IEE, vol. 133, Part A, No. 1, pp. 45-49 (Jan. 1986).

Al-Ahmad, H.A.M. et at., "Doppler Frequency Correction for a Non-Geostationary Communications Satellite. Techniques for CERS and T-SAT," *Electronics Division Colloquium on Low Noise Oscillators and Synthesizers*, IEE, pp. 4/1-4/5 (Jan. 23, 1986).

Ali, I. et al., "Doppler Characterization for LEO Satellites," *IEEE Transactions on Communications*, IEEE, vol. 46, No. 3, pp. 309-313 (Mar. 1998).

Allan, D.W., "Statistics of Atomic Frequency Standards," *Proceedings of the IEEE Special Issue on Frequency Stability*, IEEE, pp. 221-230 (Feb. 1966).

Allstot, D.J. et al., "MOS Switched Capacitor Ladder Filters," *IEEE Journal of Solid-State Circuits*, IEEE, vol. SC-13, No. 6, pp. 806-814 (Dec. 1978).

Allstot, D.J. and Black Jr. W.C., "Technological Design Considerations for Monolithic MOS Switched-Capacitor Filtering Systems," *Proceedings of the IEEE*, IEEE, vol. 71, No. 8, pp. 967-986 (Aug. 1983).

Alouini, M. et al., "Channel Characterization and Modeling for Ka-Band Very Small Aperture Terminals," *Proceedings of the IEEE*, IEEE, vol. 85, No. 6, pp. 981-997 (Jun. 1997).

Andreyev, G.A. and Ogarev, S.A., "Phase Distortions of Keyed Millimeter-Wave Signals in the Case of Propagation in a Turbulent Atmosphere," *Telecommunications and Radio Engineering*, Scripta Technica, vol. 43, No. 12, pp. 87-90 (Dec. 1988).

Antonetti, A. et al., "Optoelectronic Sampling in the Picosecond Range," *Optics Communications*, North-Holland Holland Publishing Company, vol. 21, No. 2, pp. 211-214 (May 1977).

Austin, J. et al., "Doppler Correction of the Telecommunication Payload Oscillators in the UK T-SAT," *18th European Microwave Conference*, Microwave Exhibitions and Publishers Ltd., pp. 851-857 (Sep. 12-15, 1988).

Auston, D.H., "Picosecond optoelectronic switching and gating in silicon," *Applied Physics Letters*, American Institute of Physics, vol. 26, No. 3, pp. 101-103 (Feb. 1, 1975).

Baher, H., "Transfer Functions for Switched-Capacitor and Wave Digital Filters," *IEEE Transactions on Circuits and Systems*, IEEE Circuits and Systems Society, vol. CAS-33, No. 11, pp. 1138-1142 (Nov. 1986).

Baines, R., "The DSP Bottleneck," *IEEE Communications Magazine*, IEEE Communications Society, pp. 46- 54 (May 1995).

Banjo, O.P. and Vilar, E., "Binary Error Probabilities on Earth-Space Links Subject to Scintillation Fading," *Electronics Letters*, IEE, vol. 21, No. 7, pp. 296-297 (Mar. 28, 1985).

Banjo, O.P. and Vilar, E., "The Dependence of Slant Path Amplitude Scintillations on Various Meteorological Parameters," *Fifth International Conference on Antennas and Propagation (ICAP 87) Part 2: Propagation*, IEE, pp. 277-280 (Mar. 30-Apr. 2, 1987).

Banjo, O.P. and Vilar, E. "Measurement and Modeling of Amplitude Scintillations on Low-Elevation Earth-Space Paths and Impact on Communication Systems," *IEEE Transactions on Communications*, IEEE Communications Society, vol. COM-34, No. 8, pp. 774-780 (Aug. 1986).

Banjo, O.P. et al., "Tropospheric Amplitude Spectra Due to Absorption and Scattering in Earth-Space Paths," *Fourth International Conference on Antennas and Propagation (ICAP 85)*, IEE, pp. 77-82, (Apr. 16-19, 1985).

Basili,P. et al., "Case Study of Intense Scintillation Events on the OTS Path," *IEEE Transactions on Antennas and Propagation*, IEEE, vol. 38, No. 1, pp. 107-113 (Jan. 1990).

Basili, P. et al., "Observation of High $C^2$ and Turbulent Path Length on OTS Space-Earth Link," *Electronics Letters*, IEE, vol. 24, No. 17, pp. 1114-1116 (Aug. 18, 1988).

Blakey, J.R. et al., "Measurement of Atmospheric Millimetre-Wave Phase Scintillations in an Absorption Region," *Electronics Letters*, IEE, vol. 21, No. 11, pp. 486-487 (May 23, 1985).

Burgueño, A. et al., "Influence of rain gauge integration time on the rain rate statistics used in microwave communications," *annales des télécommunications*, International Union of Radio Science, pp. 522-527 (Sep./Oct. 1988).

Burgueño, A. et al., "Long-Term Joint Statistical Analysis of Duration and Intensity of Rainfall Rate with Application to Microwave Communications," *Fifth International Conference on Antennas and Propagation (ICAP 87) Part 2: Propagation*, IEE, pp. 198-201 (Mar. 30-Apr. 2, 1987).

Burgueño, A. et al., "Long Term Statistics of Precipitation Rate Return Periods in the Context of Microwave Communications," *Sixth International Conference on Antennas and Propagation (ICAP 89) Part 2: Propagation*, IEE, pp. 297-301 (Apr. 4-7, 1989).

Burgueño, A. et al., "Spectral Analysis of 49 Years of Rainfall Rate and Relation to Fade Dynamics," *IEEE Transactions on Communications*, IEEE Communications Society, vol. 38, No. 9, pp. 1359-1366 (Sep. 1990).

Catalan, C. and Vilar, E., "Approach for satellite slant path remote sensing," *Electronics Letters*, IEE, vol. 34, No. 12, pp. 1238-1240 (Jun. 11, 1998).

Chan, P. et al., "A Highly Linear 1-GHz CMOS Downconversion Mixer," *European Solid State Circuits Conference*, IEEE Communication Society, pp. 210-213 (Sep. 22-24, 1993).

Declaration of Michael J. Bultman filed in U.S. Appl. No. 09/176,022, which is directed to related subject matter, 2 pages.

Declaration of Robert W. Cook filed in U.S. Appl. No. 09/176,022, which is directed to related subject matter, 2 pages.

Declaration of Alex Holtz filed in U.S. Appl. No. 09/176,022, which is directed to related subject matter, 3 pages.

Declaration of Richard C. Looke filed in U.S. Appl. No. 09/176,022, which is directed to related subject matter, 2 pages.

Declaration of Charley D. Moses, Jr. filed in U.S. Appl. No. 09/176,022, which is directed to related subject matter, 2 pages.

Declaration of Jeffrey L. Parker and David F. Sorrells, with attachment Exhibit 1, filed in U.S. Appl. No. 09/176,022, which is directed to related subject matter, 130 pages.

Dewey, R.J. and Collier, C.J., "Multi-Mode Radio Receiver," *Electronics Division Colloquium on Digitally Implemented Radios*, IEE, pp. 3/1-3/5 (Oct. 18, 1985).

DIALOG File 347 (JAPIO) English Language Patent Abstract for JP 2-276351, 1 page (Nov. 13, 1990—Date of publication of application).

DIALOG File 347 (JAPIO) English Language Patent Abstract for JP 2-131629, 1 page (May 21, 1990—Date of publication of application).

DIALOG File 347 (JAPIO) English Language Patent Abstract for JP 2-39632, 1 page (Feb. 8, 1990—Date of publication of application).

DIALOG File 348 (European Patents) English Language Patent Abstract for EP 0 785 635 A1, 3 pages (Dec. 26, 1996—Date of publication of application).

DIALOG File 348 (European Patents) English Language Patent Abstract for EP 35166 A1, 2 pages (Feb. 18, 1981—Date of publication of application).

"DSO takes sampling rate to 1 Ghz," *Electronic Engineering*, Morgan Grampian Publishers, vol. 59, No. 723, pp. 77 and 79 (Mar. 1987).

Erdi, G. and Henneuse, P.R., "A Precision FET-Less Sample-and-Hold with High Charge-to-Droop Current Ratio," *IEEE Journal of Solid-State Circuits*, IEEE, vol. SC-13, No. 6, pp. 864-873 (Dec. 1978).

Faulkner, N.D. and Vilar, E., "Subharmonic Sampling for the Measurement of Short Term Stability of Microwave Oscillators," *IEEE Transactions on Instrumentation and Measurement*, IEEE, vol. IM-32, No. 1, pp. 208-213 (Mar. 1983).

Faulkner, N.D. et al., "Sub-Harmonic Sampling for the Accurate Measurement of Frequency Stability of Microwave Oscillators," *CPEM 82 Digest: Conference on Precision Electromagnetic Measurements*, IEEE, pp. M-10 and M-11 (1982).

Faulkner, N.D. and Vilar, E., "Time Domain Analysis of Frequency Stability Using Non-Zero Dead-Time Counter Techniques," *CPEM 84 Digest Conference on Precision Electromagnetic Measurements*, IEEE, pp. 81-82 (1984).

Filip, M. and Vilar, E., "Optimum Utilization of the Channel Capacity of a Satellite Link in the Presence of Amplitude Scintillations and Rain Attenuation," *IEEE Transactions on Communications*, IEEE Communications Society, vol. 38, No. 11, pp. 1958-1965 (Nov. 1990).

Fukahori, K.. "A CMOS Narrow-Band Signaling Filter with Q Reduction," *IEEE Journal of Solid-State Circuits*, IEEE, vol. SC-19, No. 6, pp. 926-932 (Dec. 1984).

Fukuchi, H. and Otsu, Y., "Available time statistics of rain attenuation on earth-space path," *IEE Proceedings-H: Microwaves, Antennas and Propagation*, IEE, vol. 135, Pt. H, No. 6, pp. 387-390 (Dec. 1988).

Gibbins, C.J. and Chadha, R., "Millimetre-wave propagation through hydrocarbon flame," *IEE Proceedings*, IEE, vol. 134, Pt. H, No. 2, pp. 169-173 (Apr. 1987).

Gilchrist, B. et al., "Sampling hikes performance of frequency synthesizers," *Microwaves & RF*, Hayden Publishing, vol. 23, No. 1, pp. 93-94 and 110 (Jan. 1984).

Gossard, E.E., "Clear weather meteorological effects on propagation at frequencies above 1 Ghz," *Radio Science*, American Geophysical Union, vol. 16, No. 5, pp. 589-608 (Sep.-Oct. 1981).

Gregorian, R. et al., "Switched-Capacitor Circuit Design," *Proceedings of the IEEE*, IEEE, vol. 71, No. 8, pp. 941-966 (Aug. 1983).

Groshong et al., "Undersampling Techniques Simplify Digital Radio," *Electronic Design*, Penton Publishing, pp. 67-68, 70, 73-75 and 78 (May 23, 1991).

Grove, W.M., "Sampling for Oscilloscopes and Other RF Systems: Dc through X-Band," *IEEE Transactions on Microwave Theory and Techniques*, IEEE, pp. 629-635 (Dec. 1966).

Haddon, J. et al., "Measurement of Microwave Scintillations on a Satellite Down-Link at X-Band," *Antennas and Propagation*, IEE, pp. 113-117 (1981).

Haddon, J. and Vilar, E., "Scattering Induced Microwave Scintillations from Clear Air and Rain on Earth Space Paths and the Influence of Antenna Aperture," *IEEE Transactions on Antennas and Propagation*, IEEE, vol. AP-34, No. 5, pp. 646-657 (May 1986).

Hafdallah, H. et al., "2-4 Ghz MESFET Sampler," *Electronics Letters*, IEE, vol. 24, No. 3, pp. 151-153 (Feb. 4, 1988).

Herben, M.H.A.J., "Amplitude and Phase Scintillation Measurements on 8-2 km Line-Of-Sight Path at 30 Ghz," *Electronics Letters*, IEE, vol. 18, No. 7, pp. 287-289 (Apr. 1, 1982).

Hewitt, A. et al., "An 18 Ghz Wideband LOS Multipath Experiment," *International Conference on Measurements for Telecommunication Transmission Systems—MTTS 85*, IEE, pp. 112-116 (Nov. 27-28, 1985).

Hewitt, A. et al., "An Autoregressive Approach to the Identification of Multipath Ray Parameters from Field Measurements," *IEEE Transactions on Communications*, IEEE Communications Society, vol. 37, No. 11, pp. 1136-1143 (Nov. 1989).

Hewitt, A. and Vilar, E., "Selective fading on LOS Microwave Links: Classical and Spread-Spectrum Measurement Techniques," *IEEE Transactions on Communications*, IEEE Communications Society, vol. 36, No. 7, pp. 789-796 (Jul. 1988).

Hospitalier, E., "Instruments for Recording and Observing Rapidly Varying Phenomena," *Science Abstracts*, IEE, vol. VII, pp. 22-23 (1904).

Howard, I.M. and Swansson, N.S., "Demodulating High Frequency Resonance Signals for Bearing Fault Detection," *The Institution of Engineers Australia Vibration and Noise Conference*, Institution of Engineers, Australia, pp. 115-121 (Sep. 18-20, 1990).

Hu, X., *A Switched-Current Sample-and-Hold Amplifier for FM Demodulation*, Thesis for Master of Applied Science, Dept. of Electrical and Computer Engineering, University of Toronto, UMI Dissertation Services, pp. 1-64 (1995).

Hung, H-L. A. et al., "Characterization of Microwave Integrated Circuits Using an Optical Phase-Locking and Sampling System," *IEEE MTT-S Digest*, IEEE, pp. 507-510 (1991).

Hurst, P.J., "Shifting the Frequency Response of Switched-Capacitor Filters by Nonuniform Sampling," *IEEE Transactions on Circuits and Systems*, IEEE Circuits and Systems Society, vol. 38, No. 1, pp. 12-19 (Jan. 1991).

Itakura, T., "Effects of the sampling pulse width on the frequency characteristics of a sample-and-hold circuit," *IEE Proceedings Circuits, Devices and Systems*, IEE, vol. 141, No. 4, pp. 328-336 (Aug. 1994).

Janssen, J.M.L., "An Experimental 'Stroboscopic' Oscilloscope for Frequencies up to about 50 Mc/s: I. Fundamentals," *Philips Technical Review*, Philips Research Laboratories, vol. 12, No. 2, pp. 52-59 (Aug. 1950).

Janssen, J.M.L. and Michels, A.J., "An Experimental 'Stroboscopic' Oscilloscope for Frequencies up to about 50 Mc/s: II. Electrical Build-Up," *Philips Technical Review*, Philips Research Laboratories, vol. 12, No. 3, pp. 73-82 (Sep. 1950).

Jondral, V.F. et al., "Doppler Profiles for Communication Satellites," *Frequenz*, Herausberger, pp. 111-116 (May-Jun. 1996).

Kaleh, G.K., "A Frequency Diversity Spread Spectrum System for Communication in the Presence of In-band Interference," *1995 IEEE Globecom*, IEEE Communications Society, pp. 66-70 (1995).

Karasawa, Y. et al., "A New Prediction Method for Tropospheric Scintillation on Earth-Space Paths," *IEEE Transactions on Antennas and Propagation*, IEEE Antennas and Propagation Society, vol. 36, No. 11, pp. 1608-1614 (Nov. 1988).

Kirsten, J. and Fleming, J., "Undersampling reduces data-acquisition costs for select applications," *EDN*, Cahners Publishing, vol. 35, No. 13, pp. 217-222, 224, 226-228 (Jun. 21, 1990).

Lam, W.K. et al., "Measurement of the Phase Noise Characteristics of an Unlocked Communications Channel Identifier," *Proceedings of the 1993 IEEE International Frequency Control Symposium*, IEEE, pp. 283-288 (Jun. 2-4, 1993).

Lam, W.K. et al., "Wideband sounding of 11.6 Ghz transhorizon channel," *Electronics Letters*, IEE, vol. 30, No. 9, pp. 738-739 (Apr. 28, 1994).

Larkin, K.G., "Efficient demodulator for bandpass sampled AM signals," *Electronics Letters*, IEE, vol. 32, No. 2, pp. 101-102 (Jan. 18, 1996).

Lau, W.H. et al., "Analysis of the Time Variant Structure of Microwave Line-of-sight Multipath Phenomena," *IEEE Global Telecommunications Conference & Exhibition*, IEEE, pp. 1707-1711 (Nov. 28-Dec. 1, 1988).

Lau, W.H. et al., "Improved Prony Algorithm to Identify Multipath Components," *Electronics Letters*, IEE, vol. 23, No. 20, pp. 1059-1060 (Sep. 24, 1987).

Lesage, P. and Audoin, C., "Effect of Dead-Time on the Estimation of the Two-Sample Variance," *IEEE Transactions on Instrumentation and Measurement*, IEEE Instrumentation and Measurement Society, vol. IM-28, No. 1, pp. 6-10 (Mar. 1979).

Liechti, C.A., "Performance of Dual-gate GaAs MESFET's as Gain-Controlled Low-Noise Amplifiers and High-Speed Modulators," *IEEE Transactions on Microwave Theory and Techniques*, IEEE Microwave Theory and Techniques Society, vol. MTT-23, No. 6, pp. 461-469 (Jun. 1975).

Linnenbrink, T.E. et al., "A One Gigasample Per Second Transient Recorder," *IEEE Transactions on Nuclear Science*, IEEE Nuclear and Plasma Sciences Society, vol. NS-26, No. 4, pp. 4443-4449 (Aug. 1979).

Liou, M.L., "A Tutorial on Computer-Aided Analysis of Switched-Capacitor Circuits," *Proceedings of the IEEE*, IEEE, vol. 71, No. 8, pp. 987-1005 (Aug. 1983).

Lo, P. et al., "Coherent Automatic Gain Control," *IEE Colloquium on Phase Locked Techniques*, IEE, pp. 2/1-2/6 (Mar. 26, 1980).

Lo, P. et al., "Computation of Rain Induced Scintillations on Satellite Down-Links at Microwave Frequencies," *Third International Conference on Antennas and Propagation (ICAP 83)*, pp. 127-131 (Apr. 12-15, 1983).

Lo, P.S.L.O. et al., "Observations of Amplitude Scintillations on a Low-Elevation Earth-Space Path," *Electronics Letters*, IEE, vol. 20, No. 7, pp. 307-308 (Mar. 29, 1984).

Madani, K. and Aithison, C.S., "A 20 Ghz Microwave Sampler," *IEEE Transactions on Microwave Theory and Techniques*, IEEE Microwave Theory and Techniques Society, vol. 40, No. 10, pp. 1960-1963 (Oct. 1992).

Marsland, R.A. et al., "130 Ghz GaAs monolithic integrated circuit sampling head," *Appl. Phys. Lett.*, American Institute of Physics, vol. 55, No. 6, pp. 592-594 (Aug. 7, 1989).

Martin, K. and Sedra, A.S., "Switched-Capacitor Building Blocks for Adaptive Systems," *IEEE Transactions on Circuits and Systems*, IEEE Circuits and Systems Society, vol. CAS-28, No. 6, pp. 576-584 (Jun. 1981).

Marzano, F.S. and d'Auria, G., "Model-based Prediction of Amplitude Scintillation variance due to Clear-Air Tropospheric Turbulence on Earth-Satellite Microwave Links," *IEEE Transactions on Antennas and Propagation*, IEEE Antennas and Propagation Society, vol. 46, No. 10, pp. 1506-1518 (Oct. 1998).

Matricciani, E., "Prediction of fade durations due to rain in satellite communication systems," *Radio Science*, American Geophysical Union, vol. 32, No. 3, pp. 935-941 (May-Jun. 1997).

McQueen, J.G., "The Monitoring of High-Speed Waveforms," *Electronic Engineering*, Morgan Brothers Limited, vol. XXIV, No. 296, pp. 436-441 (Oct. 1952).

Merkelo, J. and Hall, R.D., "Broad-Band Thin-Film Signal Sampler," *IEEE Journal of Solid-State Circuits*, IEEE, vol. SC-7, No. 1, pp. 50-54 (Feb. 1972).

Merlo, U. et al., "Amplitude Scintillation Cycles in a Sirio Satellite-Earth Link," *Electronics Letters*, IEE, vol. 21, No. 23, pp. 1094-1096 (Nov. 7, 1985).

Morris, D., "Radio-holographic reflector measurement of the 30-m millimeter radio telescope at 22 Ghz with a cosmic signal source," *Astronomy and Astrophysics*, Springer-Verlag, vol. 203, No. 2, pp. 399-406 (Sep. (II) 1988).

Moulsley, T.J. et al., "The efficient acquisition and processing of propagation statistics," *Journal of the Institution of Electronic and Radio Engineers*, IERE, vol. 55, No. 3, pp. 97-103 (Mar. 1985).

Ndzi, D. et al., "Wide-Band Statistical Characterization of an Over-the-Sea Experimental Transhorizon Link," *IEE Colloquium on Radio Communications at Microwave and Millimetre Wave Frequencies*, IEE, pp. 1/1-1/6 (Dec. 16, 1996).

Ndzi, D. et al., "Wideband Statistics of Signal Levels and Doppler Spread on an Over-The-Sea Transhorizon Link," *IEE Colloquium on Propagation Characteristics and Related System Techniques for Beyond Line-of-Sight Radio*, IEE, pp. 9/1-9/6 (Nov. 24, 1997).

"New zero IF chipset from Philips," *Electronic Engineering*, United News & Media, vol. 67, No. 825, p. 10 (Sep. 1995).

Ohara, H. et al., "First monolithic PCM filter cuts cost of telecomm systems," *Electronic Design*, Hayden Publishing Company, vol. 27, No. 8, pp. 130-135 (Apr. 12, 1979).

Oppenheim, A.V. et al., *Signals and Systems*, Prentice-Hall, pp. 527-531 and 561-562 (1983).

Ortgies, G., "Experimental Parameters Affecting Amplitude Scintillation Measurements on Satellite Links," *Electronics Letters*, IEE, vol. 21, No. 17, pp. 771-772 (Aug. 15, 1985).

Parssinen et al., "A 2-GHz Subharmonic Sampler for Signal Downconversion," *IEEE Transactions on Microwave Theory and Techniques*, IEEE, vol. 45, No. 12, 7 pages (Dec. 1997).

Peeters, G. et al., "Evaluation of Statistical Models for Clear-Air Scintillation Prediction Using Olympus Satellite Measurements," *International Journal of Satellite Communications*, John Wiley and Sons, vol. 15, No. 2, pp. 73-88 (Mar.-Apr. 1997).

Perrey, A.G. and Schoenwetter, H.K., *NBS Technical Note 1121: A Schottky Diode Bridge Sampling Gate*, U.S. Dept. of Commerce, pp. 1-14 (May 1980).

Poulton, K. et al., "A 1-Ghz 6-bit ADC System," *IEEE Journal of Solid-State Circuits*, IEEE, vol. SC-22, No. 6, pp. 962-969 (Dec. 1987).

Press Release, "Parkervision, Inc. Announces Fiscal 1993 Results," Lippert/Heilshorn and Associates, 2 pages (Apr. 6, 1994).

Press Release, "Parkervision, Inc. Announces the Appointment of Michael Baker to the New Position of National Sales Manager," Lippert/Heilshorn and Associates, 1 Page (Apr. 7, 1994).

Press Release, "Parkervision's Cameraman Well-Received by Distance Learning Market," Lippert/Heilshorn and Associates, 2 Pages (Apr. 8, 1994).

Press Release, "Parkervision, Inc. Announces First Quarter Financial Results," Lippert/Heilshorn and Associates, 2 Pages (Apr. 26, 1994).

Press Release, "Parkervision, Inc. Announces the Retirement of William H. Fletcher, Chief Financial Officer," Lippert/Heilshorn and Associates, 1 Page (May 11, 1994).

Press Release, "Parkervision, Inc. Announces New Cameraman System II™ At Infocomm Trade Show," Lippert/Heilshorn and Associates, 3 Pages (Jun. 9, 1994).

Press Release, "Parkervision, Inc. Announces Appointments to its National Sales Force," Lippert/Heilshorn and Associates, 2 Pages (Jun. 17, 1994).

Press Release, "Parkervision, Inc. Announces Second Quarter and Six Months Financial Results," Lippert/Heilshorn and Associates, 3 Pages (Aug. 9, 1994).

Press Release, "Parkervision, Inc. Announces Third Quarter and Nine Months Financial Results," Lippert/Heilshorn and Associates, 3 Pages (Oct. 28, 1994).

Press Release, "Parkervision, Inc. Announces First Significant Dealer Sale of its *Cameraman®* System II," Lippert/Heilshorn and Associates, 2 Pages (Nov. 7, 1994).

Press Release, "Parkervision, Inc. Announces Fourth Quarter and Year End Results," Lippert/Heilshorn and Associates, 2 Pages (Mar. 1, 1995).

Press Release, "Parkervision, Inc. Announces Joint Product Developments With VTEL," Lippert/Heilshorn and Associates, 2 Pages (Mar. 21, 1995).

Press Release, "Parkervision, Inc. Announces First Quarter Financial Results," Lippert/Heilshorn and Associates, 3 Pages (Apr. 28, 1995).

Press Release, "Parkervision Wins Top 100 Product Districts' Choice Award," Parkervision Marketing and Manufacturing Headquarters, 1 Page (Jun. 29, 1995).

Press Release, "Parkervision National Sales Manager Next President of USDLA," Parkervision Marketing and Manufacturing Headquarters, 1 Page (Jul. 6, 1995).

Press Release, "Parkervision Granted New Patent," Parkervision Marketing and Manufacturing Headquarters, 1 Page (Jul. 21, 1995).

Press Release, "Parkervision, Inc. Announces Second Quarter and Six Months Financial Results," Parkervision Marketing and Manufacturing Headquarters, 2 Pages (Jul. 31, 1995).

Press Release, "Parkervision, Inc. Expands its Cameraman System II Product Line," Parkervision Marketing and Manufacturing Headquarters, 2 Pages (Sep. 22, 1995).

Press Release, "Parkervision Announces New Camera Control Technology," Parkervision Marketing and Manufacturing Headquarters, 2 Pages (Oct. 25, 1995).

Press Release, "Parkervision, Inc. Announces Completion of VTEL/Parkervision Joint Product Line," Parkervision Marketing and Manufacturing Headquarters, 2 Pages (Oct. 30, 1995).

Press Release, "Parkervision, Inc. Announces Third Quarter and Nine Months Financial Results," Parkervision Marketing and Manufacturing Headquarters, 2 Pages (Oct. 30, 1995).

Press Release, "Parkervision's Cameraman Personal Locator Camera System Wins Telecon XV Award," Parkervision Marketing and Manufacturing Headquarters, 2 Pages (Nov. 1, 1995).

Press Release, "Parkervision, Inc. Announces Purchase Commitment From VTEL Corporation," Parkervision Marketing and Manufacturing Headquarters, 1 Page (Feb. 26, 1996).

Press Release, "ParkerVision, Inc. Announces Fourth Quarter and Year End Results," Parkervision Marketing and Manufacturing Headquarters, 2 Pages (Feb. 27, 1996).

Press Release, "ParkerVision, Inc. Expands its Product Line," Parkervision Marketing and Manufacturing Headquarters, 2 Pages (Mar. 7, 1996).

Press Release, "ParkerVision Files Patents for its Research of Wireless Technology," Parkervision Marketing and Manufacturing Headquarters, 1 Page (Mar. 28, 1996).

Press Release, "Parkervision, Inc. Announces First Significant Sale of its Cameraman® Three-Chip System," Parkervision Marketing and Manufacturing Headquarters, 2 pages (Apr. 12, 1996).

Press Release, "Parkervision, Inc. Introduces New Product Line for Studio Production Market," Parkervision Marketing and Manufacturing Headquarters, 2 Pages (Apr. 15, 1996).

Press Release, "Parkervision, Inc. Announces Private Placement of 800,000 Shares," Parkervision Marketing and Manufacturing Headquarters, 1 Page (Apr. 15, 1996).

Press Release, "Parkervision, Inc. Announces First Quarter Financial Results," Parkervision Marketing and Manufacturing Headquarters, 3 Pages (Apr. 30, 1996).

Press Release, "ParkerVision's New Studio Product Wins Award," Parkervision Marketing and Manufacturing Headquarters, 2 Pages (Jun. 5, 1996).

Press Release, "Parkervision, Inc. Announces Second Quarter and Six Months Financial Results," Parkervision Marketing and Manufacturing Headquarters, 3 Pages (Aug. 1, 1996).

Press Release, "Parkervision, Inc. Announces Third Quarter and Nine Months Financial Results," Parkervision Marketing and Manufacturing Headquarters, 2 Pages (Oct. 29, 1996).

Press Release, "PictureTel and ParkerVision Sign Reseller Agreement," Parkervision Marketing and Manufacturing Headquarters, 2 Pages (Oct. 30, 1996).

Press Release, "CLI and ParkerVision Bring Enhanced Ease-of-Use to Videoconferencing," CLI/Parkervision, 2 Pages (Jan. 20, 1997).

Press Release, "Parkervision, Inc. Announces Fourth Quarter and Year End Results," Parkervision Marketing and Manufacturing Headquarters, 3 Pages (Feb. 27, 1997).

Press Release, "Parkervision, Inc. Announces First Quarter Financial Results," Parkervision Marketing and Manufacturing Headquarters, 3 Pages (Apr. 29, 1997).

Press Release, "NEC and Parkervision Make Distance Learning Closer," NEC America, 2 Pages (Jun. 18, 1997).

Press Release, "Parkervision Supplies JPL with Robotic Cameras, Cameraman Shot Director for Mars Mission," Parkervision Marketing and Manufacturing Headquarters, 2 Pages (Jul. 8, 1997).

Press Release, "ParkerVision and IBM Join Forces to Create Wireless Computer Peripherals," Parkervision Marketing and Manufacturing Headquarters, 2 Pages (Jul. 23, 1997).

Press Release, "ParkerVision, Inc. Announces Second Quarter and Six Months Financial Results," Parkervision Marketing and Manufacturing Headquarters, 3 Pages (Jul. 31, 1997).

Press Release, "Parkervision, Inc. Announces Private Placement of 990,000 Shares," Parkervision Marketing and Manufacturing Headquarters, 2 Pages (Sep. 8, 1997).

Press Release, "Wal-Mart Chooses Parkervision for Broadcast Production," Parkervision Marketing and Manufacturing Headquarters, 2 Pages (Oct. 24, 1997).

Press Release, "Parkervision, Inc. Announces Third Quarter Financial Results," Parkervision Marketing and Manufacturing Headquarters, 3 Pages (Oct. 30, 1997).

Press Release, "ParkerVision Announces Breakthrough in Wireless Radio Frequency Technology," Parkervision Marketing and Manufacturing Headquarters, 3 Pages (Dec. 10, 1997).

Press Release, "Parkervision, Inc. Announces the Appointment of Joseph F. Skovron to the Position of Vice President, Licensing—Wireless Technologies," Parkervision Marketing and Manufacturing Headquarters, 2 Pages (Jan. 9, 1998).

Press Release, "Parkervision Announces Existing Agreement with IBM Terminates—Company Continues with Strategic Focus Announced in December," Parkervision Marketing and Manufacturing Headquarters, 2 Pages (Jan. 27, 1998).

Press Release, "Laboratory Tests Verify Parkervision Wireless Technology," Parkervision Marketing and Manufacturing Headquarters, 2 Pages (Mar. 3, 1998).

Press Release, "Parkervision, Inc. Announces Fourth Quarter and Year End Financial Results," Parkervision Marketing and Manufacturing Headquarters, 3 Pages (Mar. 5, 1998).

Press Release, "Parkervision Awarded Editors' Pick of Show for NAB 98," Parkervision Marketing and Manufacturing Headquarters, 2 Pages (Apr. 15, 1998).

Press Release, "Parkervision Announces First Quarter Financial Results," Parkervision Marketing and Manufacturing Headquarters, 3 Pages (May 4, 1998).

Press Release, "Parkervision 'DIRECT2DATA' Introduced in Response to Market Demand," Parkervision Marketing and Manufacturing Headquarters, 3 Pages (Jul. 9, 1998).

Press Release, "Parkervision Expands Senior Management Team," Parkervision Marketing and Manufacturing Headquarters, 2 Pages (Jul. 29, 1998).

Press Release, "Parkervision Announces Second Quarter and Six Month Financial Results," Parkervision Marketing and Manufacturing Headquarters, 4 Pages (Jul. 30, 1998).

Press Release, "Parkervision Announces Third Quarter and Nine Month Financial Results," Parkervision Marketing and Manufacturing Headquarters, 3 Pages (Oct. 30, 1998).

Press Release, "Questar Infocomm, Inc. Invests $5 Million in Parkervision Common Stock," Parkervision Marketing and Manufacturing Headquarters, 3 Pages (Dec. 2, 1998).

Press Release, "Parkervision Adds Two New Directors," Parkervision Marketing and Manufacturing Headquarters, 2 Pages (Mar. 5, 1999).

Press Release, "Parkervision Announces Fourth Quarter and Year End Financial Results," Parkervision Marketing and Manufacturing Headquarters, 3 Pages (Mar. 5, 1999).

Press Release, "Joint Marketing Agreement Offers New Automated Production Solution," Parkervision Marketing and Manufacturing Headquarters, 2 Pages (Apr. 13, 1999).

"Project Cost 205: Scintillations in Earth-satellite links," *Alta Frequenza: Scientific Review in Electronics*, AEI, vol. LIV, No. 3, pp. 209-211 (May-Jun. 1985).

Razavi, B., *RF Microelectronics*, Prentice-Hall, pp. 147-149 (1998).

Reeves, R.J.D., "The Recording and Collocation of Waveforms (Part 1)," *Electronic Engineering*, Morgan Brothers Limited, vol. 31, No. 373, pp. 130-137 (Mar. 1959).

Reeves, R.J.D., "The Recording and Collocation of Waveforms (Part 2)," *Electronic Engineering*, Morgan Brothers Limited, vol. 31, No. 374, pp. 204-212 (Apr. 1959).

Rein, H.M. and Zahn, M., "Subnanosecond-Pulse Generator with Variable Pulsewidth Using Avalanche Transistors," *Electronics Letters*, IEE, vol. 11, No. 1, pp. 21-23 (Jan. 9, 1975).

Riad, S.M. and Nahman, N.S., "Modeling of the Feed-through Wideband (DC to 12.4 Ghz) Sampling-Head," *IEEE MTT-S International Microwave Symposium Digest*, IEEE, pp. 267-269 (Jun. 27-29, 1978).

Rizzoli, V. et al., "Computer-Aided Noise Analysis of MESFET and HEMT Mixers," *IEEE Transactions on Microwave Theory and Techniques*, IEEE, vol. 37, No. 9, pp. 1401-1410 (Sep. 1989).

Rowe, H.E., *Signals and Noise in Communication Systems*, D. Van Nostrand Company, Inc., Princeton, New Jersey, including, for example, Chapter V, Pulse Modulation Systems (1965).

Rucker, F. and Dintelmann, F., "Effect of Antenna Size on OTS Signal Scintillations and Their Seasonal Dependence," *Electronics Letters*, IEE, vol. 19, No. 24, pp. 1032-1034 (Nov. 24, 1983).

Russell, R. and Hoare, L., "Millimeter Wave Phase Locked Oscillators," *Military Microwaves '78 Conference Proceedings*, Microwave Exhibitions and Publishers, pp. 238-242 (Oct. 25-27, 1978).

Sabel, L.P., "A DSP Implementation of a Robust Flexible Receiver/Demultiplexer for Broadcast Data Satellite Communications," *The Institution of Engineers Australia Communications Conference*, Institution of Engineers, Australia, pp. 218-223 (Oct. 16-18, 1990).

Salous, S., "IF digital generation of FMCW waveforms for wideband channel characterization," *IEE Proceedings-I*, IEE, vol. 139, No. 3, pp. 281-288 (Jun. 1992).

"Sampling Loops Lock Sources to 23 Ghz," *Microwaves & RF*, Penton Publishing, p. 212 (Sep. 1990).

Sasikumar, M. et al., "Active Compensation in the Switched-Capacitor Biquad," *Proceedings of the IEEE*, IEEE, vol. 71, No. 8, pp. 1008-1009 (Aug. 1983).

Saul, P.H., "A GaAs MESFET Sample and Hold Switch," *Fifth European Solid State Circuits Conference-ESSCIRC 79*, IEE, pp. 5-7 (1979).

Shen, D.H. et al., "A 900-MHZ RF Front-End with Integrated Discrete-Time Filtering," *IEEE Journal of Solid-State State Circuits*, IEEE Solid-State Circuits Council, vol. 31, No. 12, pp. 1945-1954 (Dec. 1996).

Shen, X.D. and Vilar, E., "Anomalous transhorizon propagation and meteorological processes of a multilink path," *Radio Science*, American Geophysical Union, vol. 30, No. 5, pp. 1467-1479 (Sep.-Oct. 1995).

Shen, X. and Tawfik, A.N., "Dynamic Behaviour of Radio Channels Due to Trans-Horizon Propagation Mechanisms," *Electronics Letters*, IEE, vol. 29, No. 17, pp. 1582-1583 (Aug. 19, 1993).

Shen, X. et al., "Modeling Enhanced Spherical Diffraction and Troposcattering on a Transhorizon Path with aid of the parabolic Equation and Ray Tracing Methods," *IEE Colloquium on Common modeling techniques for electromagnetic wave and acoustic wave propagation*, IEE, pp. 4/1-4/7 (Mar. 8, 1996).

Shen, X. and Vilar, E., "Path loss statistics and mechanisms of transhorizon propagation over a sea path," *Electronics Letters*, IEE, vol. 32, No. 3, pp. 259-261 (Feb. 1, 1996).

Shen, D. et al., "A 900 MHZ Integrated Discrete-Time Filtering RF Front-End," *IEEE International Solid State Circuits Conference*, IEEE, vol. 39, pp. 54-55 and 417 (Feb. 1996).

Spillard, C. et al., "X-Band Tropospheric Transhorizon Propagation Under Differing Meteorological Conditions," *Sixth International Conference on Antennas and Propagation (ICAP 89) Part 2: Propagation*, IEE, pp. 451-455 (Apr. 4-7, 1989).

Stafford, K.R. et al., "A Complete Monolithic Sample/Hold Amplifier," *IEEE Journal of Solid-State Circuits*, IEEE, vol. SC-9, No. 6, pp. 381-387 (Dec. 1974).

Staruk, W. Jr. et al., "Pushing HF Data Rates," *Defense Electronics*, EW Communications, vol. 17, No. 5, pp. 211, 213, 215, 217, 220 and 222 (May 1985).

Stephenson, A.G., "Digitizing multiple RF signals requires an optimum sampling rate," *Electronics*, McGraw-Hill, Hill, pp. 106-110 (Mar. 27, 1972).

Sugarman, R., "Sampling Oscilloscope for Statistically Varying Pulses," *The Review of Scientific Instruments*, American Institute of Physics, vol. 28, No. 11, pp. 933-938 (Nov. 1957).

Sylvain, M., "Experimental probing of multipath microwave channels," *Radio Science*, American Geophysical Union, vol. 24, No. 2, pp. 160-178 (Mar.-Apr. 1989).

Takano, T., "Novel GaAs Pet Phase Detector Operable to Ka Band," *IEEE MT-S Digest*, IEEE, pp. 381-383 (1984).

Tan, M.A., "Biquadratic Transconductance Switched-Capacitor Filters," *IEEE Transactions on Circuits and Systems-I: Fundamental Theory and Applications*, IEEE Circuits and Systems Society, vol. 40, No. 4, pp. 272-275 (Apr. 1993).

Tanaka, K. et al., "Single Chip Multisystem AM Stereo Decoder IC," *IEEE Transactions on Consumer Electronic*, IEEE Consumer Electronics Society, vol. CE-32, No. 3, pp. 482-496 (Aug. 1986).

Tawfik, A.N., "Amplitude, Duration and Predictability of Long Hop Trans-Horizon X-band Signals Over the Sea," *Electronics Letters*, IEE, vol. 28, No. 6, pp. 571-572 (Mar. 12, 1992).

Tawfik, A.N. and Viler, E., "Correlation of Transhorizon Signal Level Strength with Localized Surface Meteorological Parameters," *Eighth International Conference on Antennas and Propagation*, Electronics Division of the IEE, pp. 335-339 (Mar. 30-Apr. 2, 1993).

Tawfik, A.N. and Vilar, E., "Dynamic Structure of a Transhorizon Signal at X-band Over a Sea Path," *Sixth International Conference on Antennas and Propagation (ICAP 89) Part 2: Propagation*, IEE, pp. 446-450 (Apr. 4-7, 1989).

Tawfik, A.N. and Vilar, E., "Statistics of Duration and Intensity of Path Loss in a Microwave Transhorizon Sea-Path," *Electronics Letters*, IEE, vol. 26, No. 7, pp. 474-476 (Mar. 29, 1990).

Tawfik, A.N. and Vilar, E., "X-Band Transhorizon Measurements of CW Transmissions Over the Sea—Part 1: Path Loss, Duration of Events, and Their Modeling," *IEEE Transactions on Antennas and Propagation*, IEEE Antennas and Propagation Society, vol. 41, No. 11, pp. 1491-1500 (Nov. 1993).

Temes, G.C. and Tsividis, T., "The Special Section on Switched-Capacitor Circuits," *Proceedings of the IEEE*, IEEE, vol. 71, No. 8, pp. 915-916 (Aug. 1983).

Thomas, G.B., *Calculus and Analytic Geometry*, Third Edition, Addison-Wesley Publishing, pp. 119-133 (1960).

Tomassetti, Q., "An Unusual Microwave Mixer," *16th European Microwave Conference*, Microwave Exhibitions and Publishers, pp. 754-759 (Sep. 8-12, 1986).

Tortoli, P. et al., "Bidirectional Doppler Signal Analysis Based on a Single RF Sampling Channel," *IEEE Transactions on Ultrasonics, Ferroelectrics, and Frequency Control*, IEEE Ultrasonics, Ferroelectrics, and Frequency Control Society, vol. 41, No. 1, pp. 1-3 (Jan. 1984).

Tsividis, Y. and Antognetti, P. (Ed.), *Design of MOS VLSI Circuits for Telecommunications*, Prentice-Hall, p. 304 (1985).

Tsividis, Y., "Principles of Operation and Analysis of Switched-Capacitor Circuits," *Proceedings of the IEEE*, IEEE, vol. 71, No. 8, pp. 926-940 (Aug. 1983).

Tsurumi, H. and Maeda, T., "Design Study on a Direct Conversion Receiver Front-End for 280 MHZ, 900 MHZ, and 2.6 Ghz Band Radio Communication Systems," *41st IEEE Vehicular Technology Conference*, IEEE Vehicular Technology Society, pp. 457-462 (May 19-22, 1991).

Valdmanis, J.A. et al., "Picosecond and Subpicosend Optoelectronics for Measurements of Future High Speed Electronic Devices," *IEDM Technical Digest*, IEEE, pp. 597-600 (Dec. 5-7, 1983).

van de Kamp, M.M.J.L., "Asymmetric signal level distribution due to tropospheric scintillation," *Electronics Letters*, IEE, vol. 34, No. 11, pp. 1145-1146 (May 28, 1998).

Vasseur, H. and Vanhoenacker, D., "Characterization of tropospheric turbulent layers from radiosonde data," *Electronics Letters*, IEE, vol. 34, No. 4, pp. 318-319 (Feb. 19, 1998).

Verdone, R., "Outage Probability Analysis for Short-Range Communication Systems at 60 Ghz in ATT Urban Environments," *IEEE Transactions on Vehicular Technology*, IEEE Vehicular Technology Society, vol. 46, No. 4, pp. 1027-1039 (Nov. 1997).

Vierira-Ribeiro, S.A., *Single-IF DECT Receiver Architecture using a Quadrature Sub-Sampling Band-Pass Sigma-Delta Modulator*, Thesis for Degree of Master's of Engineering, Carleton University, UMI Dissertation Services, pp. 1-180 (Apr. 1995).

Vilar, E. et al., "A Comprehensive/Selective MM-Wave Satellite Downlink Experiment on Fade Dynamics," *Tenth International Conference on Antennas and Propagation*, Electronics Division of the IEE, pp. 2.98-2.101 (Apr. 14-17, 1997).

Vilar, E. et al., "A System to Measure LOS Atmospheric Transmittance at 19 Ghz," *AGARD Conference Proceedings No. 346: Characteristics of the Lower Atmosphere Influencing Radio Wave Propagation*, AGARD, pp. 8-1 - 8-16 (Oct. 4-7, 1983).

Vilar, E. and Smith, H., "A Theoretical and Experimental Study of Angular Scintillations in Earth Space Paths," *IEEE Transactions on Antennas and Propagation*, IEEE, vol. AP-34, No. 1, pp. 2-10 (Jan. 1986).

Vilar, E. et al., "A Wide Band Transhorizon Experiment at 11.6 Ghz," *Eighth International Conference on Antennas and Propagation*, Electronics Division of the IEE, pp. 441-445 (Mar. 30-Apr. 2, 1993).

Vilar, E. and Matthews, P.A. "Amplitude Dependence of Frequency in Oscillators," *Electronics Letters*, IEE, vol. 8, No. 20, pp. 509-511 (Oct. 5, 1972).

Vilar, E. et al., "An experimental mm-wave receiver system for measuring phase noise due to atmospheric turbulence," *Proceedings of the 25th European Microwave Conference*, Nexus House, pp. 114-119 (1995).

Vilar, E. and Burgueño, A., "Analysis and Modeling of Time Intervals Between Rain Rate Exceedances in the Context of Fade Dynamics," *IEEE Transactions on Communications*, IEEE Communications Society, vol. 39, No. 9, pp. 1306-1312 (Sep. 1991).

Vilar, E. et al., "Angle of Arrival Fluctuations in High and Low Elevation Earth Space Paths," *Fourth International Conference on Antennas and Propagation (ICAP 85)*, Electronics Division of the IEE, pp. 83-88 (Apr. 16-19, 1985).

Vilar, E., "Antennas and Propagation: A Telecommunications Systems Subject," *Electronics Division Colloquium on Teaching Antennas and Propagation to Undergraduates*, IEE, pp. 7/1-7/6 (Mar. 8, 1988).

Vilar, E. et al., "CERS*. Millimetre-Wave Beacon Package and Related Payload Doppler Correction Strategies," *Electronics Division Colloquium on CERS—Communications Engineering Research Satellite*, IEE, pp. 10/1-10/10 (Apr. 10, 1984).

Vilar, E. and Moulsley, T.J., "Comment and Reply: Probability Density Function of Amplitude Scintillations," *Electronics Letters*, IEE, vol. 21, No. 14, pp. 620-622 (Jul. 4, 1985).

Vilar, E. et al., "Comparison of Rainfall Rate Duration Distributions for ILE-IFE and Barcelona," *Electronics Letters*, IEE, vol. 28, No. 20, pp. 1922-1924 (Sep. 24, 1992).

Vilar, E., "Depolarization and Field Transmittances in Indoor Communications," *Electronics Letters*, IEE, vol. 27, No. 9, pp. 732-733 (Apr. 25, 1991).

Vilar, E. and Larsen, J.R., "Elevation Dependence of Amplitude Scintillations on Low Elevation Earth Space Paths," *Sixth International Conference on Antennas and Propagation (ICAP 89) Part 2: Propagation*, IEE, pp. 150-154 (Apr. 4-7, 1989).

Vilar, E. et al., "Experimental System and Measurements of Transhorizon Signal Levels at 11 Ghz," *18th European Microwave Conference*, Microwave Exhibitions and Publishers Ltd., pp. 429-435 (Sep. 12-15, 1988).

Vilar, E. and Matthews, P.A., "Importance of Amplitude Scintillations in Millimetric Radio Links," *Proceedings of the 4th European Microwave Conference, Microwave Exhibitions and Publishers*, pp. 202-206 (Sep. 10-13, 1974).

Vilar, E. and Haddon, J., "Measurement and Modeling of Scintillation Intensity to Estimate Turbulence Parameters in an Earth-Space Path," *IEEE Transactions on Antennas and Propagation*, IEEE Antennas and Propagation Society, vol. AP-32, No. 4, pp. 340-346 (Apr. 1984).

Vilar, E. and Matthews, P.A., "Measurement of Phase Fluctuations on Millimetric Radiowave Propagation," *Electronics Letters*, IEE, vol. 7, No. 18, pp. 566-568 (Sep. 9, 1971).

Vilar, E. and Wan, K.W., "Narrow and Wide Band Estimates of Field Strength for Indoor Communications in the Millimetre Band," *Electronics Division Colloquium on Radiocommunications in the Range 30-60 Ghz*, IEE, pp. 5/1-5/8 (Jan. 17, 1991).

Vilar, E. and Faulkner, N.D., "Phase Noise and Frequency Stability Measurements. Numerical Techniques and Limitations," *Electronics Division Colloquium on Low Noise Oscillators and Synthesizer*, IEE, 5 pages (Jan. 23, 1986).

Vilar, E. and Senin, S., "Propagation phase noise identified using 40 Ghz satellite downlink," *Electronics Letters*, IEE, vol. 33, No. 22, pp. 1901-1902 (Oct. 23, 1997).

Vilar, E. et al., "Scattering and Extinction: Dependence Upon Raindrop Size Distribution in Temperate (Barcelona) and Tropical (Belem) Regions," *Tenth International Conference on Antennas and Propagation*, Electronics Division of the IEE, pp. 2.230-2.233 (Apr. 14-17, 1997).

Viler, E. and Haddon, J., "Scintillation Modeling and Measurement—A Tool for Remote-Sensing Slant Paths," *AGARD Conference Proceedings No. 332: Propagation Aspects of Frequency Sharing, Interference and System Diversity*, AGARD, pp. 27-1-27-13 (Oct. 18-22, 1982).

Vilar, E., "Some Limitations on Digital Transmission Through Turbulent Atmosphere," *International Conference on Satellite Communication Systems Technology*, Electronics Division of the IEE, pp. 169-187 (Apr. 7-10, 1975).

Viler, E. and Matthews, P.A., "Summary of Scintillation Observations in a 36 Ghz Link Across London," *International Conference on Antennas and Propagation Part 2: Propagation*, IEE, pp. 36-40 (Nov. 28-30, 1978).

Vilar, E. et al., "Wideband Characterization of Scattering Channels," *Tenth International Conference on Antennas and Propagation*, Electronics Division of the IEE, pp. 2.353-2.358 (Apr. 14-17, 1997).

Vollmer, A., "Complete GPS Receiver Fits on Two Chips," *Electronic Design*, Penton Publishing, pp. 50, 52, 54 and 56 (Jul. 6, 1998).

*Voltage and Time Resolution in Digitizing Oscilloscopes: Application Note 348*, Hewlett Packard, pp. 1-11 (Nov. 1986).

Wan, K.W. et al., "A Novel Approach to the Simultaneous Measurement of Phase and Amplitude Noises in Oscillator," *Proceedings of the 19th European Microwave Conference*, Microwave Exhibitions and Publishers Ltd., pp. 809-813 (Sep. 4-7, 1989).

Wan, K.W. et al., "Extended Variances and Autoregressive/Moving Average Algorithm for the Measurement and Synthesis of Oscillator Phase Noise," *Proceedings of the 43rd Annual Symposium on Frequency Control*, IEEE, pp. 331-335 (1989).

Wan, K.W. et al., "Wideband Transhorizon Channel Sounder at 11 Ghz," *Electronics Division Colloquium on High Bit Rate UHF/SHF Channel Sounders—Technology and Measurement*, IEE, pp. 3/1-3/5 (Dec. 3, 1993).

Wang, H., "A 1-V Multigigahertz RF Mixer Core in 0.5—µm CMOS," *IEEE Journal of Solid-State Circuits*, IEEE Solid-State Circuits Society, vol. 33, No. 12, pp. 2265-2267 (Dec. 1998).

Watson, A.W.D. et al., "Digital Conversion and Signal Processing for High Performance Communications Receivers," *Digital Processing of Signals in Communications*, Institution of Electronic and Radio Engineers, pp. 367-373 (Apr. 22-26, 1985).

Weast, R.C. et al. (Ed.), *Handbook of Mathematical Tables*, Second Edition, The Chemical Rubber Co., pp. 480-485 (1964).

Wiley, R.G., "Approximate FM Demodulation Using Zero Crossings," *IEEE Transactions on Communications*, IEEE, vol. COM-29, No. 7, pp. 1061-1065 (Jul. 1981).

Worthman, W., "Convergence . . . Again," *RF Design*, Primedia, p. 102 (Mar. 1999).

Young, I.A. and Hodges, D.A., "MOS Switched-Capacitor Analog Sampled-Data Direct-Form Recursive Filters," *IEEE Journal of Solid-State Circuits*, IEEE, vol. SC-14, No. 6, pp. 1020-1033 (Dec. 1979).

Translation of Specification and Claims of FR Patent No. 2245130, 3 pages (Apr. 18, 1975—Date of publication of application).

Fest, Jean-Pierre, "Le Convertisseur A/N Revolutionne Le Recepteur Radio," *Electronique*, JMJ (Publisher), No. 54, pp. 40-42 (Dec. 1995).

Translation of DE Patent No. 35 41 031 A1, 22 pages (May 22, 1986—Date of publication of application).

Translation of EP Patent No. 0 732 803 A1, 9 pages (Sep. 18, 1996—Date of publication of application).

Fest, Jean-Pierre, "The A/D Converter Revolutionizes the Radio Receiver," *Electronique*, JMJ (Publisher), No. 54, 3 pages (Dec. 1995). (Translation of Doc. AQ50).

Translation of German Patent No. DE 197 35 798 C1, 8 pages (Jul. 16, 1998—Date of publication of application).

Miki, S. and Nagahama, R., *Modulation System II*, Common Edition 7, Kyoritsu Publishing Co., Ltd., pp. 146-154 (Apr. 30, 1956).

Miki, S. and Nagahama, R., *Modulation System II*, Common Edition 7, Kyoritsu Publishing Co., Ltd., pp. 146-149 (Apr. 30, 1956). (Partial Translation of Doc. AQ51).

Rabiner, L.R. and Gold, B., *Theory and Application of Digital Signal Processing*, Prentice-Hall, Inc., pp. v-xii and 40-46 (1975).

English-language Abstract of Japanese Patent Publication No. 08-032556, from http://www1.ipdl.jpo.go.jp, 2 Pages (Feb. 2, 1996—Date of publication of application).

English-language Abstract of Japanese Patent Publication No. 08-139524, from http://www1.ipdl.jpo.go.jp, 2 Pages (May 31, 1996—Date of publication of application).

English-language Abstract of Japanese Patent Publication No. 59-144249, from http://www1.ipdl.jpo.go.jp, 2 Pages (Aug. 18, 1984—Date of publication of application).

English-language Abstract of Japanese Patent Publication No. 63-054002, from http://www1.ipdl.jpo.go.jp, 2 Pages (Mar. 8, 1988—Date of publication of application).

English-language Abstract of Japanese Patent Publication No. 06-237276, from http://www1.ipdl.jpo.go.jp, 2 Pages (Aug. 23, 1994—Date of publication of application).

English-language Abstract of Japanese Patent Publication No. 08-023359, from http://www1.ipdl.jpo.go.jp, 2 Pages (Jan. 23, 1996—Date of publication of application).

Translation of Japanese Patent Publication No. 47-2314, 7 pages (Feb. 4, 1972—Date of publication of application).

Partial Translation of Japanese Patent Publication No. 58-7903, 3 pages (Jan. 17, 1983—Date of publication of application).

English-language Abstract of Japanese Patent Publication No. 58-133004, from http://www1.ipdl.jpo.go.jp, 2 Pages (Aug. 8, 1993—Date of publication of application).

English-language Abstract of Japanese Patent Publication No. 60-058705, from http://www1.ipdl.jpo.go.jp, 2 Pages (Apr. 4, 1985—Date of publication of application).

English-language Abstract of Japanese Patent Publication No. 04-123614, from http://www1.ipdl.jpo.go.jp, 2 Pages (Apr. 23, 1992—Date of publication of application).
English-language Abstract of Japanese Patent Publication No. 04-127601, from http://www1.ipdl.jpo.go.jp, 2 Pages (Apr. 28, 1992—Date of publication of application).
English-language Abstract of Japanese Patent Publication No. 05-175730, from http://www1.ipdl.jpo.go.jp, 2 Pages (Jul. 13, 1993—Date of publication of application).
English-language Abstract of Japanese Patent Publication No. 05-175734, from http://www1.ipdl.jpo.go.jp, 2 Pages (Jul. 13, 1993—Date of publication of application).
English-language Abstract of Japanese Patent Publication No. 07-154344, from http://www1.ipdl.jpo.go.jp, 2 Pages (Jun. 16, 1995—Date of publication of application).
English-language Abstract of Japanese Patent Publication No. 07-307620, from http://www1.ipdl.jpo.go.jp, 2 Pages (Nov. 21, 1995—Date of publication of application).
Oppenheim, A.V. and Schafer, R.W., *Digital Signal Processing*, Prentice-Hall, pp. vii-x, 6-35, 45-78, 87-121 and 136-165 (1975).
English-language Abstract of Japanese Patent Publication No. 55-066057, from http://www1.ipdl.jpo.go.jp, 2 Pages (May 19, 1980—Date of publication of application).
English-language Abstract of Japanese Patent Publication No. 63-065587, from http://www1.ipdl.jpo.go.jp, 2 Pages (Mar. 24, 1988—Date of publication of application).
English-language Abstract of Japanese Patent Publication No. 63-153691, from http://www1.ipdl.jpo.go.jp, 2 Pages (Jun. 27, 1988—Date of publication of application).
Translation of Japanese Patent Publication No. 60-130203, 3 pages (Jul. 11, 1985—Date of publication of application).
Razavi, B. "A 900-MHz/1.8-Ghz CMOS Transmitter for Dual-Band Applications," *Symposium on VLSI Circuits Digest of Technical Papers*, IEEE, pp. 128-131 (1998).
Ritter, G.M., "SDA, A New Solution for Transceivers," *16th European Microwave Conference*, Microwave Exhibitions and Publishers, pp. 729-733 (Sep. 8, 1986).
DIALOG File 351 (Derwent WPI) English Language Patent Abstract for FR 2 669 787, 1 page (May 29, 1992—Date of publication of application).
Akos, D.M. et al., "Direct Bandpass Sampling of Multiple Distinct RF Signals," *IEEE Transactions on Communications*, IEEE, vol. 47, No. 7, pp. 983-988 (Jul. 1999).
Patel, M. et al., "Bandpass Sampling for Software Radio Receivers, and the Effect of Oversampling on Aperture Jitter," *VTC 2002*, IEEE, pp. 1901-1905 (2002).
English-language Abstract of Japanese Patent Publication No. 61-030821, from http://www1.ipdl.jpo.go.jp, 2 Pages (Feb. 13, 1986—Date of publication of application).
English-language Abstract of Japanese Patent Publication No. 05-327356, from http://www1.ipdl.jpo.go.jp, 2 Pages (Dec. 10, 1993—Date of publication of application).
Tayloe, D. "A Low-noise, High-performance Zero IF Quadrature Detector/Preamplifier," *RF Design*, Primedia Business Magazines & Media, Inc., pp. 58, 60, 62 and 69 (Mar. 2003).
Dines, J.A.B. "Smart Pixel Optoelectronic Receiver Based on a Charge Sensitive Amplifier Design," *IEEE Journal of Selected Topics in Quantum Electronics*, IEEE, vol. 2, No. 1, pp. 117-120 (Apr. 1996).
Simoni, A. et al., "A Digital Camera for Machine Vision," *20th International Conference on Industrial Electronics*, Control and Instrumentation, IEEE, pp. 879-883 (Sep. 1994).
Stewart, R.W. and Pfann, E., "Oversampling and sigma-delta strategies for data conversion," *Electronics & Communication Engineering Journal*, IEEE, pp. 37-47 (Feb. 1998).
Rudell, J.C. et al., "A 1.9-Ghz Wide-Band IF Double Conversion CMOS Receiver for Cordless Telephone Applications," *IEEE Journal of Solid-State Circuits*, IEEE, vol. 32, No. 12, pp. 2071-2088 (Dec. 1997).
English-language Abstract of Japanese Patent Publication No. 09-036664, from http://www1.ipdl.jpo.go.jp, 2 Pages (Feb. 7, 1997—Date of publication of application).
Simoni, A. et al., "A Single-Chip Optical Sensor with Analog Memory for Motion Detection," *IEEE Journal of Solid-State Circtuits*, IEEE, vol. 30, No. 7, pp. 800-806 (Jul. 1995).
English Translation of German Patent Publication No. DE 196 48 915 A1, 10 pages.
Deboo, Gordon J., *Integrated Circuits and Semiconductor Devices*, 2nd Edition, McGraw-Hill, Inc., pp. 41-45 (1977).
Hellwarth, G.A. and Jones, G.D, "Automatic Conditioning of Speech Signals," *IEEE Transactions on Audio and Electroacoustics*, vol. AU-16, No. 2, pp. 169-179 (Jun. 1968).
English Abstract for German Patent No. DE 692 21 098 T2, 1 page, data supplied from the espacenet.
Gaudiosi, J., "Retailers will bundle Microsoft's Xbox with games and peripherals," *Video Store Magazine*, vol. 23, Issue 36, p. 8, 2 pages (Sep. 2-8, 2001).
English-language Translation of German Patent Publication No. DT 1936252, translation provided by Transperfect Translations, 12 pages (Jan. 28, 1971—Date of publication of application).
English-language Abstract of Japanese Patent Publication No. JP 62-12381, data supplied by the espacenet, 1 page (Jan. 21, 1987—Date of publication of application).
English-language Abstract of Japanese Patent Publication No. JP 4-154227, data supplied by the espacenet, 1 page (May 27, 1992—Date of publication of application).
English-language Abstract of Japanese Patent Publication No. JP 6-284038, data supplied by the espacenet, 1 page (Oct. 7, 1994—Date of publication of application).
English-language Abstract of Japanese Patent Publication No. JP 10-96778, data supplied by the espacenet, 1 page (Apr. 14, 1998—Date of publication of application).
English-language Abstract of Japanese Patent Publication No. JP 11-98205, data supplied by the espacenet, 1 page (Apr. 9, 1999—Date of publication of application).
English-language Abstract of Japanese Patent Publication No. JP 61-232706, data supplied by the espacenet, 1 page (Oct. 17, 1986—Date of publication of application).
English-language Abstract of Japanese Patent Publication No. JP 9-171399, data supplied by the espacenet, 1 page (Jun. 30, 1997—Date of publication of application).
English-language Abstract of Japanese Patent Publication No. JP 10-41860, data supplied by the espacenet, 1 page (Feb. 13, 1998—Date of publication of application).
English-language Computer Translation of Japanese Patent Publication No. JP 10-41860, provided by the JPO (Jun. 26, 1998—Date of publication of application) and cited in U.S. Appl. No. 10/305,299, directed to related subject matter.
*What is I/Q Data?*, printed Sep. 16, 2006, from http://zone.ni.com, 8 pages (Copyright 2003).
English-language Abstract of Japanese Patent Publication No. JP 58-031622, data supplied by ep.espacenet.com, 1 page (Feb. 24, 1983—Date of publication of application).
English-language Abstract of Japanese Patent Publication No. JP 61-245749, data supplied by ep.espacenet.com, 1 page (Nov. 1, 1986—Date of publication of application).
English-language Abstract of Japanese Patent Publication No. JP 64-048557, data supplied by ep.espacenet.com, 1 page (Feb. 23, 1989—Date of publication of application).
English-language Abstract of Japanese Patent Publication No. JP 59-022438, data supplied by ep.espacenet.com, 1 page (Feb. 4, 1984—Date of publication of application).
English-language Abstract of Japanese Patent Publication No. JP 59-123318, data supplied by ep.espacenet.com, 1 page (Jul. 17, 1984—Date of publication of application).
English-language Abstract of Japanese Patent Publication No. JP 61-193521, data supplied by ep.espacenet.com, 1 page (Aug. 28, 1986—Date of publication of application).
English-language Abstract of Japanese Patent Publication No. JP 62-047214, data supplied by ep.espacenet.com, 1 page (Feb. 28, 1987—Date of publication of application).
English-language Abstract of Japanese Patent Publication No. JP 63-274214, data supplied by ep.espacenet.com, 1 page (Nov. 11, 1988—Date of publication of application).

* cited by examiner

FIG. 3A
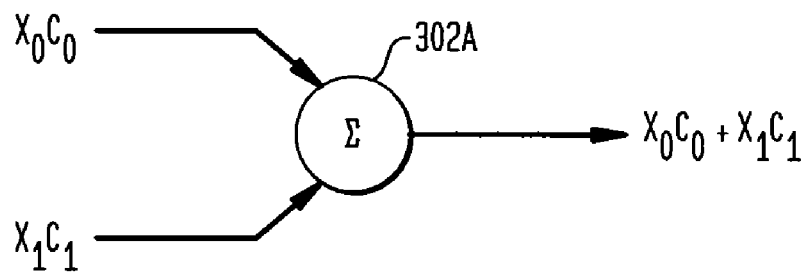
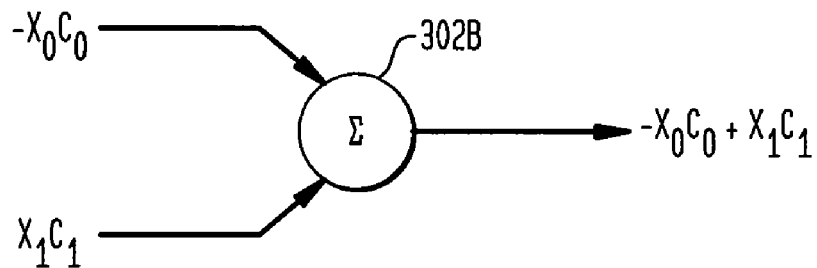
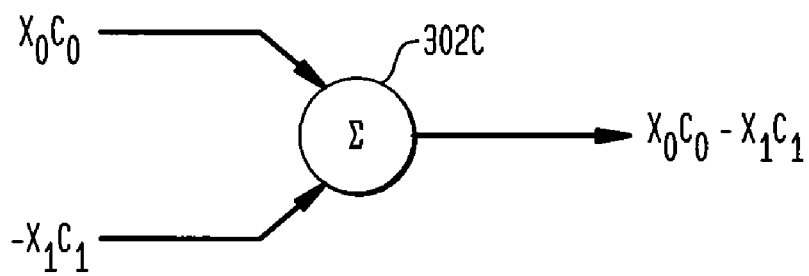
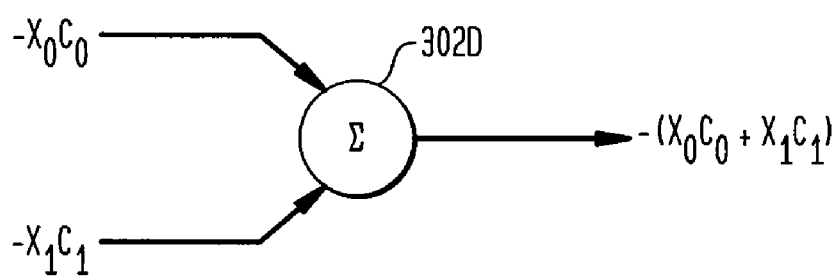

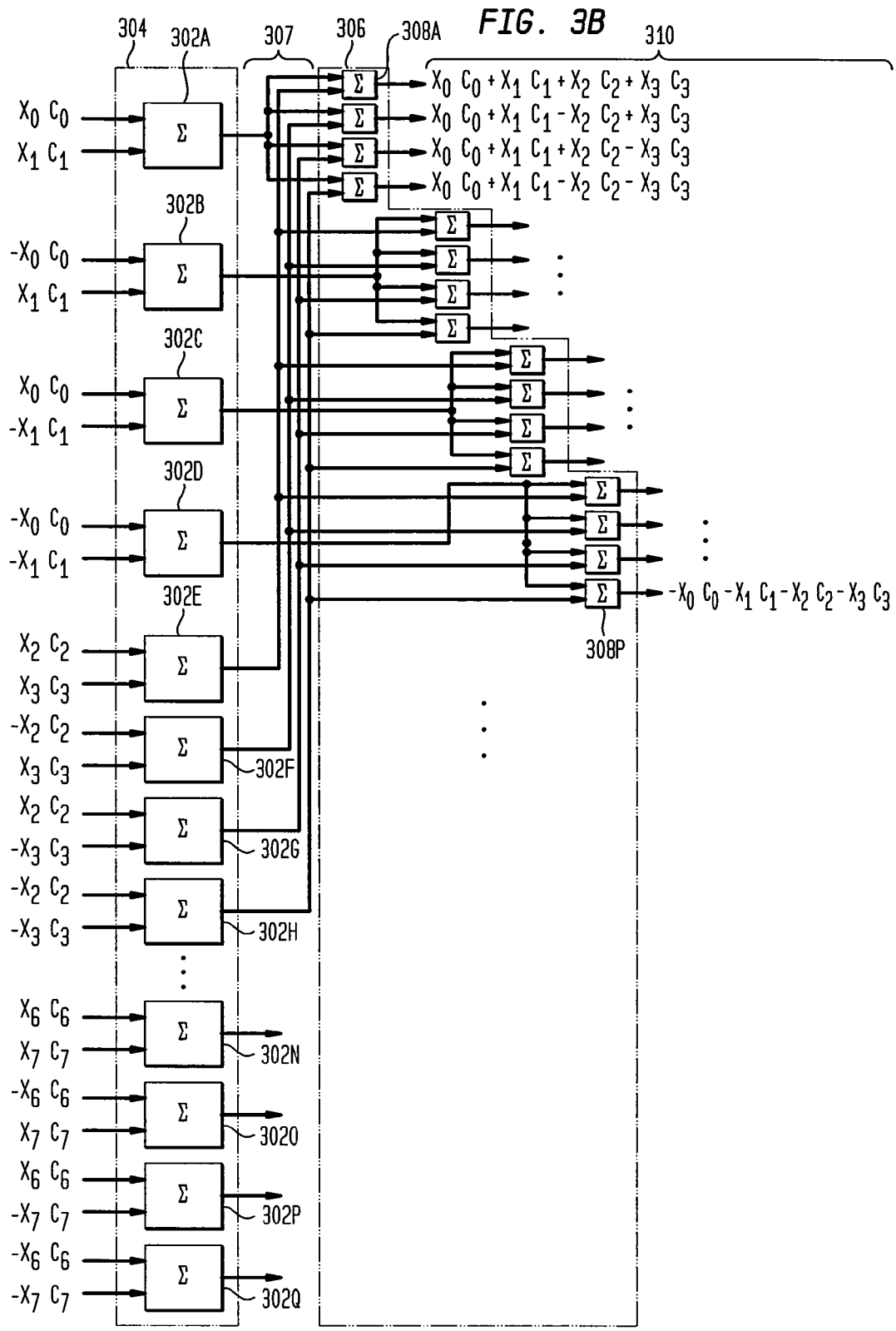

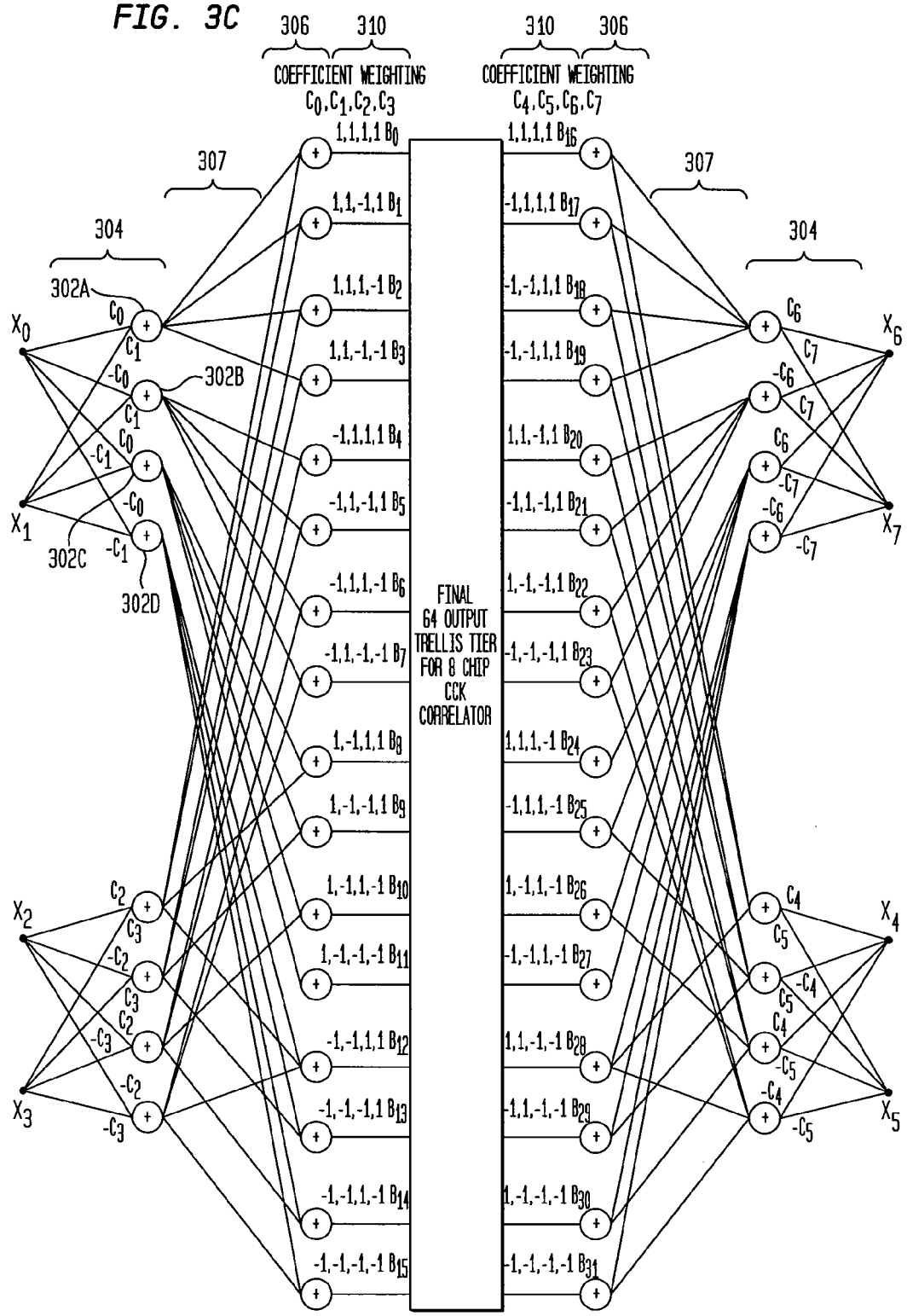

$$C_{k,m-1} = \begin{bmatrix} C_{0,0} & C_{0,1} & \cdots & C_{0,m-1} \\ C_{1,0} & & & \\ C_{2,0} & & & \\ \vdots & & & \\ C_{k,0} & & & C_{k,m-1} \end{bmatrix}$$

PSK FAST HADAMARD TRANSFORM

FIG. 8

802: MULTIPLYING $X_0$ WITH EACH STATE $C_{0(0)}$ THROUGH $C_{0(k-1)}$ OF THE COEFFICIENT $C_0$, THEREBY GENERATING RESULTS $X_0 C_{0(0)}$ THROUGH $X_0 C_{0(k-1)}$

↓

804: REPEAT STEP 802 FOR DATA BITS $(X_1 - X_{M-1})$ AND CORRESPONDING COEFFICIENTS $(C_1 - C_{M-1})$, RESPECTIVELY

↓

806: GROUPING THE RESULTS OF STEP 802 AND 804 INTO N GROUPS AND SUMMING COMBINATIONS WITHIN EACH OF THE N GROUPS, THEREBY GENERATING A FIRST LAYER OF CORRELATION RESULTS

↓

806A: PRUNE, IF APPLICABLE

↓

808: GROUPING THE RESULTS OF STEP 806 AND SUMMING COMBINATIONS OF RESULTS WITHIN EACH GROUP TO GENERATE ONE OR MORE ADDITIONAL LAYERS OF RESULTS, AND REPEATING THIS PROCESS UNTIL A FINAL LAYER OF RESULTS INCLUDES A SEPERATE CORRELATION OUTPUT FOR EACH POSSIBLE STATE OF THE COMPLETE SET OF COEFFICIENTS $(C_0 - C_{M-1})$

↓

808A: PRUNE, IF APPLICABLE

↓

810: COMPARING MAGNITUDES OUTPUT OF THE SEPERATE CORRELATION OUTPUTS, THEREBY IDENTIFYING A MOST LIKELY CODE ENCODED ON SAID DATA WORD

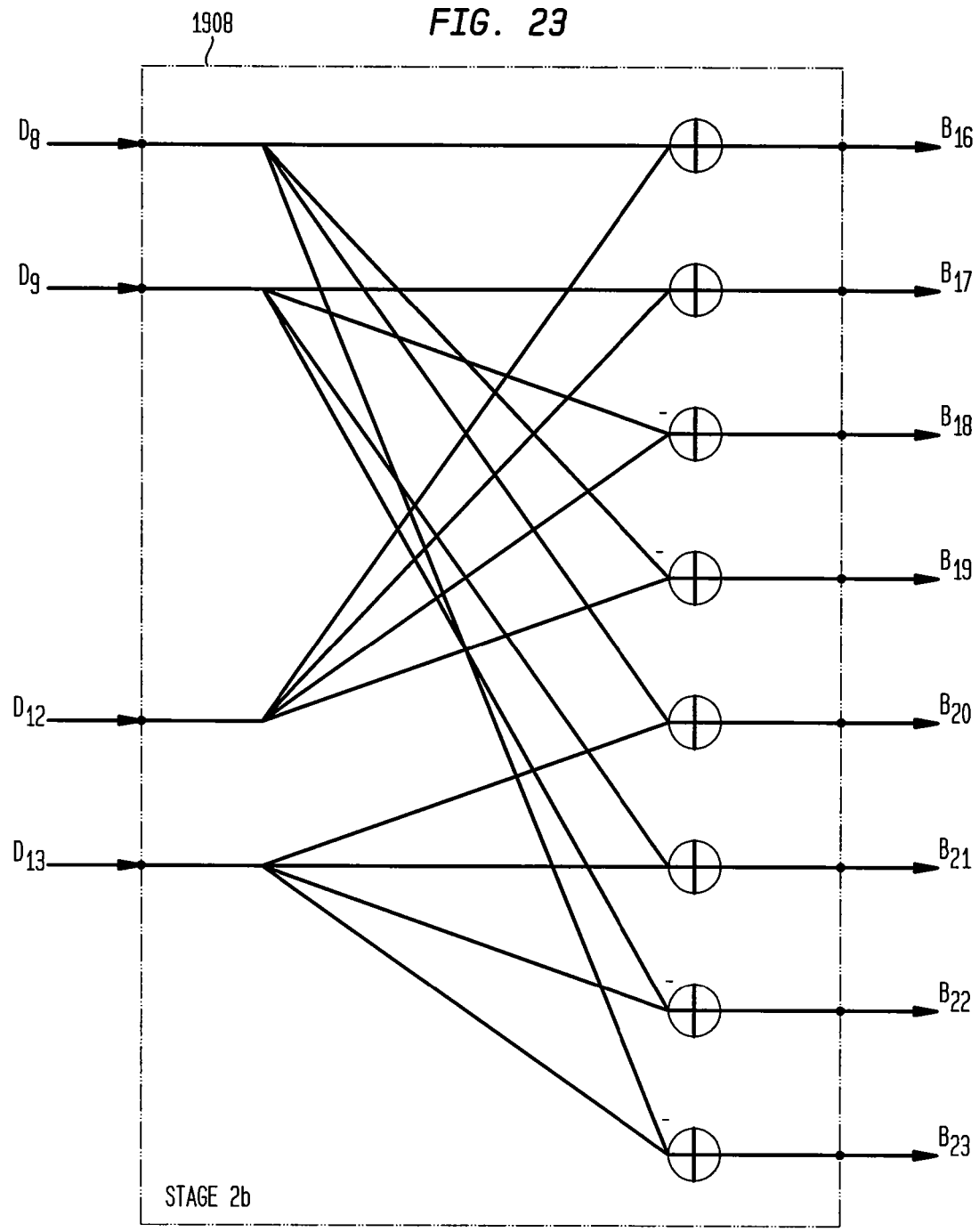

METHODS, SYSTEMS, AND COMPUTER PROGRAM PRODUCTS FOR PARALLEL CORRELATION AND APPLICATIONS THEREOF

CROSS-REFERENCE TO RELATED APPLICATIONS

This patent application is a divisional of U.S. non-provisional application Ser. No. 10/719,058, filed Nov. 24, 2003, which is a continuation-in-part of U.S. non-provisional application Ser. No. 09/987,193, filed Nov. 13, 2001, now U.S. Pat. No. 7,010,559, which claims priority to U.S. provisional application No. 60/248,001, filed Nov. 14, 2000, all of which are incorporated herein by reference in their entireties.

The following application of common assignee is related to the present application, and is herein incorporated by reference in its entirety: U.S. non-provisional application Ser. No. 09/550,644, titled "Method and System for Down-Converting an Electromagnetic Signal, Transforms for Same, and Aperture Relationships," filed Apr. 14, 2000.

BACKGROUND OF THE INVENTION

1. Field of the Invention

The present invention relates to matched filters and correlators and, more particularly, to a novel fast correlator transform ("FCT") and to methods and systems for implementing same.

2. Related Art

Matched Filter Theory was introduced by D. O. North in 1943. Others such as Van Vleck, Middleton, Weiner, and Turin, have added to the body of knowledge and application, ranging from RADAR to SONAR and communications. Although the basic theory was originally applied to continuous time systems and linear networks, the theory has been augmented to absorb discrete sampled filters and correlator operations. Indeed Paul Green pointed out in the June 1960 IRE Transactions on Information Theory, Matched Filter Issue:

"Correlation detection was studied at first as a separate subject, but the equivalence of the two operations (meaning matched filters and correlators) was soon appreciated."

IRE Transactions on Information Theory, New York, N.Y.: Professional Group on Information, Institute of Radio Engineers, June, 1960, incorporated herein by reference in its entirety.

More recently Van Whalen and Blahut as well as others have provided proofs of mathematical equivalence of correlation or matched filtering based on a change of variables formulation.

With the surge of DSP and proliferation of VLSI CMOS circuits as well as the universal push for software radios, many discrete matched filter realizations have evolved. The most notable digital implementation is the Transversal or Finite Impulse Response Filter which may realize the time flipped impulse response of the waveform to be processed or utilized as a correlator, both which produce the equivalent result at the optimum observation instant.

A particular concern arises when multiple filtering operations are required, concurrently, as is the case for parallel correlators. The complexity, clock speeds and signal flow control typically increase cost, size, and power.

What are needed are improved methods and systems for performing matched filtering and/or correlating functions, including concurrent and/or parallel correlations.

SUMMARY OF THE INVENTION

The present invention is directed to methods and systems for performing matched filtering and/or correlating functions, including concurrent and/or parallel correlations. More particularly, the present invention is directed to a fast correlator transform (FCT) algorithm and methods and systems for implementing same. The invention is useful for, among other things, correlating an encoded data word $(X_0\text{-}X_{M-1})$ with encoding coefficients $(C_0\text{-}C_{M-1})$, wherein each of $(X_0\text{-}X_{M-1})$ is represented by one or more bits and each coefficient is represented by one or more bits, wherein each coefficient has k possible states, and wherein M is greater than 1.

In accordance with the invention, $X_0$ is multiplied by each state $(C_{0(0)}$ through $C_{0(k-1)})$ of the coefficient $C_0$, thereby generating results $X_0 C_{0(0)}$ through $X_0 C_{0(k-1)}$. This is repeated for data bits $(X_1\text{-}X_{M-1})$ and corresponding coefficients $(C_1\text{-}C_{M-1})$, respectively. The results are grouped into N groups. Combinations within each of said N groups are added to one another, thereby generating a first layer of correlation results.

The first layer of results is grouped and the members of each group are summed with one another to generate a second layer of results. This process is repeated as necessary until a final layer of results is generated. The final layer of results includes a separate correlation output for each possible state of the complete set of coefficients $(C_0\text{-}C_{M-1})$. The results in the final layer are compared with one another to identify the most likely encoded data word.

In an embodiment, the summations are pruned to exclude summations that would result in invalid combinations of the encoding coefficients $(C_0\text{-}C_{M-1})$. In an embodiment, substantially the same hardware is utilized for processing in-phase and quadrature phase components of the data word $(X_0\text{-}X_{M-1})$. In an embodiment, the coefficients $(C_0\text{-}C_{M-1})$ represent real numbers. In an alternative embodiment, the coefficients $(C_0\text{-}C_{M-1})$ represent complex numbers. In an embodiment, the coefficients $(C_0\text{-}C_{M-1})$ are represented with a single bit. Alternatively, the coefficients $(C_0\text{-}C_{M-1})$ are represented with multiple bits (e.g., magnitude). In an embodiment, the coefficients $(C_0\text{-}C_{M-1})$ represent a cyclic code keying ("CCK") code set substantially in accordance with IEEE 802.11 WLAN standard.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The present invention will be described with reference to the accompanying drawings. The drawing in which an element first appears is typically indicated by the leftmost digit(s) in the corresponding reference number.

FIG. 3A illustrates example correlation kernels, in accordance with an aspect of the present invention.

FIG. 3B illustrates example first and second layers of an FCT processing hierarchy in accordance with an aspect of the invention.

FIG. 3C illustrates an example signal flow diagram for the first and second layers illustrated in FIG. 3B.

FIG. 8 illustrates an example process flowchart for implementing an FCT algorithm in accordance with an aspect of the present invention.

FIG. 23 is an example block diagram of stage 2b of the FCT 1900.

Figure 24A:
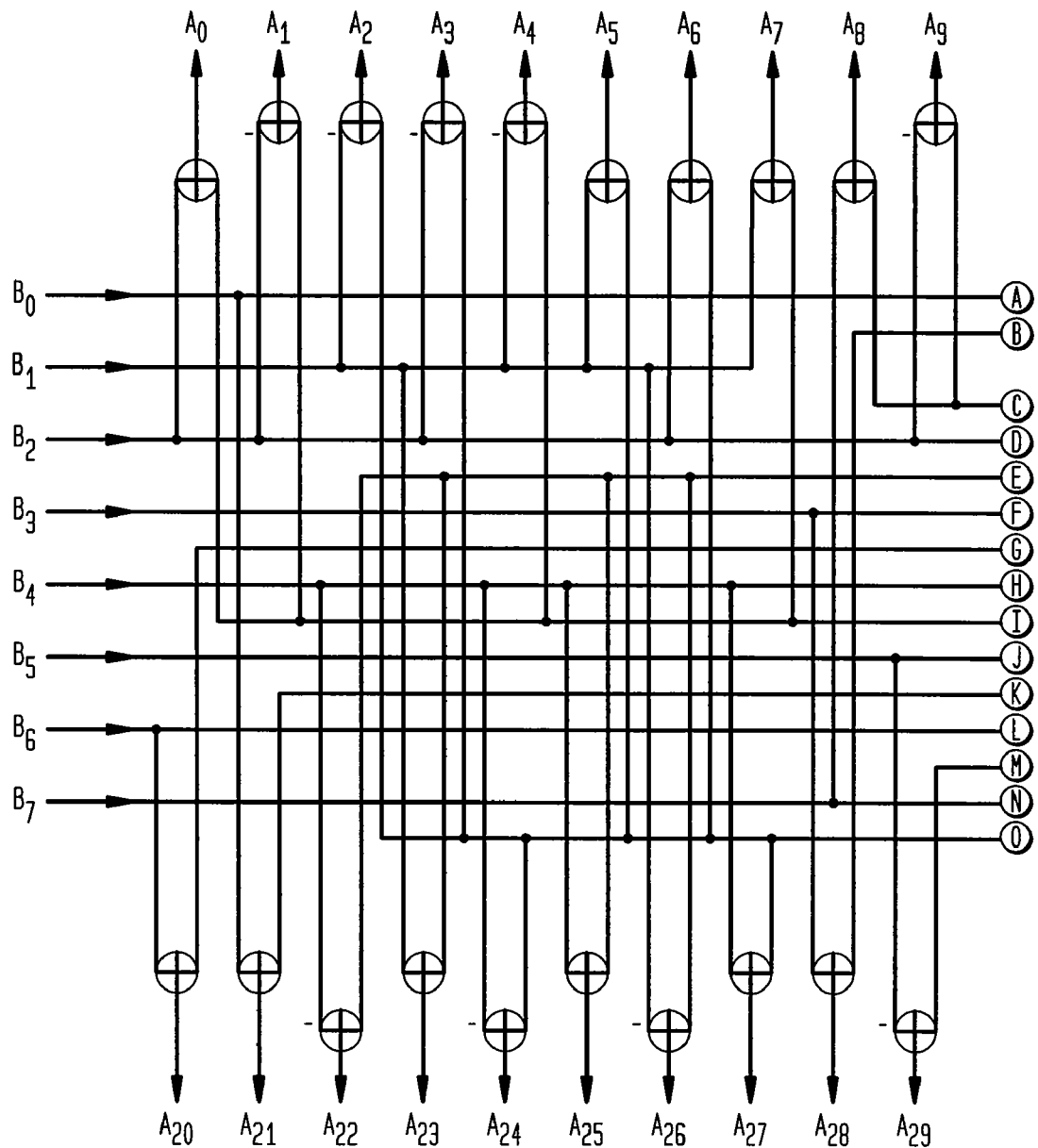

FIGS. 24A and B are an example block diagram of stage 3 of the FCT 1900.

Figure 25:
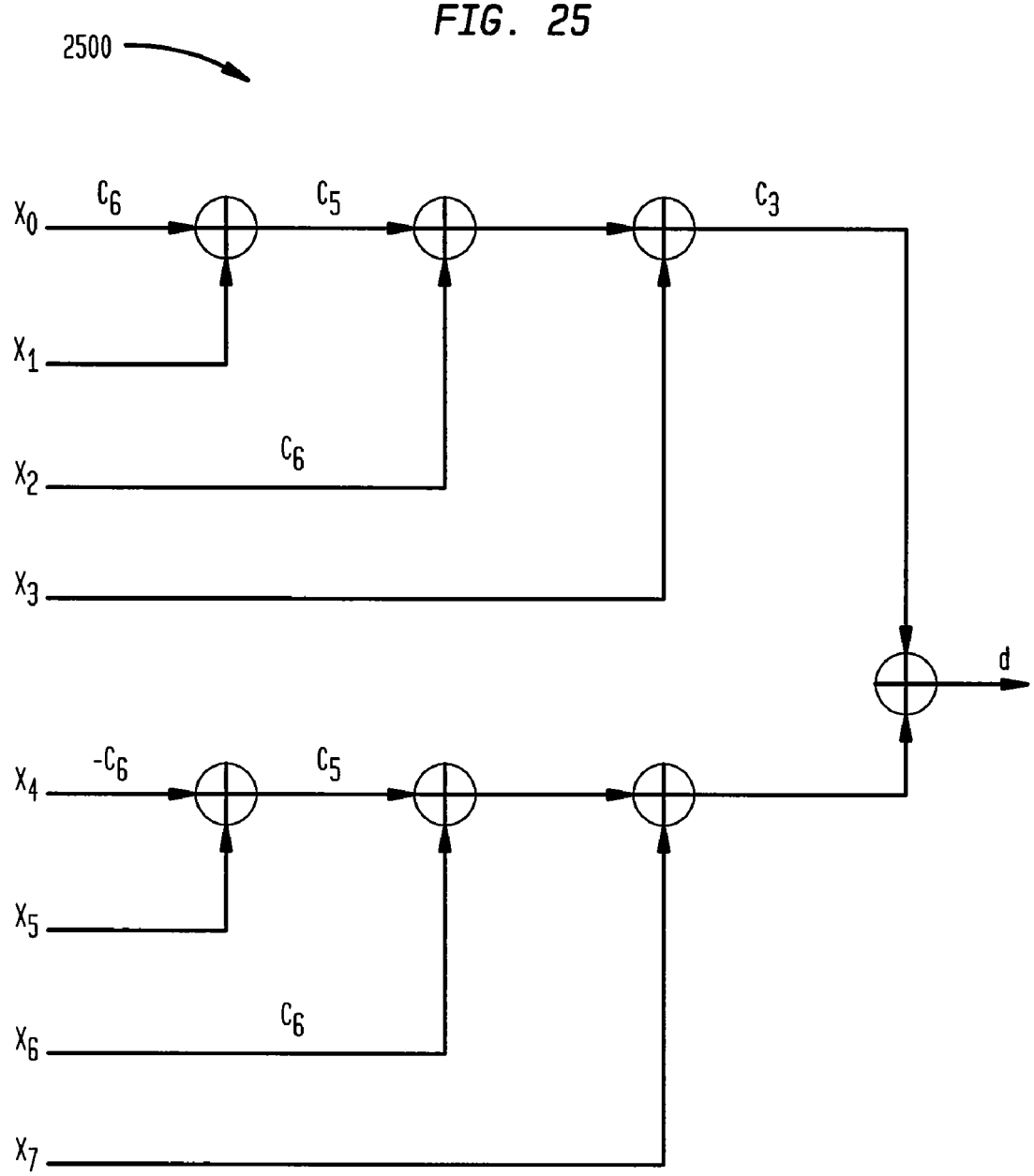

FIG. 25 illustrates an example structure 2500 for implementing equation 17.

Figure 26:
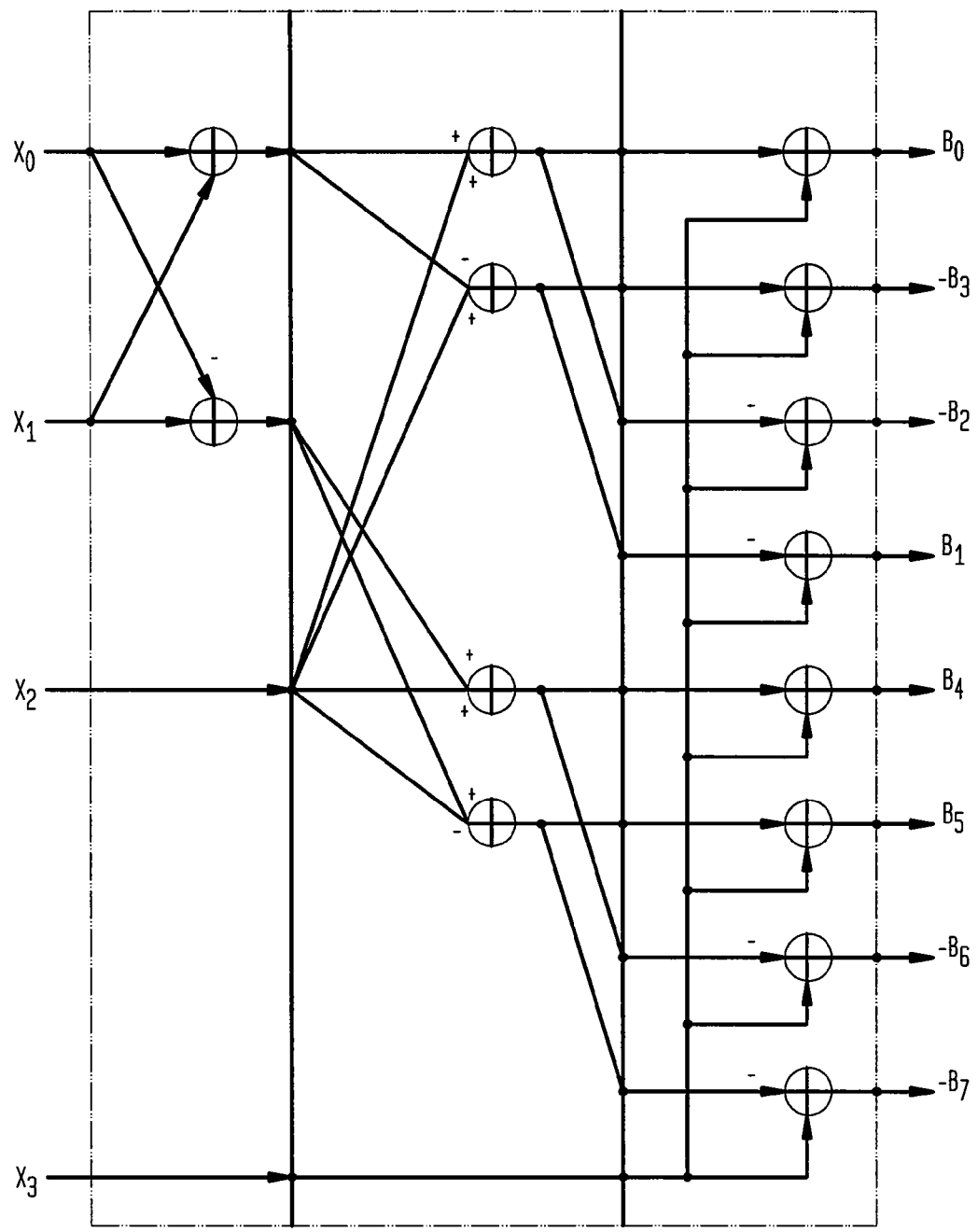

FIG. 26 is another example block diagram of stages of the FCT 1900.

Figure 27:
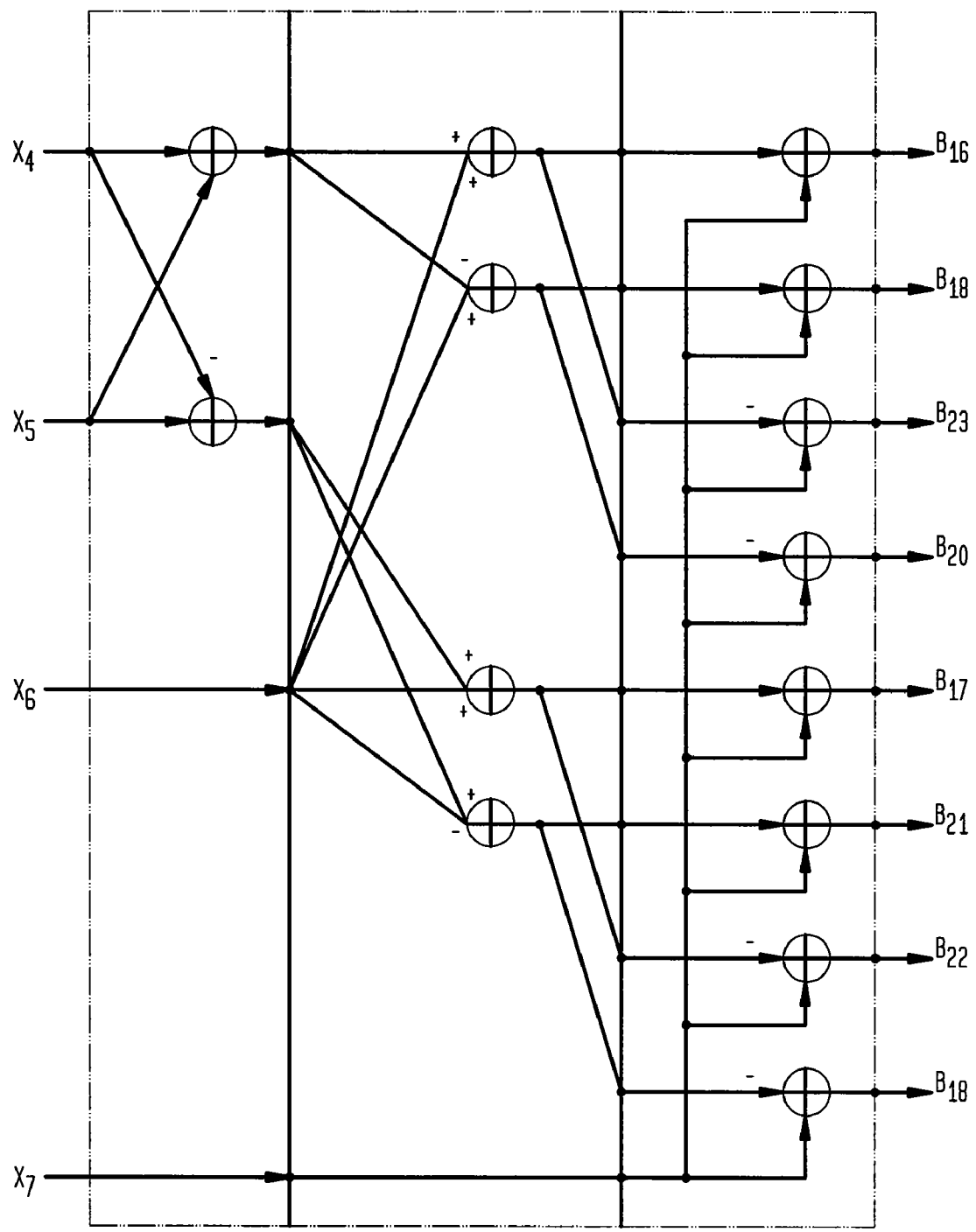

FIG. 27 is another example block diagram of stages of the FCT 1900.

DETAILED DESCRIPTION OF THE INVENTION

Figure 1:
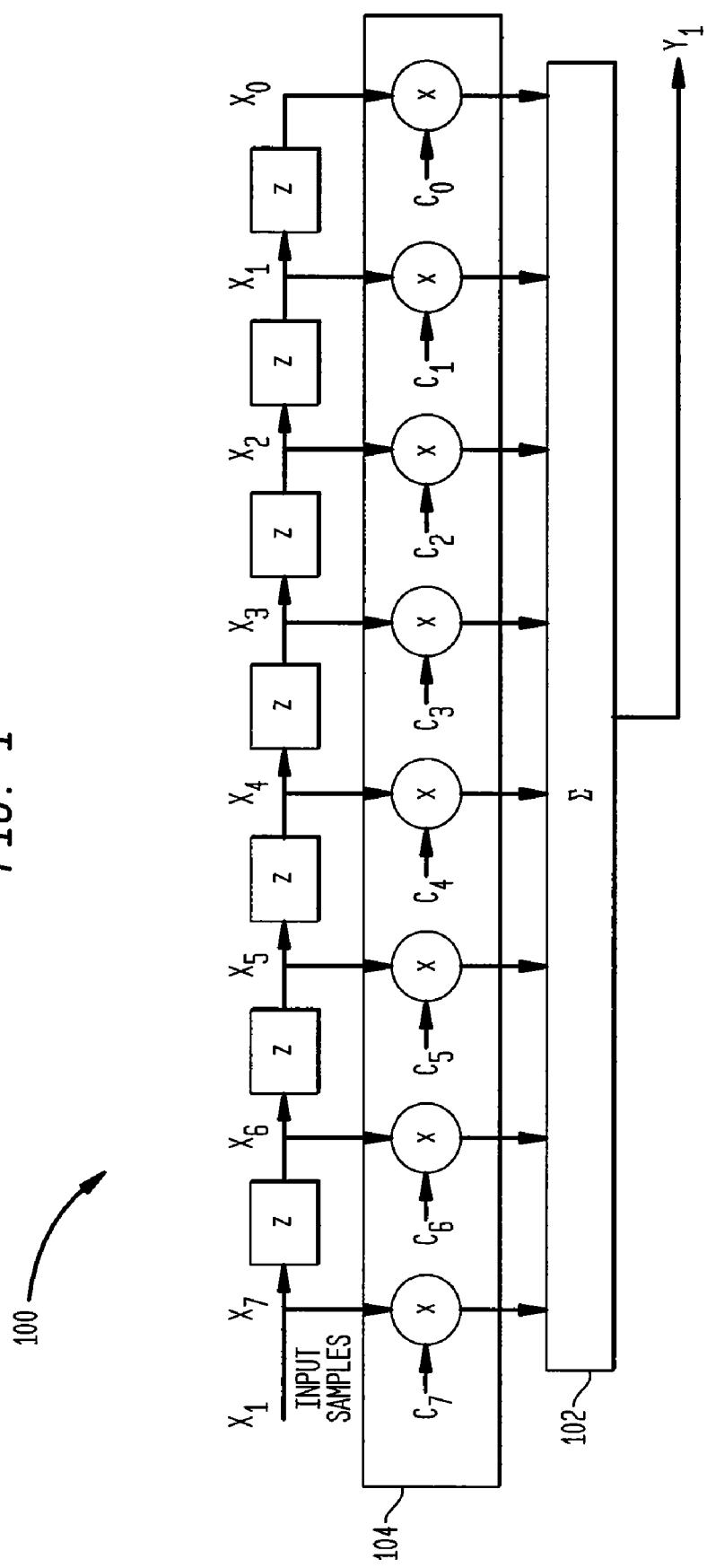
FIG. 1 is a block diagram of an example discrete transversal matched filter or correlator, in which the present invention can be implemented.

Table of Contents
I. Introduction
II. Example Environment: 802.11
III. Fast Correlator Transform and Correlator Kernels
IV. Mathematical Formulation
V. Comparisons to the Hadamard Transform
VI. Maximum Likelihood Decoding (AWGN, no Multipath)
   A. Magnitude Comparator
VII. Example Methods for Implementing the FCT Algorithm
VIII. CCK Chip Code Words
IX. CCK Decoder
   A. Introduction
X. CCK Correlator Optimizations
   A. Introduction
   B. Initial Complex Correlation
   C. Fast Correlator Transform (FCT)
   D. FCT Based on CCK Code Properties
XI. Conclusion I. Introduction FIG. 1 is a block diagram of an example discrete transversal matched filter or correlator 100, also referred to herein as a finite impulse response ("FIR") filter 100. The FIR filter 100 includes a set of multipliers 104 that multiply data words $X_i$ by coefficients C. The FIR filter 100 also includes a final accumulate or summation function 102. The matched filter 100 implements the following discrete sampling equation;

$$y_i = \sum_{k=0}^{n-1} c_k x_{(i-k)} \qquad \text{(Eq. 1)}$$

In Eq. 1, $X_i$ are typically derived from a sampling device such as an A/D converter and can be represented as signed magnitude, two's complement, or other binary representation in parallel bit format. Likewise the multiplier tap coefficients $C_0 \ldots C_n$ can be 1 bit values or k bit (soft) values depending on the application. In the case of soft value implementations, the multiplier functions can represent considerable hardware or algorithmic complexity. The final summation can be implemented using discrete adder technologies or floating point processors. The entire architecture can be implemented in hardware, software, or a hybrid of each.

A particular concern arises when multiple filtering operations are required, concurrently, as is the case for parallel correlators. The complexity, clock speeds and signal flow control typically increase cost, size, and power. Hence, efficient architectures are often pursued to streamline the implementation and thereby differentiate product offerings.

The present invention is directed to a novel fast correlator transform ("FCT") algorithm that reduces the number of additions for parallel correlation, as compared to conventional techniques. The present invention is also directed to methods and systems for implementing the novel FCT algorithm. Conventional techniques are typically of less universal application and restricted to certain signaling schemes. The present invention, on the other hand, is applicable to a variety of parallel matched filter and/or correlator operations.

The present invention is as efficient or more efficient than the Fast Walsh Transform, currently applied as the "state of the art," and is more universally applicable to signaling schemes employing higher order signaling spaces such as MQAM, CDMA, etc. In addition, classical multi-path processor algorithms are more easily applied using the classical correlator/matched filter kernel, in accordance with the present invention, rather than the conventional modified Fast Walsh Transform.

The present invention can be implemented in hardware, software, firmware, and/or combinations thereof. For example, and without limitation, the invention, or portions thereof, can be implemented in hardware logic. The invention, or portions thereof, can also be implemented in software imbedded in a computer readable medium (i.e., a computer program product), which, when executed on a computer system, causes the computer system to perform in accordance with the invention.

II. Example Environment 802.11

The present invention is described herein as implemented in an example environment of an IEEE 802.11b 11 MBPS physical layer signaling scheme. IEEE 802.11 is a well-known communications standard and is described in, for example, "Medium Access Control (MAC) and Physical (PHY) Specifications," ANS/IEE Std 802.11, published by IEEE, (1999 Ed.), and incorporated herein by reference in its entirety.

The present invention is not, however, limited to the IEEE 802.11 communications standard. Based on the description herein, one skilled in the relevant art(s) will understand that the present invention can be implemented for a variety of other applications as well. Such other applications are within the spirit and scope of the present invention.

A distinction is made herein between a basic correlator kernel and a full demodulator. A general form of a demodulator for IEEE 802.11 typically requires four correlator banks operating essentially in parallel. A fast correlator transform ("FCT") kernel, in accordance with the invention, typically includes similar structure, plus complex additions and subtractions from two in-phase and two quadrature-phase banks to accomplish the demodulation for IEEE 802.11. The Walsh transform, as a comparison, accounts for these additional adds and subtracts by having them built into its algorithm.

The 802.11 signaling scheme of interest is based on Cyclic Code Keying ("CCK") derived from Walsh/Hadamard functions. A restricted set within the available coding space was selected so that the Fast Walsh Transform could be utilized to implement an efficient correlator architecture. Originally, both Harris and Lucent could not figure out how to apply a classical parallel matched filter or correlator, efficiently, to process the waveforms. The current coding space provides for 64 code words. Harris erroneously predicted that a classical parallel matched filter approach would require 8×64=512 complex additions since each code word is 8 bits, on I and Q and there are 64 code words. However, the true estimate is 7×64=448 complex additions as illustrated in the example 8-way adder tree illustrated in FIG. 2A.

Figure 2A:
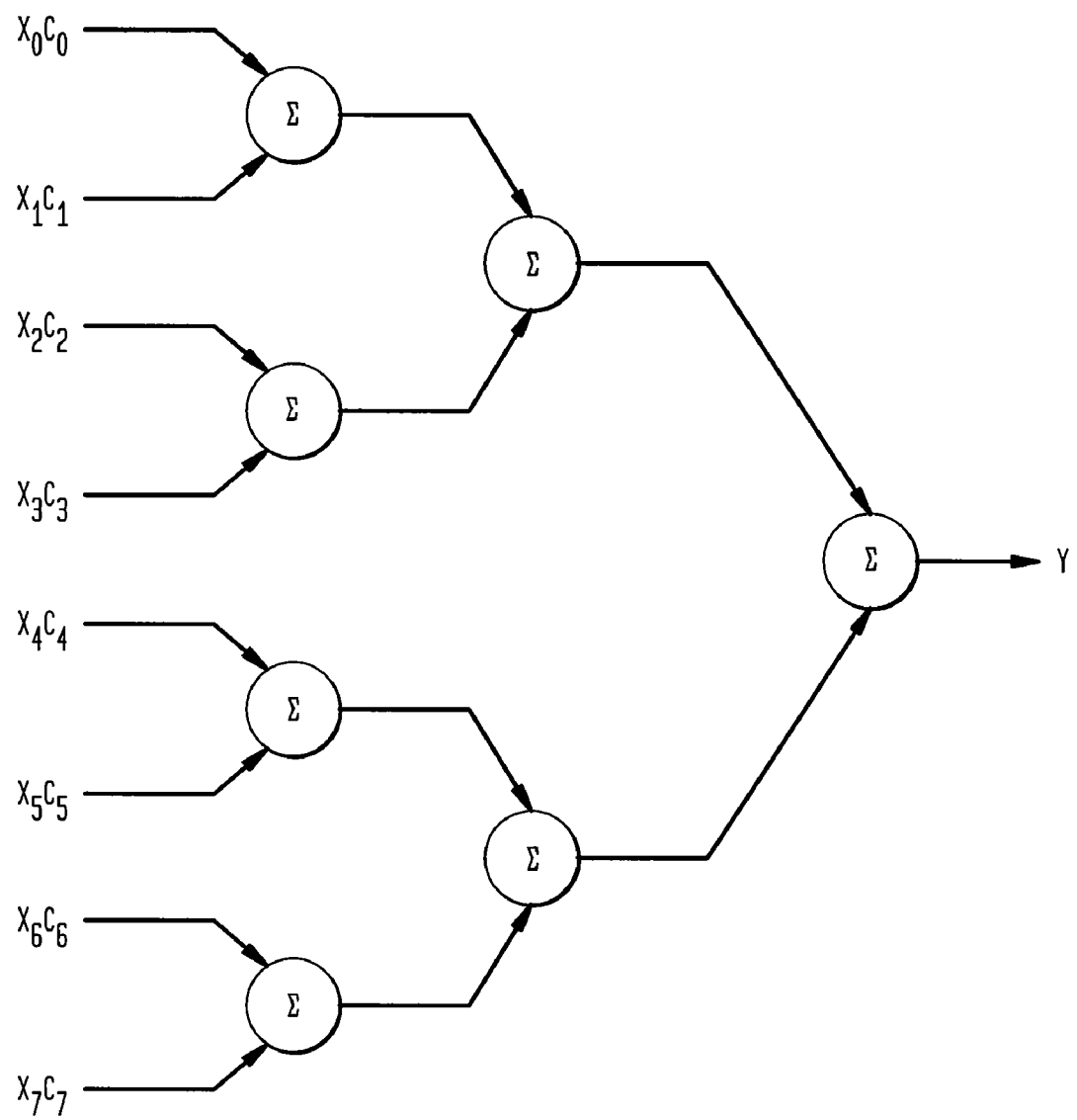
FIG. 2A is an expanded view of a summation function 102 illustrated in FIG. 1.

FIG. 2A is an expanded view of the final accumulate: or summation function 102 in FIG. 1, part of the FIR filter 100. Notice that only 7 adders are required for the example implementation. Nevertheless, 448 complex additions represent a significant number of operations. Lucent, Harris/Intersil, and Alantro apply the Fast Walsh Transform ("FWT") to the CCK code set to reduce the correlation operation down to 112 complex multiplies due to the restriction placed on the code set.

The FWT is actually more of a decoder than a correlator. It reduces to the performance of a correlator for this specific application if the coefficients in the butterfly branches are weighted with simple hard coded values, i.e., 1, −1, j, −j. The imaginary numbers are included for the case of complex signaling.

The FCT algorithm, according to the present invention, is truly a correlation or matched filter operation and can be applied with soft value weighting or hard value weighting. Furthermore, the present invention is intuitively satisfying, possessing direct correspondence of matched filter tap weights or coefficients maintained throughout the hierarchical structure. This permits easy extension of the matched filter concept to accommodate channel equalization, MLSE, and other adaptive applications.

Figure 2B:
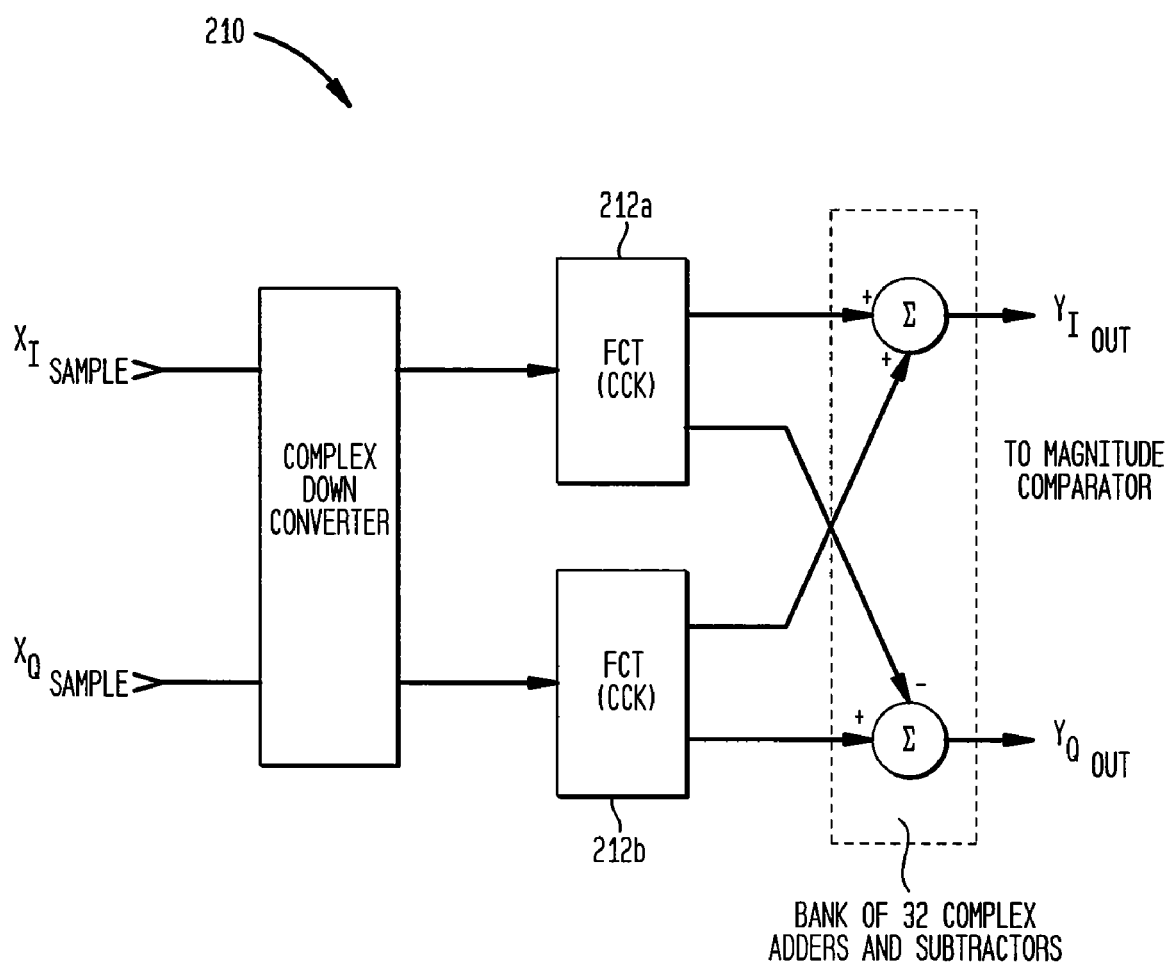
FIG. 2B is a block diagram of a FCT kernel implemented in an 802.11 demodulator 210 in accordance with an aspect of the present invention.

FIG. 2B is a block diagram of an example FCT kernel implemented in an 802.11 demodulator 210. The 802.11 demodulator 210 includes a bank of FCT kernels 212. The demodulator 210 can be reduced to 110 complex operations, with 78 of the complex operations allocated to the bank of FCT kernels 212. Additional simplification can be obtained by exploiting redundancy in the algorithm, as described below.

III. Fast Correlator Transform And Correlator Kernels

The available coding space for a 16 bit word is $2^{16}$=65536. CCK whittles this space down to a code set formed by 8 in-phase ("I") chip and 8 quadrature phase ("Q") chip complex symbols. 64 code words are retained, carrying 6 bits of information. 2 more bits are contained in the complex QPSK representation, for a total of 8 bits of information.

Suppose then that 8 samples of an input vector $X_0, X_1, \ldots X_7$ are associated with optimal sampling instants from the output of a chip matched filter. Each of these samples would normally be weighted by the coefficients $C_0 \ldots C_7$ then assimilated as illustrated in FIGS. 1 and 2A.

In the 802.11 example, $C_0 \ldots C_7$ correspond to samples of the CCK code set symbols. The unknowns $X_0 \ldots X_7$ are noisy input samples from which a specific code must be extracted. Conceptually, 64 such complex filtering operations should be performed concurrently since a specific code word cannot be predicted a priori. The largest output from the parallel bank of correlators would then be selected as the most likely code word correlation match at that particularly symbol sample time.

In accordance with the present invention, a general philosophy for correlation is imposed for partitioned segments of code words. In an embodiment, the code word correlations are divided into sub-sets. In the illustrated example embodiment, the code word correlations are divided into sample pairs. The present invention is not, however, limited to this example embodiment. In other embodiments, the code word correlations are divided into triplets, quintuplets, and/or any other suitable sub-sets.

Combinations of the code word correlation sub-sets are then provided to correlation kernels. FIG. 3A illustrates example correlation kernels 302a-302d, in accordance with an aspect of the present invention.

The correlation kernels 302a-302d represent all or substantially all possible correlation options for the first 2 samples $X_0, X_1$. In a similar fashion the remaining groupings of double samples $(X_2, X_3)$, $(X_4, X_5)$, $(X_6, X_7)$ will also spawn their own set of 4 correlation kernels.

The number of separate correlation kernels spawned is determined by the number of correlated samples per summation, the number of correlation variations possible, and, in an embodiment, the number of invalid combinations of correlated samples. In the present example, each coefficient has two possible states (i.e., hard value weighting). Thus each subset correlation generates 4 outputs. In alternative embodiments, soft weighting is implemented, where each coefficient is represented with multiple bits (e.g., magnitude representation).

In an embodiment, the number of correlation operations associated with binary antipodal signaling in accordance with the present invention is implemented in accordance with Eq. 2.

$$N_k = \frac{n!}{r!(n-r)!} - L \qquad \text{(Eq. 2)}$$

The result for the example environment described above, using 2 input summers, is shown in Eq. 3:

$$N_k = \frac{4!}{2!(2)!} - 2 \qquad \text{(Eq. 3)}$$

wherein:
n is the number of uniquely available summer inputs;
r is the number of summing inputs per kernel; and
L is the number of invalid combinations.

$N_k$ is thus the number of correlation kernels and therefore the number of adders or summers required. Groupings of two correlation samples provide for convenient binary expansion. As stated above, however, the present invention is not limited to groupings of two.

The term L represents the number of invalid or disallowed combinations. For instance, $X_0C_0$ and $-X_0C_0$ is an invalid combination when added and therefore can be subtracted from the total number of combinations. In an embodiment, 3 way adders or summers are utilized. In other embodiments, other algorithmic partitioning is utilized. For the current example, partitioning in powers of 2 is convenient and attractive in terms of potential hardware implementation.

FIG. 3B illustrates example first and second layers 304 and 306, respectively, of an FCT processing hierarchy in accordance with an aspect of the invention.

The second layer 306 includes 32 additions 308, of which 308a through 308p are illustrated, to process combinations of correlations from the first layer 304 of correlation kernels. The first layer 304 includes 16 additions related to the first 4 sample correlations $X_0C_0 \ldots X_3C_3$, and 16 additions related to the $2^{nd}$ 4 sample correlations. Hence, the first layer 304 of kernels includes 16 adders 302 and the second layer possesses 32 adders 308. Once the second layer 306 is accomplished, each term that results includes 4 correlation components.

Note that 4 unique samples $X_0 \ldots X_3$ at the system input spawns 24 unique 4-tuple correlations at the second layer 306 of kernel processing. The corresponding number of additions is calculated for the 4 sample correlation sequences from Eq. 4:

$$N = \frac{8!}{2!6!} - 2\left(\frac{4!}{2!2!}\right) = 16 \qquad \text{(Eq. 4)}$$

Figure 7:
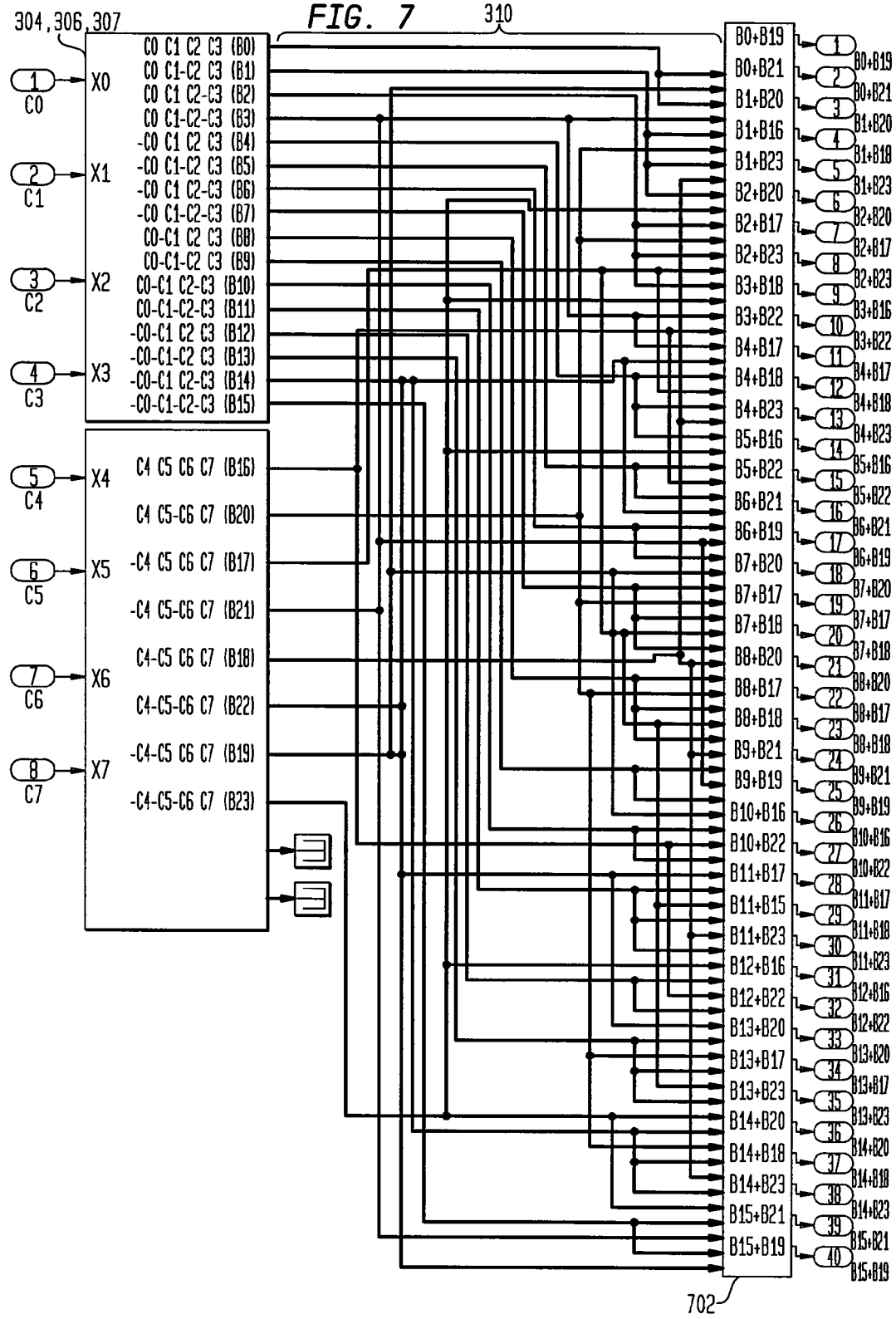
FIG. 7 illustrates an example final layer of an FCT processing hierarchy in accordance with an aspect of the invention.

At this point it is important to realize that all that is required is one more level of processing to obtain correlation terms consisting of 8 components which represents a full length correlation. However, it must also be recognized that there are 16 upper 4-tuple correlations as well as 16 lower 4-tuple correlations, which if exploited for all combinations in this case would yield 256 addition operations! Fortunately the CCK code set is well defined and possesses only 64 valid 8 chip component correlations. Hence, the final layer, illustrated in FIG. 7, is pruned to perform only 64 unique addition operations. Thus, a total (upper bound) number of adders used for the algorithm is:

16(first hierarchical layer)+32(second layer)+64(third layer)=112

This is a remarkable result because a conventional parallel matched filter or correlator bank would require 448 complex additions. Theoretically, 112 is the upper bound. However, in practice, the Trellis may be pruned to a maximum of 78 additions on the I and 78 and the Q.

FIG. 3C illustrates an example signal flow diagram for the FCT algorithm through the first 2 layers 304 and 306. In accordance with the example above, there are 8 input samples and 32 output correlation options through the first 2 layers 304 and 306. Correlation combinations from the upper and lower 16 4-tuples provide a final trellis with 64 8-tuple options, each representing a different CCK symbol. The option having the highest output is selected during each symbol cycle as the most likely CCK symbol. In the example embodiment, the correlation operation utilizes I and Q matched filters since the symbols are complex.

IV. Mathematical Formulation

In an embodiment, a receiver in accordance with the present invention receives a waveform and an analog-to-digital converter function samples the received waveform and converts the waveform down to baseband. The received sampled waveform may be represented from Eq. 5:

$$X_i = S_i + N_i \qquad \text{(Eq. 5)}$$

Where $S_i$ represents samples from the received signal and $N_i$ represent noise sampled from an average white Gausian noise ("AWGN") process. This equation does not account for multi-path. The samples can be considered as complex, with I and Q components. The receiver output can be represented by Eq. 6:

$$Y_i = \sum_{k=0}^{n-1} C_k X(i-k) \qquad \text{(Eq. 6)}$$

The coefficients, $C_k$, are considered constant for the nominal case of an AWGN channel. "n" is the FIR filter or correlator depth. For a case of m correlators operating on $X_i$ in parallel, Eq. 6 becomes Eq. 7:

$$Y_{i,m-1} = \sum_{k=0}^{n-1} C_{k,m-1} X(i-k) \qquad \text{(Eq. 7)}$$

The mth correlator branch then contains correlator coefficients uniquely related to that branch.

Figures 4A, 4B:
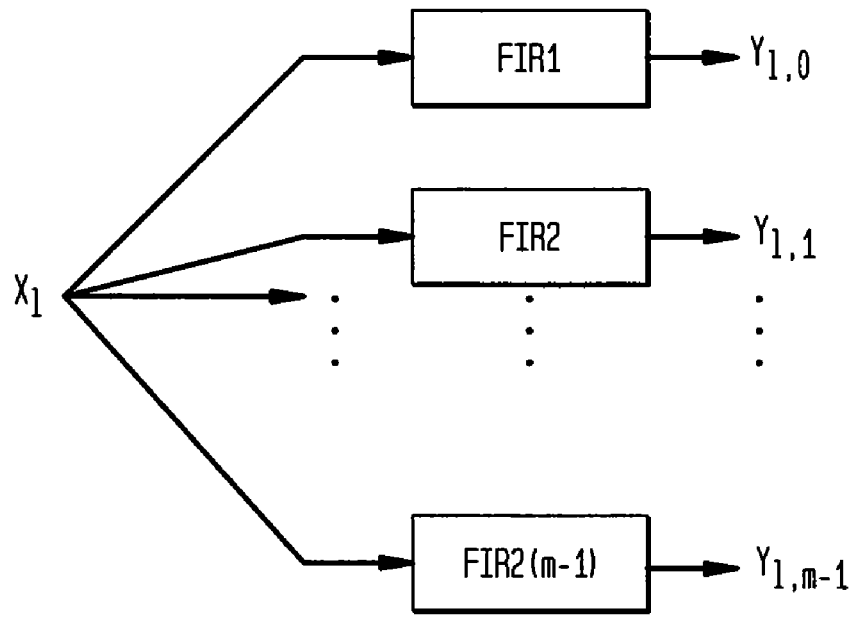
FIG. 4A illustrates a conventional parallel correlator approach.
FIG. 4B illustrates an example matrix form of coefficients for a parallel correlator in accordance with an aspect of the present invention.

FIG. 4A illustrates a conventional parallel correlator approach and relates it to Eq. 7. The present invention breaks the sum over n−1 into smaller sums, typically, although not necessarily, sums of 2. The present invention applies all, or substantially all potential cross correlations and carries the 4 results forward to a subsequent level of processing. An example mathematical formulation of this operation is provided in Eq. 8;

$$Y(i)_{l,v,p,u} = \sum_{k=0}^{1} C_{k,l} X(i-k) + \sum_{k=2}^{3} C_{k,v} X(i-k) +$$
$$\sum_{k=4}^{5} C_{k,p} X(i-k) + \sum_{k=6}^{7} C_{k,u} X(i-k) \dots \quad \text{(Eq. 8)}$$

Where l, v, p, and u may be considered as indices to select different coefficients. All indices should be considered in terms of a final valid code word correlation. In the 802.11 case, 256 correlation sequences are defined by Eq. 8, but the options are sifted to correspond only to valid CCK code words. FIG. 4B illustrates an example matrix form of coefficients for a parallel correlator according to the present invention.

The coefficients all take on the values of +/−1 for the examples herein. The indices are permitted to contain zeros for consistency with the original FIR formulation. The FCT sub-matrices however are simply;

$$C_{k,l} = C_{k,v} = C_{k,p} = C_{k,u} = \begin{bmatrix} 1 & -1 \\ -1 & 1 \end{bmatrix} \quad \text{(Eq. 9)}$$

The indices l, v, p, u are manipulated specifically to match the coefficients to the desired code words at the $Y(i)_{l,v,p,u}$ outputs. The indices also uniquely specify the trajectory through the signal flow path. Breaking up the original parallel matched filter coefficient matrix into the smaller 2×2 matrix permits the FCT algorithm to exploit redundant correlation operations.

V. Comparisons To The Hadamard Transform

Figure 5:
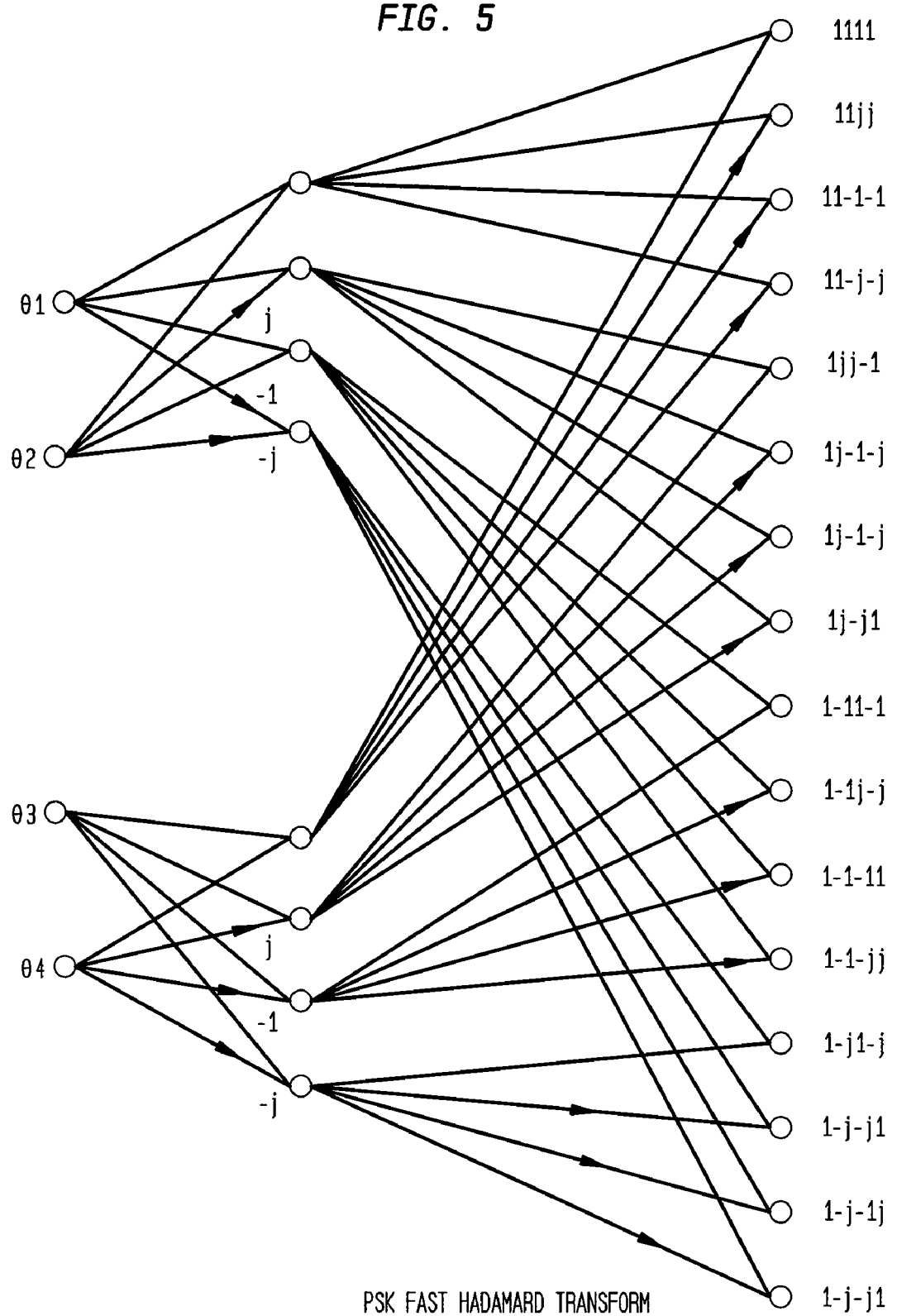
FIG. 5 illustrates an example complex fast Hadamard Transform.

An FCT algorithm trellis, in accordance with the present invention, is described above. A corresponding length 4 complex fast Hadamard Transform is illustrated in FIG. 5. As with the FCT algorithm, there are two such trellis structures corresponding to 8 input samples and 32 outputs. The 32 outputs include two 16 wide 4-tuple groupings, which are then utilized in combinations to produce the final 54 8-tuple correlations.

There are distinct differences between the two algorithms. For example, the FCT algorithm can function on arbitrary correlation words, even in matched filter scenarios, while the FWT requires certain signal coding structure. Also, the FCT algorithm permits greater efficiency because the number of adds may be tailored for a specific code set or application.

Harris and Lucent advertise an efficiency of 112 complex additions for CCK demodulation, which amounts to 2×112 additions. The bounding case for 64 arbitrary correlations with the FCT was shown to be 112, maximum. It turns out that the specific case of CCK may be accommodated using a pruned FCT algorithm having 78 additions on the in-phase correlation band and 78 additions on the quadrature correlation bank. An additional 36 add/subtract operations are required to complete the demodulator, for a total of 114 complex operations, versus 112 for the FWT. Additional reductions can be obtained to reduce the demodulator to approximately 100 complex add/subtract operations, as described below.

VI. Maximum Likelihood Decoding (AWGN, No Multipath)

The modified Fast Walsh/Hadamard Transform implements a complex trellis decoder for which maximum scores may be compared at the trellis output. Thus there are 64 distinct outputs of the trellis which are preferred based on Euclidean distance calculations along the trellis trajectories. Only certain specific trajectories are considered up through the second tier of the trellis. The distance properties for the decoding trellis are also Euclidean for the in-phase and quadrature phase correlators. However, it is important to realize that the total distance should be calculated within the complex plane rather than simply on I independently of Q. That is, scoring is based on Eq. 10.

$$\text{Distance} = \sqrt{I_{score}^2 + Q_{score}^2} \quad \text{(Eq. 10)}$$

This comes from the fact that there are pairs of I and Q chip code words which are dependent. That is the nature of the complex Walsh-Hadamard codes. Fortunately, a sufficient statistic exists which does not require the square root operation. Simply calculating the sum of the squares or estimating the vector magnitude will suffice. In this manner then the total distance or weighting through complex space is calculated. The largest output out of the 64 complex operations (weighting scenario) then becomes the most likely 8 chip complex code.

A. Magnitude Comparator

In order to determine which code symbol was most likely encoded, a magnitude compare operation is performed on the outputs from the summer 102 (FIG. 1). A variety of types of magnitude compare operations can be performed.

Figure 6:
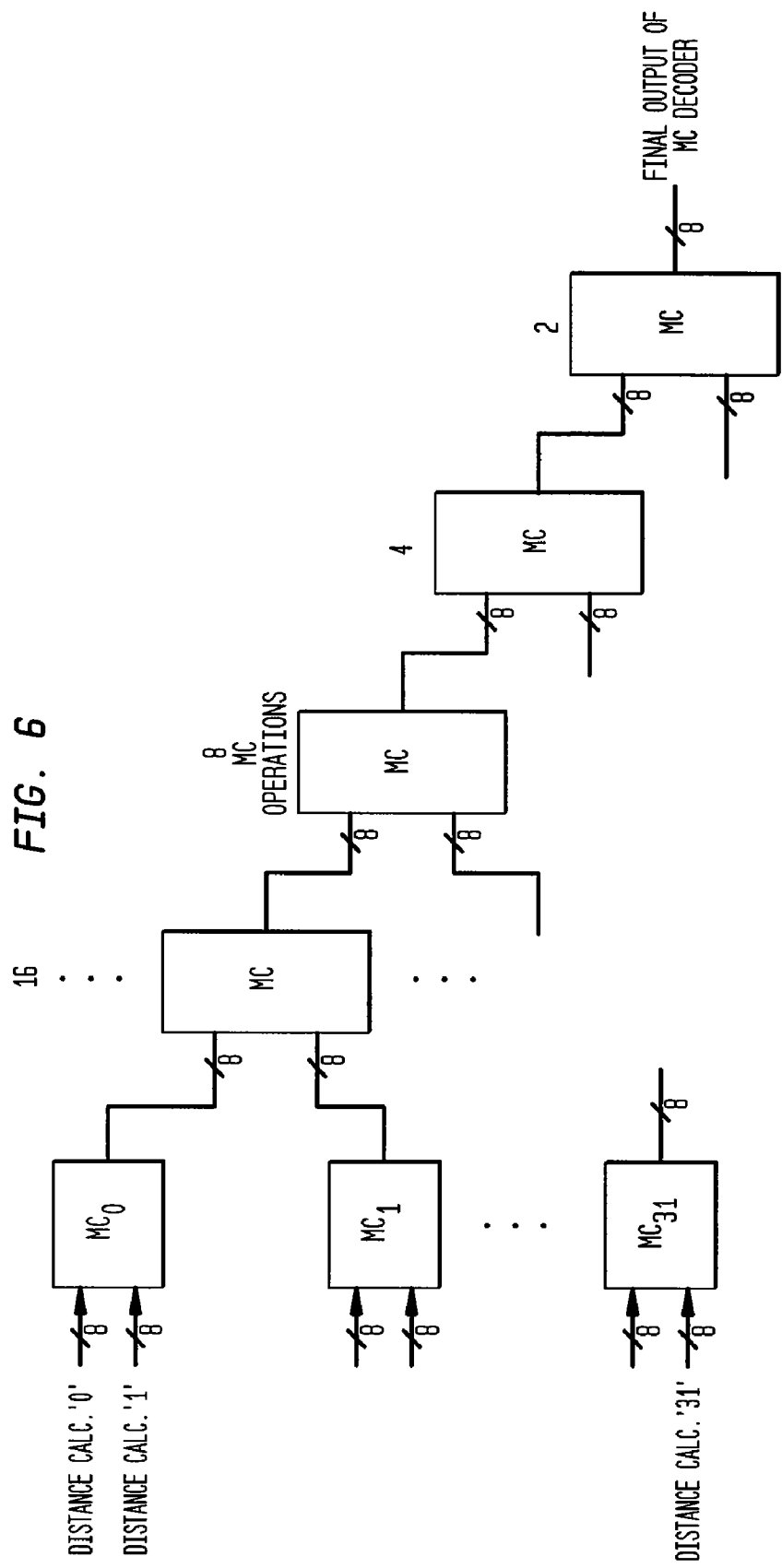
FIG. 6 illustrates an example parallel magnitude compare operation in accordance with an aspect of the invention.

FIG. 6 illustrates an example parallel magnitude compare operation in accordance with an aspect of the invention. In operation, the I and Q inputs, 8 bits wide each, for example, are squared and summed at the correlator outputs to form 64 scores. These 64 scores are compared and the largest result selected as the maximum likelihood symbol estimate. Each of the 64 outputs are assigned their corresponding chip code-to-6-bit data map. An additional di-bit is decoded from the differential phase decoder. In an embodiment, the squaring operation results in 16 bit output value when the inputs from each I and Q correlator are truncated to an extent reasonable to minimize the compare tree. In an embodiment, a parallel compare tree utilizes $\log_2(64)-1$ compares to obtain the most likely result.

In an embodiment, the magnitude compare operation illustrated in FIG. 6 utilizes a flag at each level of compare to indicate the winning local score at that level. The winning local score can be traced from the output back to one of the 64 original input correlation scores to decide which 6-bit word is most likely. In an embodiment, outcomes of the scores at one or more levels are arbitrarily determined. In an embodiment, magnitude compare operations are performed with an adder/subtractor to create the result C=A−B, where A and B are inputs.

Another magnitude compare technique that can be utilized is referred to herein as space slicing, which includes the steps of examining the MSB of the correlator outputs, and throwing away results not active in the MSB. If none are active in the MSB then the next MSB is compared, so on and so forth. Any surviving correlator outputs are compared in the next most significant MSB in succession until all necessary compares are exhausted. This technique is useful because it requires only 1-bit compares at each level down to the final compare. In an embodiment, 1 bit compares are performed with an exclusive OR gate. Generally, there is no deterministic way to predict the number of surviving compares which may be passed on to the next level, but the maximum number typically reduces by a factor of 2 at each level. This approach relies on a statistical distribution of scores, which may permit rapid sifting. If all of the distances are similar in magnitude then sifting typically requires more operations. For instance, if all 64 distance calculations/scores possess an active MSB then the first round of sifting will not eliminate any scores and all scores are then be compared in the next MSB. Although this is not likely to occur, it should be anticipated for associated hardware realization.

VII. Example Methods For Implementing The Fct Algorithm

FIG. 8 illustrates an example process flowchart 800 for implementing the FCT algorithm in accordance with an aspect of the present invention. For illustrative purposes, the flowchart 800 is described herein with reference to one or more of the drawing figures described above. The invention is not, however, limited to the examples illustrated in the drawings. Based on the description herein, one skilled in the relevant art(s) will understand that the invention can be implemented in a variety of ways.

The example process flowchart 800 illustrates a method for correlating an encoded data word ($X_0$-$X_{M-1}$) with encoding coefficients ($C_0$-$C_{M-1}$), wherein each of ($X_0$-$X_{M-1}$) is represented by one or more bits and each said coefficient is represented by one or more bits, wherein each coefficient has k possible states, wherein M is greater than 1.

The process begins with step 802, which includes multiplying $X_0$ with each state ($C_{0(0)}$ through $C_{0(k-1)}$) of the coefficient $C_0$, thereby generating results $X_0 C_{0(0)}$ through $X_0 C_{0(k-1)}$. This is illustrated, for example, in FIGS. 3A, 3B, and 3C just prior to the kernels 302A, B, C, and D.

Step 804 includes repeating step 802 for data bits ($X_1$-$X_{M-1}$) and corresponding coefficients ($C_1$-$C_{M-1}$), respectively. This is illustrated, for example, in FIGS. 3B, and 3C just prior to the kernels 302E through 302Q.

Step 806 includes grouping the results of steps 802 and 804 into N groups and summing combinations within each of said N groups, thereby generating a first layer of correlation results. This is illustrated, for example, in FIGS. 3A, 3B, and 3C by the kernels 302, and the resultant first layer of results 307.

Step 808 includes grouping the results of step 806 and summing combinations of results within each group to generate one or more additional layers of results, and repeating this process until a final layer of results includes a separate correlation output for each possible state of the complete set of coefficients ($C_0$-$C_{M-1}$). This is illustrated in FIG. 3C and FIG. 7, where the summers 306 generate a second layer 310, the FCT final output trellis 702 (FIG. 7) provides separate outputs for each possible state of the complete set of coefficients ($C_0$-$C_{M-1}$) in a final layer 704.

In an embodiment, steps 806 and 808 include the step of omitting summations that would result in invalid combinations of the encoding coefficients ($C_0$-$C_{M-1}$). This is illustrated in steps 806A and 808A. This also is illustrated, for example, in FIG. 7, wherein the second level of results 310 omits the following combinations:

$C_4 C_5 C_6 (-C_7)$;
$C_4 C_5 (-C_6)(-C_7)$;
$(-C_4) C_5 C_6 (-C_7)$;
$(-C_4) C_5 (-C_6)(-C_7)$;
$C_4 (-C_5) C_6 (-C_7)$;
$C_4 (-C_5)(-C_6)(-C_7)$;
$(-C_4)(-C_5) C_6 (-C_7)$; and
$(-C_4)(-C_5)(-C_6)(-C_7)$.

In this example, the omissions eliminate performing summations for combinations that are invalid in light of the CCK code or that result in null operation. In other embodiments, different combinations may or may not be omitted based on particular codes.

Step 810 includes comparing magnitudes of said separate correlation outputs, thereby identifying a most likely code encoded on said data word. This is illustrated, for example, in FIG. 6, by the example parallel magnitude compare operation.

In an embodiment, the process flowchart 800 further includes the step of performing steps (1) through (5) using substantially the same hardware for in-phase and quadrature phase components of the data word ($X_0$-$X_{M-1}$).

In an embodiment, the coefficients ($C_0$-$C_{M-1}$) represent real numbers. In an alternative embodiment, the coefficients ($C_0$-$C_{M-1}$) represent complex numbers.

In an embodiment, the coefficients ($C_0$-$C_{M-1}$) are represented with a single bit. Alternatively, the coefficients ($C_0$-$C_{M-1}$) are represented with multiple bits (e.g., magnitude).

In an embodiment, the coefficients ($C_0$-$C_{M-1}$) represent a cyclic code keying ("CCK") code set substantially in accordance with IEEE 802.11 WLAN standard, illustrated in the tables below.

In an embodiment, as illustrated in one or more of the prior drawing figures, M equals 8, N equal 4, and the coefficients ($C_0$-$C_{M-1}$) have two states, plus and minus.

VIII. CCK Chip Code Words

Tables are provided below that illustrate source-input data symbols, 8-bits long ($d_0$-$d_7$), and corresponding in-phase and quadrature phase 8 chip symbols used for CCK. The complex chip notation is provided for reference. In addition the algorithm flow diagram 4-tuple sums are provided since the last level of flow diagram becomes complex and difficult to follow. $B_0 \ldots B_{31}$ are the 4-tuple intermediate correlation results relating to the signal flow diagrams presented for the correlator algorithm. Two branch 4-tuples form the final output result for each correlator. $B_0 \ldots B_{15}$ provide options for the first branch component to form a final output correlator 8-tuple while $B_{16} \ldots B_{31}$ provide the second branch component or second 4-tuple. For instance, Table 1 illustrates an example build-up:

TABLE 1

| 4-tuple Designator | 4-tuple Coefficient Sequence |
|---|---|
| $B_6$ | -1, 1, 1, -1 |
| $B_{28}$ | 1, 1, -1, -1 |
| 4-tuple Combination | Final 8-tuple Correlator Coefficient Sequence |
| $B_6 + B_{28} \Rightarrow$ | -1, 1, 1, -1, 1, 1, -1, -1 |

Logical zeros become weighted by an arithmetic value, -1. In this manner the optimum correlator trajectory for a particular chip sequence is projected through the correlator trellis. The example above corresponds to the in-phase correlator waiting for an originally transmitted data sequence $d_0 \ldots d_7$ of 0, 0, 1, 0, 1, 0, 1, 0. For this example, that particular branch represents a correlation provided in Eq. 11;

$$y_{42} = x_0(-1) + x_1(1) + x_2(1) + x_3(-1) + x_4(1) + x_5(1) + x_6(-1) + x_7(-1) \quad \text{(Eq. 11)}$$

$x_0 \ldots x_7$ represent corrupted or noisy input signal samples. When the $x_i$ match the coefficients significantly then that 8-tuple (1 of 64) output possesses maximum weighting and is declared most likely by the magnitude comparator. Another strategy seeks to minimize the distance between the $x_i$ and $c_i$. The process is similar in either case.

Table 2 illustrates example in-phase and quadrature 4-tuple combinations. It is noted that the examples provided in Tables 1 and 2 are provided for illustrative purposes and are not limiting. Other specific examples will be apparent to persons skilled in the relevant arts based on the teachings herein, and such other examples are within the scope and spirit of the invention.

TABLE 2

| | d0 d1 d2 d3 d4 d5 d6 d7 | In phase | 4-tuple Combination | Quadrature | 4-tuple Combination | Complex |
|---|---|---|---|---|---|---|
| $D_0$ | 00000000 | 11101101 | $B_2 + B_{20}$ | 11101101 | $B_2 + B_{20}$ | 111−111−11 |
| $D_1$ | 00000001 | 00011101 | $B_{13} + B_{20}$ | 11101101 | $B_2 + B_{20}$ | jjj−j11−11 |
| $D_2$ | 00000010 | 00011101 | $B_{13} + B_{20}$ | 00011101 | $B_{13} + B_{20}$ | −1−1−1111−11 |
| $D_3$ | 00000011 | 11101101 | $B_2 + B_{20}$ | 00011101 | $B_{13} + B_{20}$ | −j−j−jj11−11 |
| $D_4$ | 00000100 | 00100001 | $B_{14} + B_{23}$ | 11101101 | $B_2 + B_{20}$ | jj1−1jj−11 |
| $D_5$ | 00000101 | 00010001 | $B_{13} + B_{23}$ | 00101101 | $B_{14} + B_{20}$ | −1−1j−jjj−11 |
| $D_6$ | 00000110 | 11010001 | $B_1 + B_{23}$ | 00011101 | $B_{13} + B_{20}$ | −j−j−11jj−11 |
| $D_7$ | 00000111 | 11100001 | $B_2 + B_{23}$ | 11011101 | $B_1 + B_{20}$ | 11−jjjj−11 |
| $D_8$ | 00001000 | 00100001 | $B_{14} + B_{23}$ | 00100001 | $B_{14} + B_{23}$ | −1−11−1−1−11 |
| $D_9$ | 00001001 | 11010001 | $B_1 + B_{23}$ | 00100001 | $B_{14} + B_{23}$ | −j−jj−j−1−11 |
| $D_{10}$ | 00001010 | 11010001 | $B_1 + B_{23}$ | 11010001 | $B_1 + B_{23}$ | 11−11−1−1−11 |
| $D_{11}$ | 00001011 | 00100001 | $B_{14} + B_{23}$ | 11010001 | $B_1 + B_{23}$ | jj−jj−1−1−11 |
| $D_{12}$ | 00001100 | 11101101 | $B_2 + B_{20}$ | 00100001 | $B_{14} + B_{23}$ | −j−j1−1−j−11 |
| $D_{13}$ | 00001101 | 11011101 | $B_1 + B_{20}$ | 11100001 | $B_2 + B_{23}$ | 11j−j−j−11 |
| $D_{14}$ | 00001110 | 00011101 | $B_{13} + B_{20}$ | 11010001 | $B_1 + B_{23}$ | jj−11−j−j−11 |
| $D_{15}$ | 00001111 | 00101101 | $B_{14} + B_{20}$ | 00010001 | $B_{13} + B_{23}$ | −1−1−jj−j−j−11 |
| $D_{16}$ | 00010000 | 01000111 | $B_7 + B_{17}$ | 11101101 | $B_2 + B_{20}$ | j1j−1j1−j1 |
| $D_{17}$ | 00010001 | 00010111 | $B_{13} + B_{17}$ | 01001101 | $B_7 + B_{20}$ | −1j−1−jj1−j1 |
| $D_{18}$ | 00010010 | 10100111 | $B_8 + B_{17}$ | 00011101 | $B_{13} + B_{20}$ | −j−1−j1j1−j1 |
| $D_{19}$ | 00010011 | 11100111 | $B_2 + B_{17}$ | 10111101 | $B_8 + B_{20}$ | 1−j1jj1−j1 |
| $D_{20}$ | 00010100 | 00000011 | $B_{15} + B_{19}$ | 01100101 | $B_6 + B_{21}$ | −1jj−1j−j1 |
| $D_{21}$ | 00010101 | 10010011 | $B_9 + B_{19}$ | 00000101 | $B_{15} + B_{21}$ | −j−1−1−j−1j−j1 |
| $D_{22}$ | 00010110 | 11110011 | $B_0 + B_{19}$ | 10010101 | $B_9 + B_{21}$ | 1−j−j1−1j−j1 |
| $D_{23}$ | 00010111 | 01100011 | $B_6 + B_{19}$ | 11110101 | $B_0 + B_{21}$ | j11j−1j−j1 |
| $D_{24}$ | 00011000 | 10001011 | $B_{11} + B_{18}$ | 00100001 | $B_{14} + B_{23}$ | −j−1j−1−j−1−j1 |
| $D_{25}$ | 00011001 | 11011011 | $B_1 + B_{18}$ | 10000001 | $B_{11} + B_{23}$ | 1−j−1−j−j−1−j1 |
| $D_{26}$ | 00011010 | 01111011 | $B_4 + B_{18}$ | 11010001 | $B_1 + B_{23}$ | j1−j−1−j−1−j1 |
| $D_{27}$ | 00011011 | 00101011 | $B_{14} + B_{18}$ | 01101101 | $B_4 + B_{23}$ | −1j1j−1−j−j1 |
| $D_{28}$ | 00011100 | 11001111 | $B_3 + B_{16}$ | 10101001 | $B_{10} + B_{22}$ | 1−jj−11−j−j1 |
| $D_{29}$ | 00011101 | 01011111 | $B_5 + B_{16}$ | 11001001 | $B_3 + B_{22}$ | j1−1−j1−j−j1 |
| $D_{30}$ | 00011110 | 00111111 | $B_{12} + B_{16}$ | 01011001 | $B_5 + B_{22}$ | −1j−j11−j−j1 |
| $D_{31}$ | 00011111 | 10101111 | $B_{10} + B_{16}$ | 00111001 | $B_{12} + B_{22}$ | −j−11j1−j−j1 |
| $D_{32}$ | 00100000 | 01000111 | $B_7 + B_{17}$ | 01000111 | $B_7 + B_{17}$ | −11−1−1−1111 |
| $D_{33}$ | 00100001 | 10110111 | $B_8 + B_{17}$ | 01000111 | $B_7 + B_{17}$ | −jj−j−j−1111 |
| $D_{34}$ | 00100010 | 10110111 | $B_8 + B_{17}$ | 10110111 | $B_8 + B_{17}$ | 1−111−1111 |
| $D_{35}$ | 00100011 | 01000111 | $B_7 + B_{17}$ | 10110111 | $B_8 + B_{17}$ | j−jjj−1111 |
| $D_{36}$ | 00100100 | 10001011 | $B_{11} + B_{18}$ | 01000111 | $B_7 + B_{17}$ | −jj−1−1−jj11 |
| $D_{37}$ | 00100101 | 10111011 | $B_8 + B_{18}$ | 10000111 | $B_{11} + B_{17}$ | 1−1−j−j−jj11 |
| $D_{38}$ | 00100110 | 01111011 | $B_4 + B_{18}$ | 10110111 | $B_8 + B_{17}$ | j−j11−jj11 |
| $D_{39}$ | 00100111 | 01001011 | $B_7 + B_{18}$ | 01110111 | $B_4 + B_{17}$ | −11jj−jj11 |
| $D_{40}$ | 00101000 | 10001011 | $B_{11} + B_{18}$ | 10001011 | $B_{11} + B_{18}$ | 1−1−1−11−111 |
| $D_{41}$ | 00101001 | 01111011 | $B_4 + B_{18}$ | 10001011 | $B_{11} + B_{18}$ | j−j−j−j1−111 |
| $D_{42}$ | 00101010 | 01111011 | $B_4 + B_{18}$ | 01111011 | $B_4 + B_{18}$ | −11111−111 |
| $D_{43}$ | 00101011 | 10001011 | $B_{11} + B_{18}$ | 01111011 | $B_4 + B_{18}$ | −jjjj1−111 |
| $D_{44}$ | 00101100 | 01000111 | $B_7 + B_{17}$ | 10001011 | $B_{11} + B_{18}$ | j−j−1−1j−j11 |
| $D_{45}$ | 00101101 | 01110111 | $B_4 + B_{17}$ | 01001011 | $B_7 + B_{18}$ | −11−j−jj−j11 |
| $D_{46}$ | 00101110 | 10110111 | $B_8 + B_{17}$ | 01111011 | $B_4 + B_{18}$ | −jj11j−j11 |
| $D_{47}$ | 00101111 | 10000111 | $B_{11} + B_{17}$ | 10111011 | $B_8 + B_{18}$ | 1−1jjj−j11 |
| $D_{48}$ | 00110000 | 11101101 | $B_2 + B_{20}$ | 01000111 | $B_7 + B_{17}$ | −j1−j−1−1j1j1 |
| $D_{49}$ | 00110001 | 10111101 | $B_8 + B_{20}$ | 11100111 | $B_2 + B_{17}$ | 1j1−j−j−j−j1 |
| $D_{50}$ | 00110010 | 00011101 | $B_3 + B_{20}$ | 10110111 | $B_8 + B_{17}$ | j−1j1−j1j1 |
| $D_{51}$ | 00110011 | 01001101 | $B_7 + B_{20}$ | 00010111 | $B_3 + B_{17}$ | −1−j−1j−1j1j1 |
| $D_{52}$ | 00110100 | 10101001 | $B_{10} + B_{22}$ | 11001111 | $B_3 + B_{16}$ | 1j−j−11jj1 |
| $D_{53}$ | 00110101 | 00111001 | $B_{12} + B_{22}$ | 10101111 | $B_{10} + B_{16}$ | j−11−j1jj1 |
| $D_{54}$ | 00110110 | 01011001 | $B_5 + B_{22}$ | 00111111 | $B_{12} + B_{16}$ | −1−1jj1jj1 |
| $D_{55}$ | 00110111 | 11001001 | $B_3 + B_{22}$ | 01011111 | $B_5 + B_{16}$ | −j1−1j1jj1 |
| $D_{56}$ | 00111000 | 00100001 | $B_{14} + B_{23}$ | 10001011 | $B_{11} + B_{18}$ | j−1−j−1j−1j1 |
| $D_{57}$ | 00111001 | 01101101 | $B_4 + B_{23}$ | 00101011 | $B_{14} + B_{18}$ | −1j1−jj−1j1 |
| $D_{58}$ | 00111010 | 11010001 | $B_1 + B_{23}$ | 01111011 | $B_4 + B_{18}$ | −j1j1j−1j1 |
| $D_{59}$ | 00111011 | 10000001 | $B_{11} + B_{23}$ | 11011011 | $B_1 + B_{18}$ | 1j−1jj−1j1 |
| $D_{60}$ | 00111100 | 01100101 | $B_6 + B_{21}$ | 00000011 | $B_{15} + B_{19}$ | −1−j−j−1−1−jj1 |
| $D_{61}$ | 00111101 | 11110101 | $B_0 + B_{21}$ | 01100011 | $B_6 + B_{19}$ | −j11−1−1−jj1 |
| $D_{62}$ | 00111110 | 10010101 | $B_9 + B_{21}$ | 11110011 | $B_0 + B_{19}$ | 1jj1−1−jj1 |
| $D_{63}$ | 00111111 | 00000101 | $B_{15} + B_{21}$ | 10010011 | $B_9 + B_{19}$ | j−1−1j−1−jj1 |

IX CCK Decoder

A. Introduction

A fast correlator transform (FCT) kernel in accordance with the invention, can be used as a building block for a CCK decoder. For example, a FCT kernel can be applied and used to decode data using the IEEE 802.11b 11 Mbps signaling scheme. For the design, two correlators are preferably used. Since the signaling scheme is complex one correlator is used for the in-phase (I) channel, and another correlator is used for the quadrature phase (Q) channel. The input to each channel is the designated codeword for the transmitted data. Table 3 illustrates example input data and corresponding coded output.

TABLE 3

| Input Data and CCK Coded Output | | |
|---|---|---|
| Data (input) | Inphase (output) | Quadrature (output) |
| 00000001 | 00011101 (B13+B20) | 11101101 (B2+B20) |

The CCK coded data for each channel is passed into its respective correlator for processing. The output of a branch correlator trellis preferably has a maximum value of 8 (with no noise in the system) that corresponds to a correlation with the input codeword. The value can be a $\mp 8$ depending on the phase. The value is then magnitude squared, which will give one branch of the trellis a maximum value of 64. The in-phase and quadrature branches of the I and Q correlators are then paired together according to the CCK codeword in Table 2, above. These pairs, when combined, provide a maximum $I^2+Q^2$ value of 128.

The CCK decoder works fine when there is a 0 or $\pi$ phase rotation. A problem arises, however, when there is a $\pi/2$ or a $3\pi/2$ phase rotation. The problem is described with the following example.

The base codeword Table 2, above, for the 11 Mbps CCK encoding scheme gives the pairs of codewords that correspond to a given input message. For 56 out of the possible 64 codewords, the encoded words on the I and Q channel are similar, except that they are on opposite channels. An example of two codewords are shown in Table 4 below.

TABLE 4

| CCK Input and Encoded Data | | |
|---|---|---|
| Data (input) | Inphase (output) | Quadrature (output) |
| 00001100 | 11101101 (B2+B20) | 00100001 (B14+B23) |
| 00000100 | 00100001 (B14+B23) | 11101101 (B2+B20) |

Figure 9:
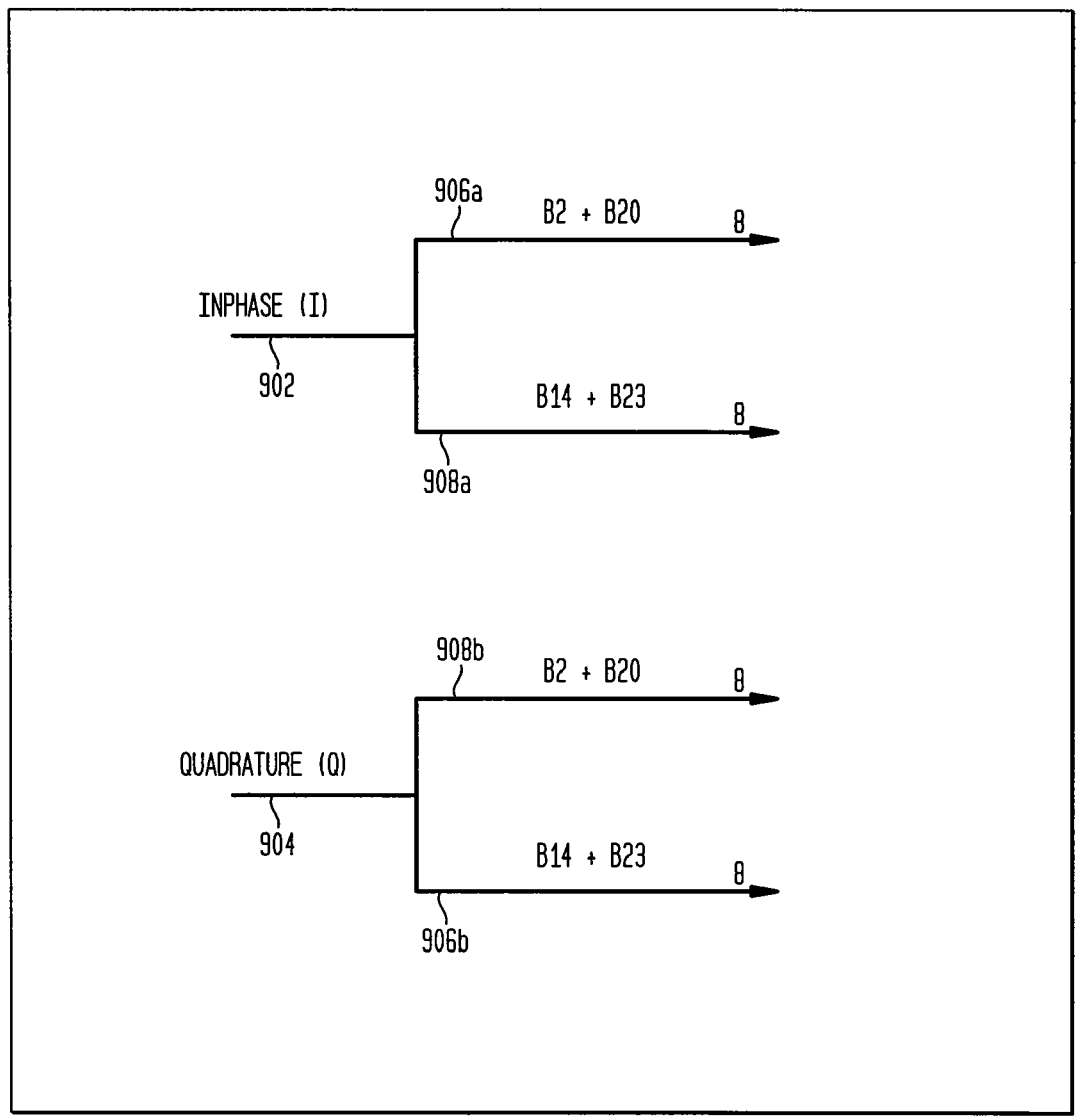
FIG. 9 is a signal path diagram for an example CCK decoder output trellis, including an I signal path 902 and a Q signal path 904.

The codewords for the two data symbols given in Table 4 are similar, but are on different channels. So if there is a $\pi/2$ or a $3\pi/2$ phase shift from differentially encoding the transmitted data, then the I and Q channels will be swapped. This is illustrated in FIG. 9, which is a signal path diagram for an example CCK decoder output trellis, including an I signal path 902 and a Q signal path 904.

If the codewords received on the I signal path 902 and the Q signal path 904 are 11101101 and 00100001, respectively, then the maximum output will be 8 and will follow paths 906a and 906b, respectively. But if the codewords received on the I signal path 902 and the Q signal path 904 are swapped, then the maximum output will be 8 and will follow paths 908a and 908b, respectively, which correspond to different input data than paths 906a and 906b. This is acceptable if that is the intended path. But if there is a $\pi/2$ or a $3\pi/2$ phase rotation, then the input words to the correlator are swapped on the I and Q channels, and the I or Q channel is inverted depending on what the phase rotation was. For these cases, if the input codewords before differential encoding correspond to the paths 906a and 906b, then the decoded data should be that which is associated with the paths 906a and 906b, not the paths 908a and 908b. Since the differential decoding process is typically performed after or during the correlation process, then the phase rotated symbols enter the correlator in that form. A determination should be made as to whether there was a phase rotation. Phase rotation can be discerned as follows. If there was a $\pi/2$ phase shift, the in-phase channel will be inverted. If there is a $3\pi/2$ phase shift, the quadrature phase channel will be inverted.

Figure 10:
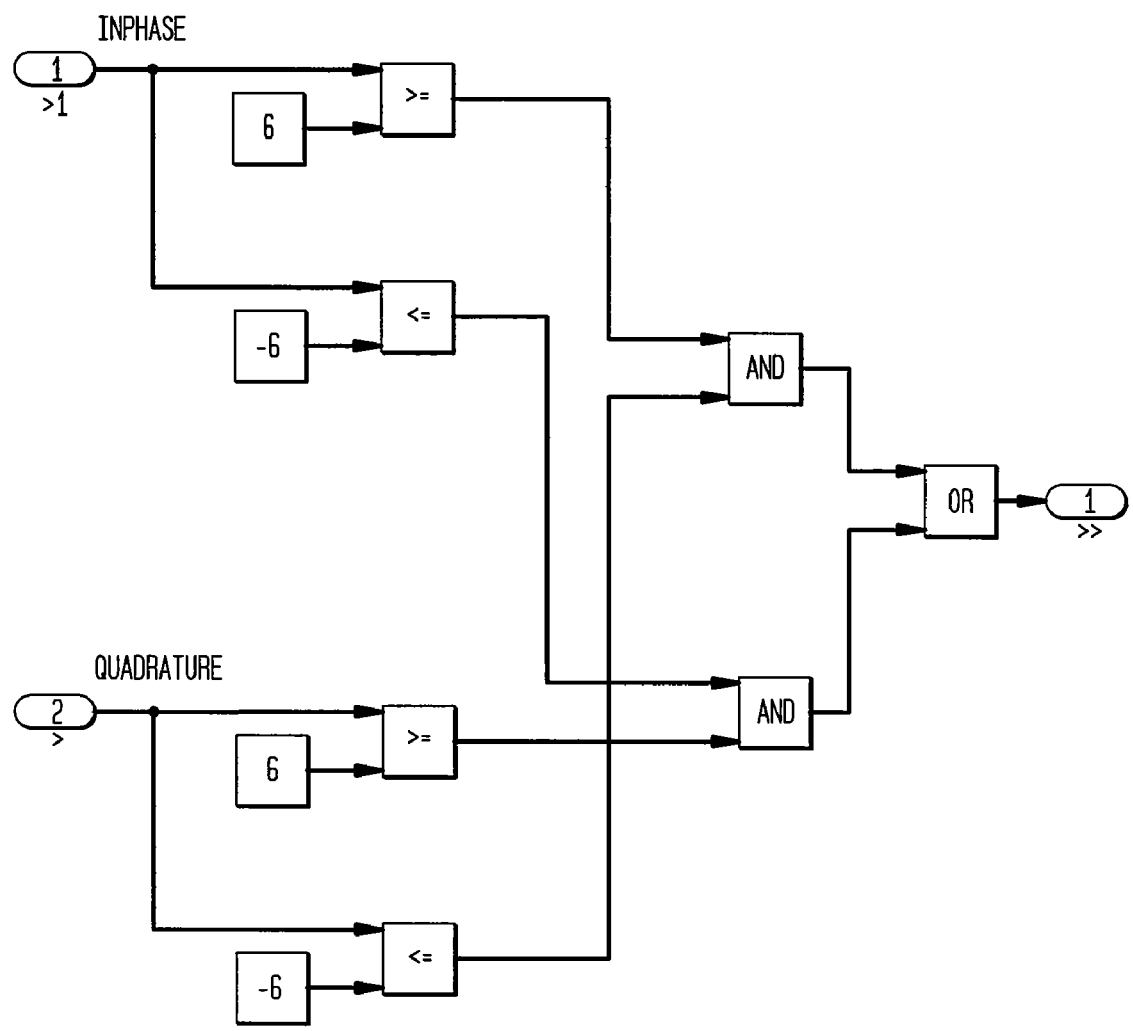
FIG. 10 is a block diagram of an inverted channel detection circuit 1000 that can be used to determine if one of the channels was inverted.

FIG. 10 is a block diagram of an inverted channel detection circuit 1000 that can be used to determine if one of the channels was inverted. If both channels were inverted then there was a $\pi$ phase shift and the data is decoded correctly, so this is of no consequence to the system.

X. CCK Correlator Optimizations

A. Introduction

A CCK parallel correlator in accordance with the invention can be optimized to reduce the number of adders in a Fast Correlator Transform (FCT) kernel. An initial complex correlation is presented below, followed by various optional optimizations that reduce the complexity of the initial complex correlation.

Table 6 lists 64 complex codewords that have coefficients with four possible values of +1, −1, +j, and −j. This means that either the real part or imaginary part of each coefficient is 0, but not both. Table 6 also lists corresponding codewords rotated by 45° to get the I, Q representation. Note that each coefficient in the I, Q representation has a magnitude of $\sqrt{2}$ since the four possible coefficients are now +1+j, +1−j, −1+j, and −1−j. Rotation of the coefficients is the key to simplification of the FCT.

Additional simplification is achieved by realizing that some intermediate results are the negative of other intermediate results at the same stage.

B. Initial Complex Correlation

An initial complex correlation of complex CCK codewords with complex inputs can be achieved from equation 12:

$$y(n) = \sum_{k=0}^{7} c^*(k)x(n-k) \quad \text{(Eq. 12)}$$

where $$c(k) = c_I(k) + jc_Q(k)$$

and $$x(k) = x_I(k) + jx_Q(k).$$

Expanding out the complex product results in equation 13:

$$y(n) = \left[\sum_{k=0}^{7} c_I(k)x_I(n-k) + \sum_{k=0}^{7} c_Q(k)x_Q(n-k)\right] + j\left[\sum_{k=0}^{7} c_I(k)x_Q(n-k) - \sum_{k=0}^{7} c_Q(k)x_I(n-k)\right] \quad \text{(Eq. 13)}$$

Figure 11:
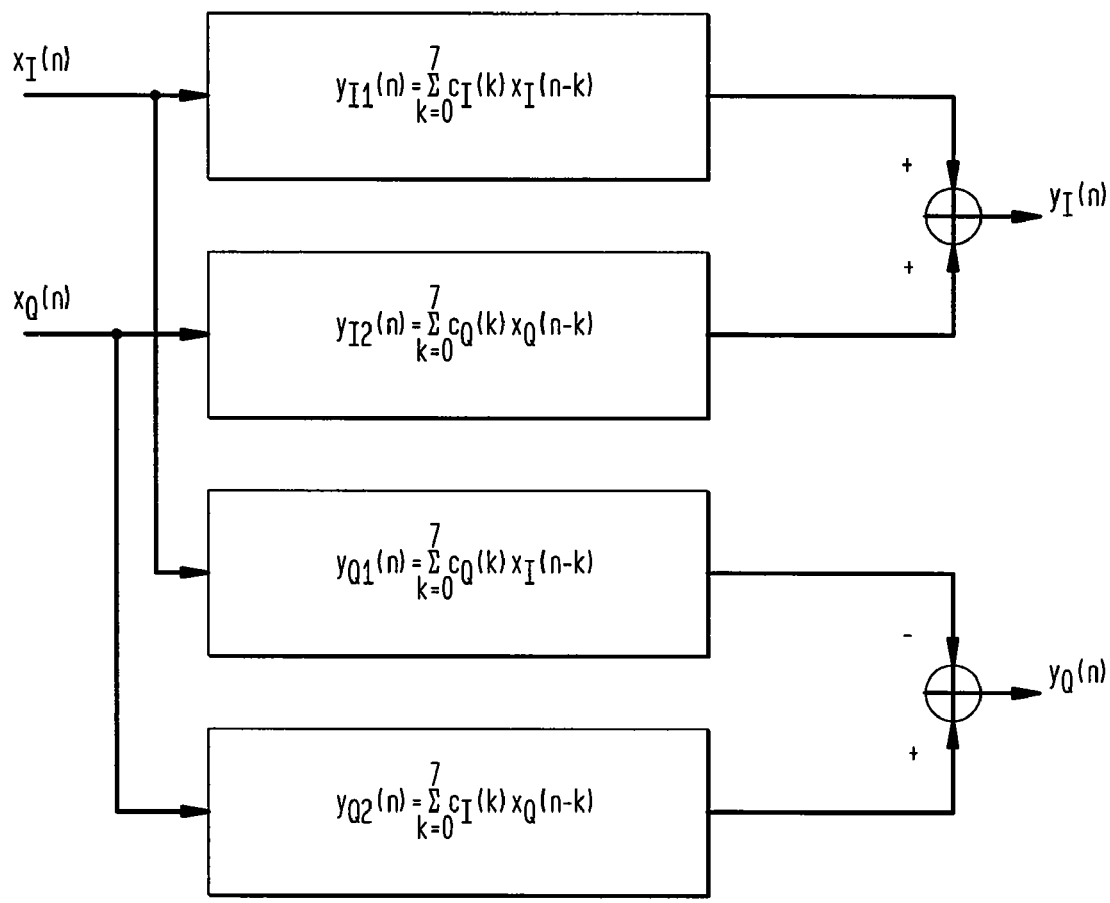
FIG. 11 is a block diagram of a complex correlation in accordance with equation 12.

FIG. 11 is a block diagram 1100 of the complex correlation of equation 12.

The resulting complex correlation of equation 12 includes four real correlates performed in parallel. Implementing the correlate equations of equation 12 results in 4×7+2=30 additions per codeword. For the 64 CCK codewords there are 64×30=1920 additions to implement all the required correlations. Since the real or imaginary part of each CCK complex coefficient is zero, the computation is reduced to 1920−(64×2×7)=1024.

C. Fast Correlator Transform (FCT)

Figure 12:
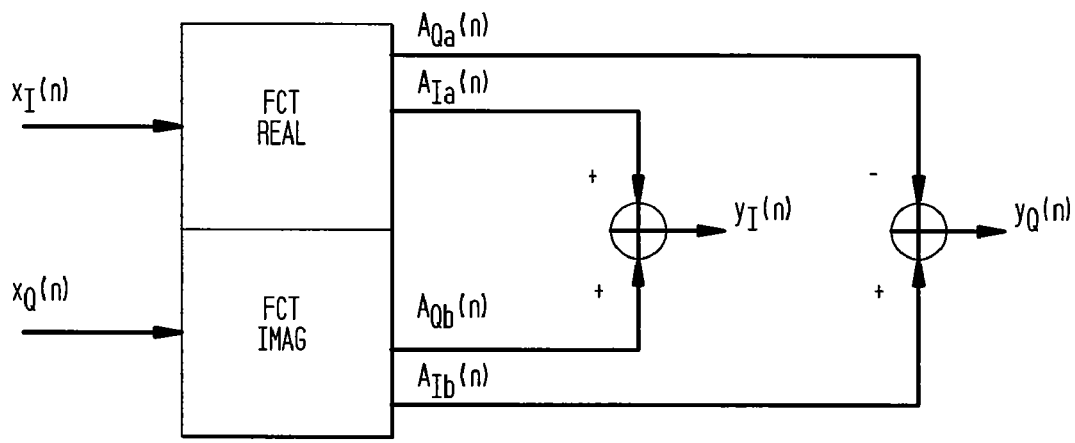
FIG. 12 is a block diagram of an example FCT 1200 in accordance with the present invention.
Figure 13:
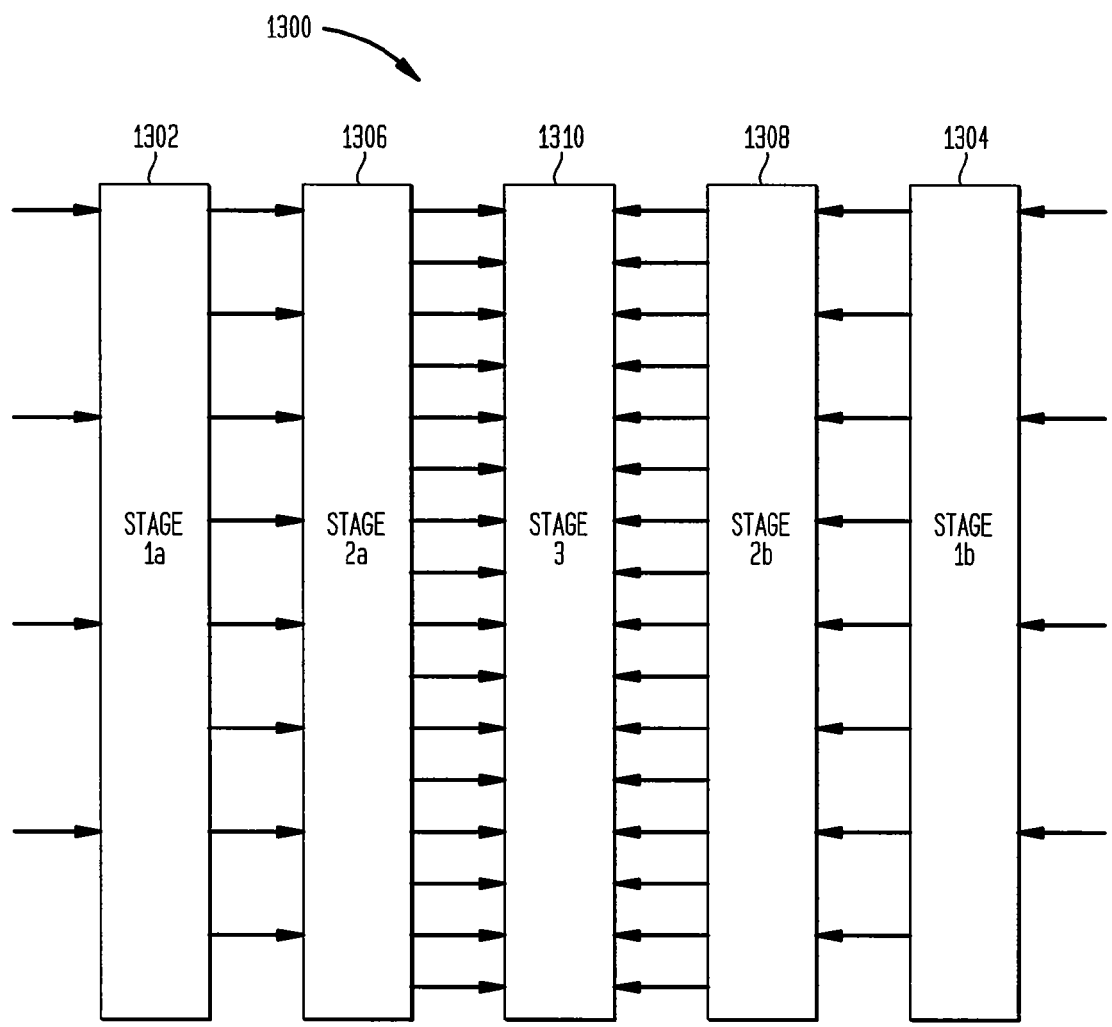
FIG. 13 is a block diagram of another example FCT 1300 in accordance with the present invention, including stages 1a, 1b, 2a, 2b, and 3.

A Fast Correlator Transform (FCT) can be used to reduce the computation by assuming the use of 45° rotated I, Q codewords shown in Table 6, below. To derive the 64 parallel correlates for all of the codewords, two substantially similar FCTs are preferred. One is for the real part of the input. The other is for the imaginary part of the input. FIG. 12 is a block diagram of an example FCT 1200. For a CCK with codeword size of 64 the FCT 1200 can be divided into several stages. For example, FIG. 13 illustrates a FCT 1300 that includes stages 1a (1302), 1b (1304), 2a (1306), 2b (1308), and 3 (1310), which are described below.

Figure 14:
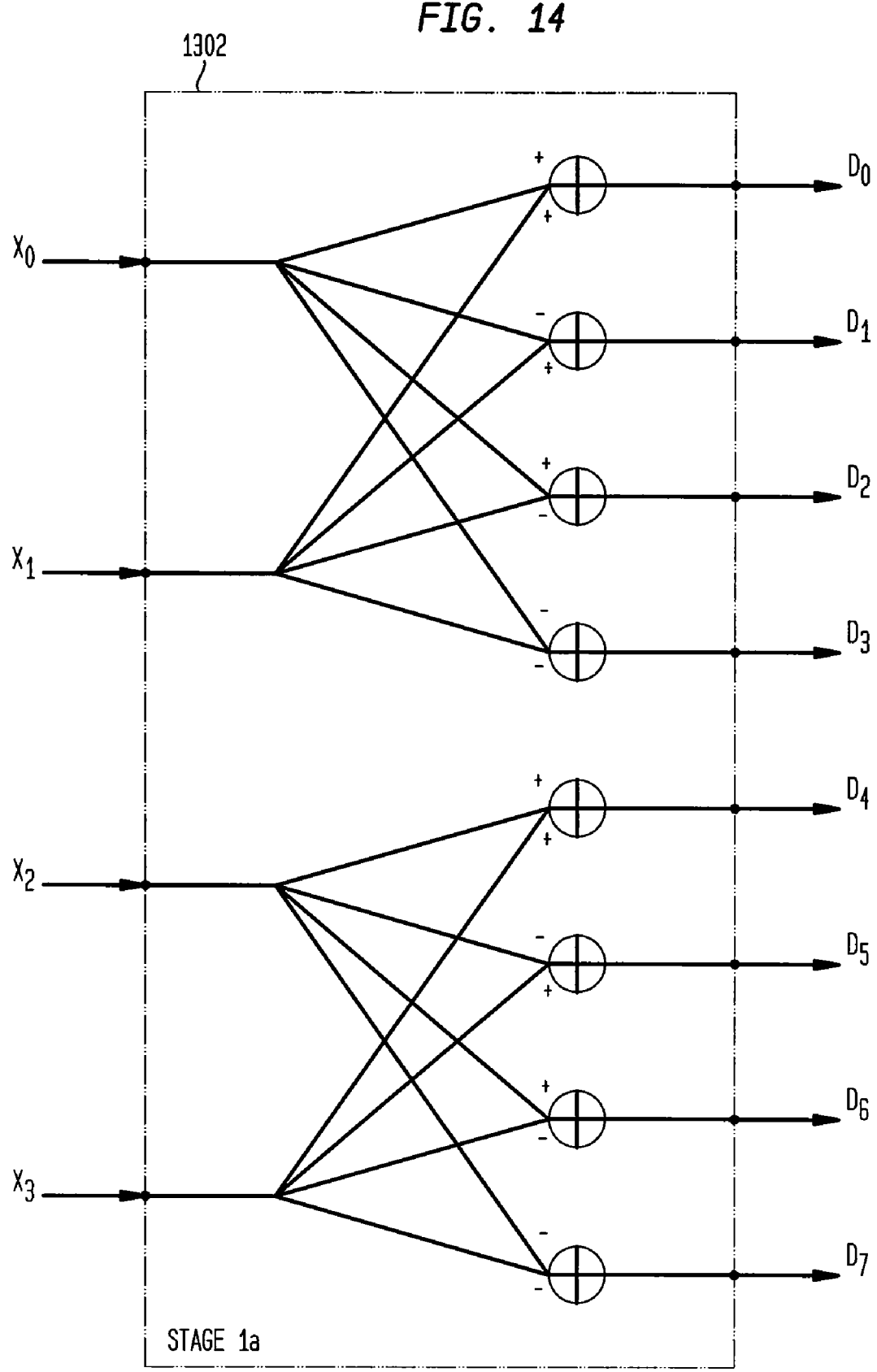
FIG. 14 is an example block diagram of stage 1a of the FCT 1300.

FIG. 14 is an example block diagram of stage 1a of the FCT 1300. In the example of FIG. 14, the stage 1a includes 2 additions and 6 subtractions, which implement the following:

$$D_0=x_0+x_1, D_1=-x_0+x_1, D_2=x_0-x_1, D_3=-x_0-x_1$$

$$D_4=x_2+x_3, D_5=-x_2+x_3, D_6=x_2-x_3, D_7=-x_2-x_3.$$

Figure 15:
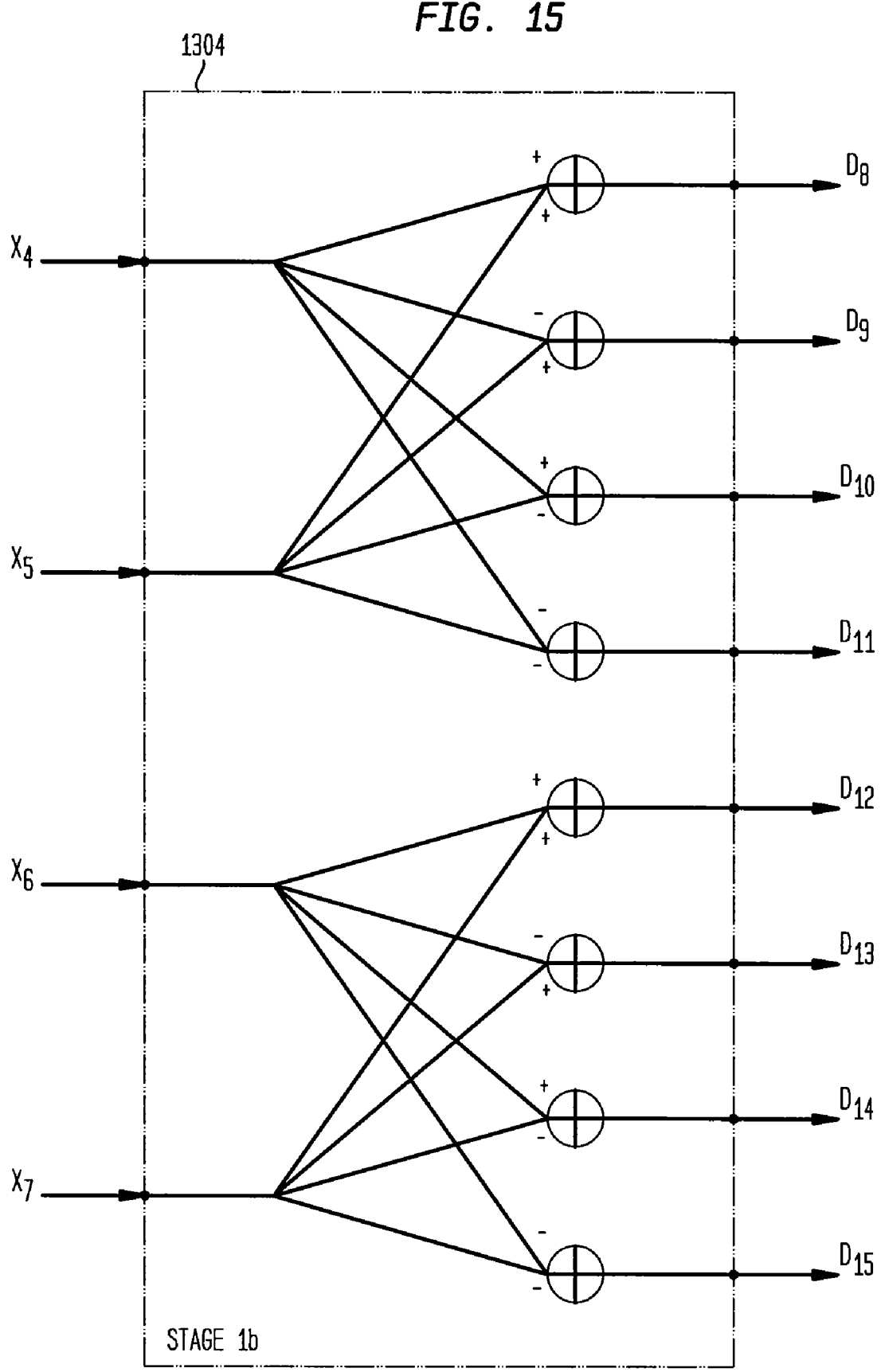
FIG. 15 is an example block diagram of stage 1b of the FCT 1300.

FIG. 15 is an example block diagram of stage 1b of the FCT 1300. In the example of FIG. 15, the stage 1b includes 8 additions and subtractions, which implement the following:

$$D_8=x_4+x_5, D_9=-x_4+x_5, D_{10}=x_4-x_5, D_{11}=-x_4-x_5$$

$$D_{12}=x_6+x_7, D_{13}=-x_6+x_7, D_{14}=x_6-x_7, D_5=-x_6-x_7.$$

Figure 16:
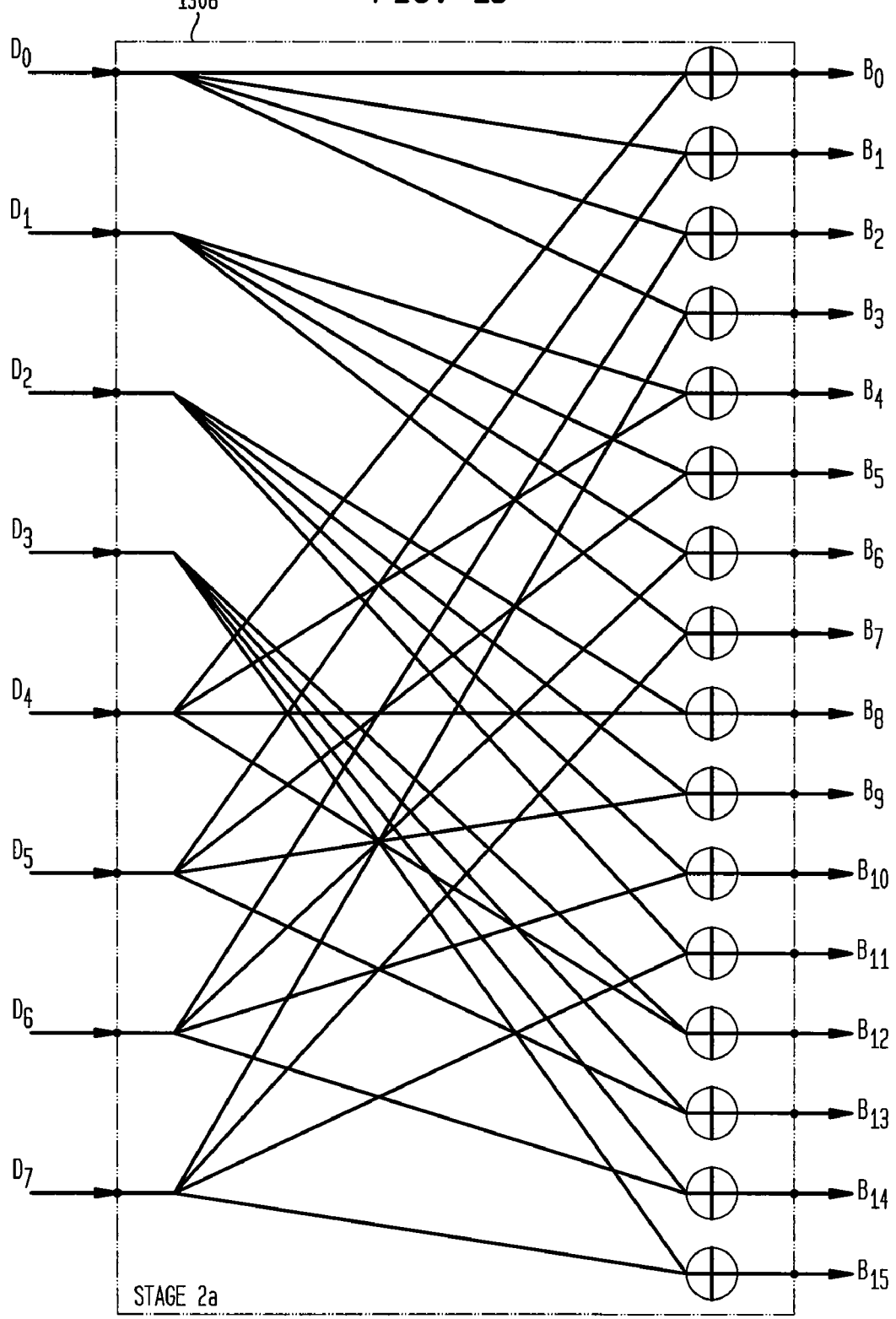
FIG. 16 is an example block diagram of stage 2a of the FCT 1300.

FIG. 16 is an example block diagram of stage 2a of the FCT 1300. In the example of FIG. 16, the stage 2a includes 16 additions, which implement the following:

$$B_0=D_0+D_4, B_1=D_0+D_5, B_2=D_0+D_6, B_3=D_0+D_7$$

$$B_4=D_1+D_4, B_5=D_1+D_5, B_6=D_1+D_6, B_7=D_1+D_7$$

$$B_8=D_2+D_4, B_9=D_2+D_5, B_{10}=D_2+D_6, B_{11}=D_2+D_7$$

$$B_{12}=D_3+D_4, B_{13}=D_3+D_5, B_{14}=D_3+D_6, B_{15}=D_3+D_7.$$

Figure 17:
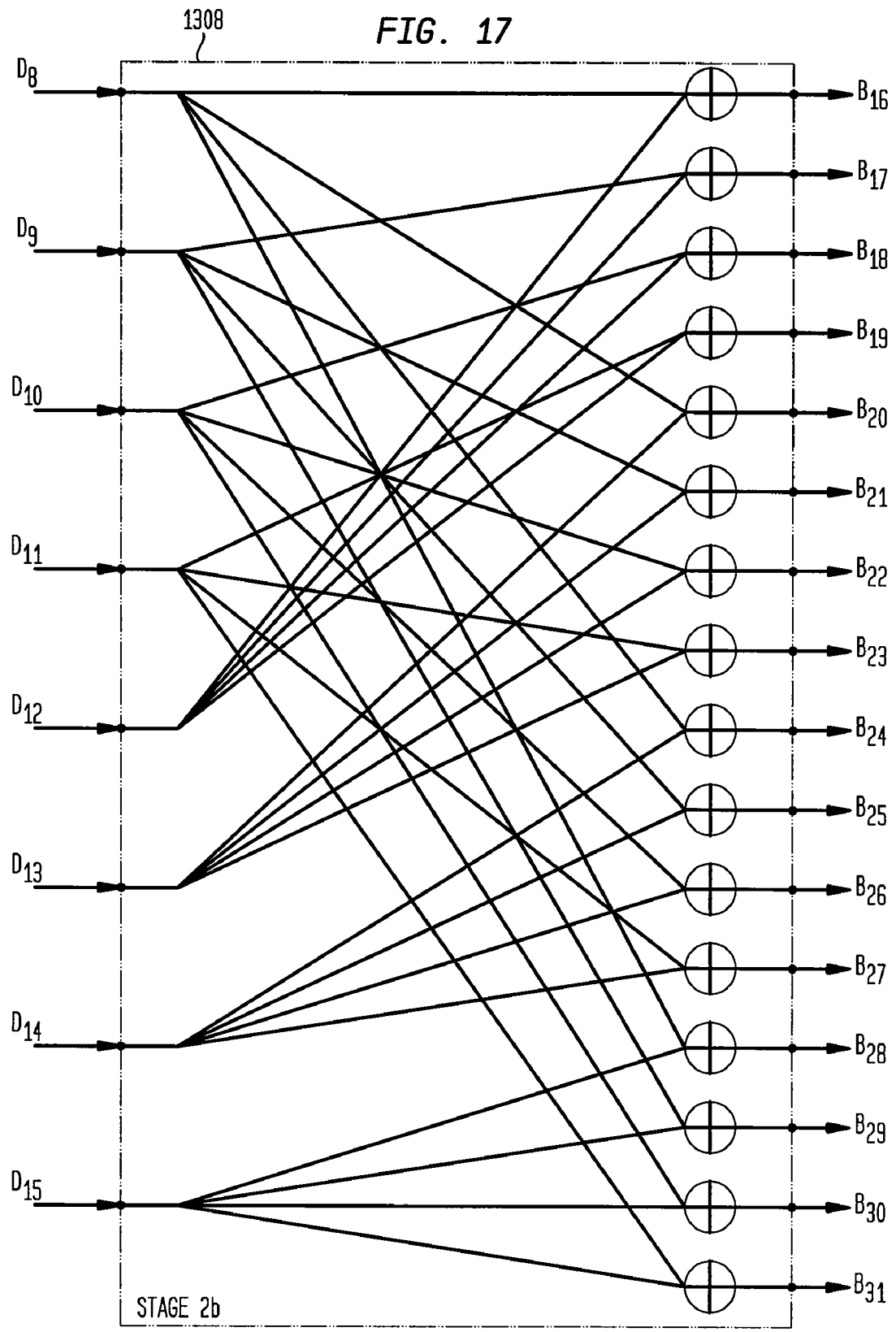
FIG. 17 is an example block diagram of stage 2b of the FCT 1300.

FIG. 17 is an example block diagram of stage 2b of the FCT 1300. In the example of FIG. 17, the stage 2b includes 16 additions, which implement the following:

$$B_{16} = D_8 + D_{12}, B_{17} = D_9 + D_{12}, B_{18} = D_{10} + D_{12},$$

$$B_{19} = D_{11} + D_{12}$$

$$B_{20} = D_8 + D_{13}, B_{21} = D_9 + D_{13}, B_{22} = D_{10} + D_{13},$$

$$B_{23} = D_{11} + D_{13}$$

$$B_{24} = D_8 + D_{14}, B_{25} = D_9 + D_{14}, B_{26} = D_{10} + D_{14},$$

$$B_{27} = D_{11} + D_{14}$$

$$B_{28} = D_8 + D_{15}, B_{29} = D_9 + D_{15}, B_{30} = D_{10} + D_{15},$$

$$B_{31} = D_{11} + D_{15}$$

Stage 3 of the FCT 1300 includes 64 additions for the I values and 64 additions for the Q values, as follows:

$$I_0=B_2+B_{20}, I_1=B_{13}+B_{20}, I_2=B_{13}+B_{20}, I_3=B_2+B_{20}$$

$$Q_0=B_2+B_{20}, Q_1=B_2+B_{20}, Q_2=B_{13}+B_{20}, Q_3=B_{13}+B_{20}$$

$$I_4=B_{14}+B_{23}, I_5=B_{13}+B_{23}, I_6=B_1+B_{23}, I_7=B_2+B_{23}$$

$$I_4=B_{14}+B_{23}, I_5=B_{13}+B_{23}, I_6=B_1+B_{23}, I_7=B_2+B_{23}$$

$$Q_4=B_2+B_{20}, Q_5=B_{14}+B_{20}, Q_6=B_{13}+B_{20}, Q_7=B_1+B_{20}$$

$$I_8=B_{14}+B_{23}, I_9=B_1+B_{23}, I_{10}=B_1+B_{23}, I_{11}=B_{14}+B_{23}$$

$$Q_8=B_{14}+B_{23}, Q_9=B_{14}+B_{23}, Q_{10}=B_1+B_{23}, Q_{11}=B_1+B_{23}$$

$$I_{12}=B_2+B_{20}, I_{13}=B_1+B_{20}, I_{14}=B_{13}+B_{20}, I_{15}=B_{14}+B_{20}$$

$$Q_{12}=B_{14}+B_{23}, Q_{13}=B_2+B_{23}, Q_{14}=B_1+B_{23}, Q_{15}=B_{13}+B_{23}$$

$$I_{16}=B_7+B_{17}, I_{17}=B_{13}+B_{17}, I_{18}=B_8+B_{17}, I_{19}=B_2+B_{17}$$

$$Q_{16}=B_2+B_{20}, Q_{17}=B_7+B_{20}, Q_{18}=B_{13}+B_{20}, Q_{19}=B_8+B_{20}$$

$$I_{20}=B_{15}+B_{19}, I_{21}=B_9+B_{19}, I_{22}=B_0+B_{19}, I_{23}=B_6+B_{19}$$

$$Q_{20}=B_6+B_{21}, Q_{21}=B_{15}+B_{21}, Q_{22}=B_9+B_{21}, Q_{23}=B_0+B_{21}$$

$$I_{24}=B_{11}+B_{18}, I_{25}=B_1+B_{18}, I_{26}=B_4+B_{18}, I_{27}=B_{14}+B_{18}$$

$$Q_{24}=B_{14}+B_{23}, Q_{25}=B_{11}+B_{23}, Q_{26}=B_1+B_{23}, Q_{27}=B_4+B_{23}$$

$$I_{28}=B_3+B_{16}, I_{29}=B_5+B_{16}, I_{30}=B_{12}+B_{16}, I_{31}=B_{10}+B_{16}$$

$$Q_{28}=B_{10}+B_{22}, Q_{29}=B_3+B_{22}, Q_{30}=B_5+B_{22}, Q_{31}=B_{12}+B_{22}$$

$$I_{32}=B_7+B_{17}, I_{33}=B_8+B_{17}, I_{34}=B_8+B_{17}, I_{35}=B_7+B_{17}$$

$$Q_{32}=B_7+B_{17}, Q_{33}=B_7+B_{17}, Q_{34}=B_8+B_{17}, Q_{35}=B_8+B_{17}$$

$$I_{36}=B_{11}+B_{18}, I_{37}=B_8+B_{18}, I_{38}=B_4+B_{18}, I_{39}=B_7+B_{18}$$

$$Q_{36}=B_7+B_{17}, Q_{37}=B_{11}+B_{17}, Q_{38}=B_8+B_{17}, Q_{39}=B_4+B_{17}$$

$$I_{40}=B_{11}+B_{18}, I_{41}=B_4+B_{18}, I_{42}=B_4+B_{18}, I_{43}=B_{11}+B_{18}$$

$$Q_{40}=B_{11}+B_{18}, Q_{41}=B_{11}+B_{18}, Q_{42}=B_4+B_{18}, Q_{43}=B_4+B_{18}$$

$$I_{44}=B_7+B_{17}, I_{45}=B_4+B_{17}, I_{46}=B_{11}+B_{17}, I_{47}=B_{11}+B_{17}$$

$$Q_{44}=B_{11}+B_{18}, Q_{45}=B_7+B_{18}, Q_{46}=B_4+B_{18}, Q_{47}=B_8+B_{18}$$

$$I_{48}=B_2+B_{20}, I_{49}=B_8+B_{20}, I_{50}=B_{13}+B_{20}, I_{51}=B_7+B_{20}$$

$$Q_{48}=B_7+B_{17}, Q_{49}=B_2+B_{17}, Q_{50}=B_2+B_{17}, Q_{51}=B_{13}+B_{17}$$

$$I_{52}=B_{10}+B_{22}, I_{53}=B_{12}+B_{22}, I_{54}=B_5+B_{22}, I_{55}=B_3+B_{22}$$

$$Q_{52}=B_3+B_{16}, Q_{53}=B_{10}+B_{16}, Q_{54}=B_{12}+B_{16}, Q_{55}=B_5+B_{16}$$

$$I_{56}=B_{14}+B_{23}, I_{57}=B_4+B_{23}, I_{58}=B_1+B_{22}, I_{59}=B_{11}+B_{23}$$

$$Q_{56}=B_{11}+B_{18}, Q_{57}=B_{14}+B_{18}, Q_{58}=B_4+B_{18}, Q_{59}=B_1+B_{18}$$

$$I_{60}=B_6+B_{21}, I_{61}=B_0+B_{21}, I_{62}=B_9+B_{21}, I_{63}=B_{15}+B_{21}$$

$$Q_{60}=B_{15}+B_{19}, Q_{61}=B_6+B_{19}, Q_{62}=B_0+B_{19}, Q_{63}=B_9+B_{19}$$

Stage 3 can be optimized by noting that there are 40 distinct values for I and Q which are $$A_0=B_2+B_{20}, A_1=B_{13}+B_{20}, A_2=B_{14}+B_{23}, A_3=B_{13}+B_{23}$$

$$A_4=B_{14}+B_{20}, A_5=B_1+B_{23}, A_6=B_2+B_{23}, A_7=B_1+B_{20}$$

$$A_8=B_7+B_{17}, A_9=B_{13}+B_{17}, A_{10}=B_7+B_{20}, A_{11}=B_8+B_{17}$$

$$A_{12}=B_2+B_{17}, A_{13}=B_8+B_{20}, A_{14}=B_{15}+B_{19}, A_{15}=B_6+B_{21}$$

$$A_{16}=B_9+B_{19}, A_{17}=B_{15}+B_{19}, A_{18}=B_0+B_{19}, A_{19}=B_9+B_{21}$$

$$A_{20}=B_6+B_{19}, A_{21}=B_0+B_{21}, A_{22}=B_{11}+B_{18}, A_{23}=B_1+B_{18}$$

$$A_{24}=B_{11}+B_{23}, A_{25}=B_4+B_{18}, A_{26}=B_{14}+B_{18}, A_{27}=B_4+B_{23}$$

$$A_{28}=B_3+B_{16}, A_{29}=B_{10}+B_{22}, A_{30}=B_5+B_{16}, A_{31}=B_3+B_{22}$$

$$A_{32}=B_{12}+B_{16}, A_{33}=B_5+B_{22}, A_{34}=B_{10}+B_{16}, A_{35}=B_{12}+B_{22}$$

$$A_{36}=B_8+B_{18}, A_{37}=B_{11}+B_{17}, A_{38}=B_7+B_{18}, A_{39}=B_4+B_{17}.$$

Figure 18:
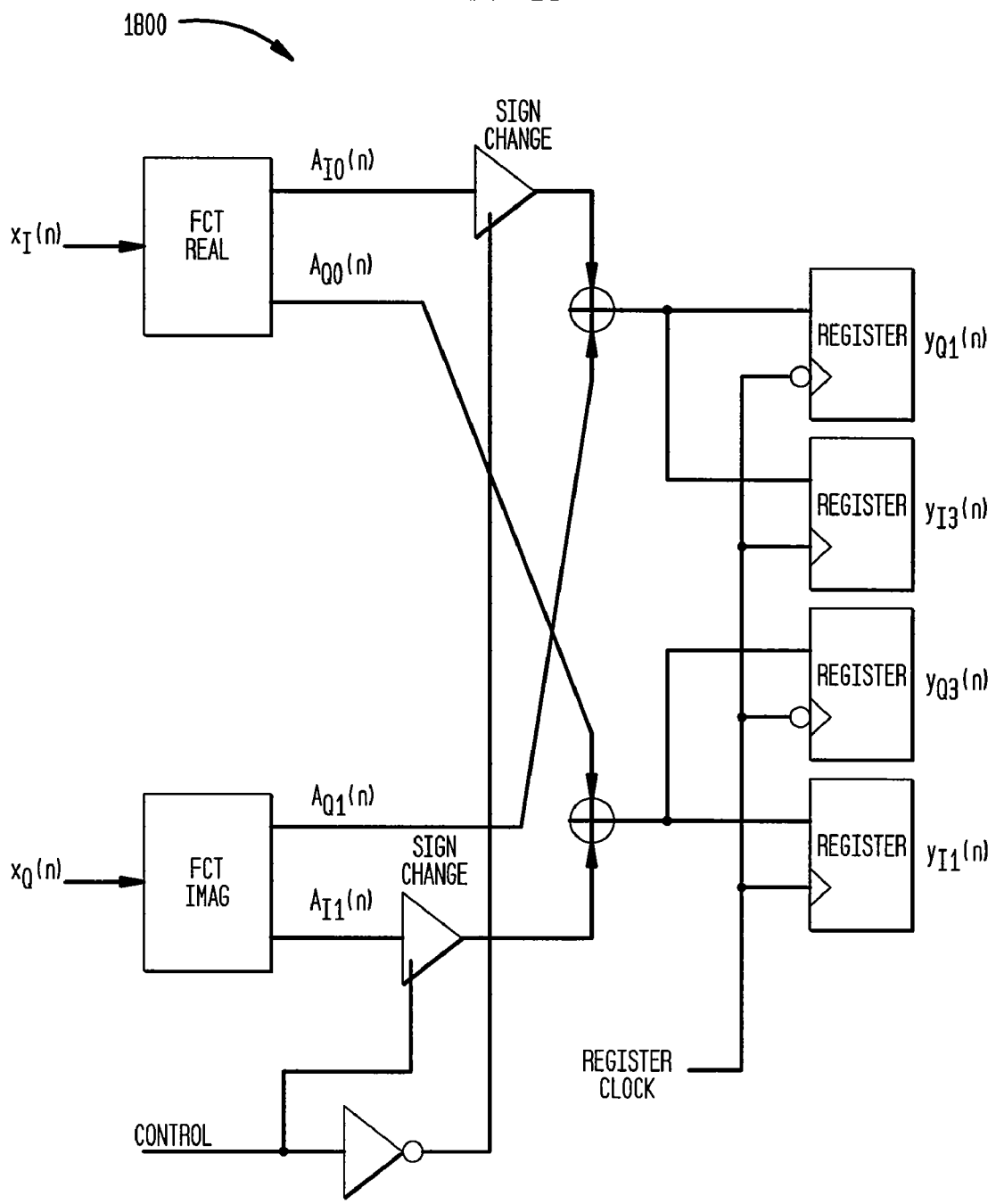
FIG. 18 is a block diagram of an example system 1800 that calculates $A_n$ values.

FIG. 18 is a block diagram of an example system 1800 that calculates the 40 $A_n$ values. The 40 $A_n$ values are used to calculate the final 64 output values and are described below.

Further optimization of the FCT 1300 can be achieved by considering the relationship:

$$B_n = -B_{15-n}, 8 \leq n \leq 15 \quad \text{(Eq. 14)}$$

The relationship of equation 14 eliminates the need to calculate the eight values of $B_n$ for $8 \leq n \leq 15$, and the intermediate results $D_2$ and $D_3$. Thus, 8+2=10 additions can be removed and be replaced by 10 negates of the samples, or subtraction instead of addition at the next processing stage.

Because $c_7$ is always 1, calculation of $B_{24} \ldots B_{31}$ can eliminate the following eight additions:

$$B_{24} = D_8 + D_{14}, B_{25} = D_9 + D_{14}, B_{26} = D_{10} + D_{14},$$

$$B_{27} = D_{11} + D_{14}$$

$$B_{28} = D_8 + D_{15}, B_{29} = D_9 + D_{15}, B_{30} = D_{10} + D_{15},$$

$$B_{31} = D_{11} + D_{15}$$

and, consequently, the following two additions:

$$D_{14}=x_6-x_7, D_{15}=-x_6-x_7,$$

Four more additions can be removed by considering that:

$$D_6=-D_5, D_7=-D_4, D_{10}=-D_9, D_{11}=-D_8$$

Figure 19:
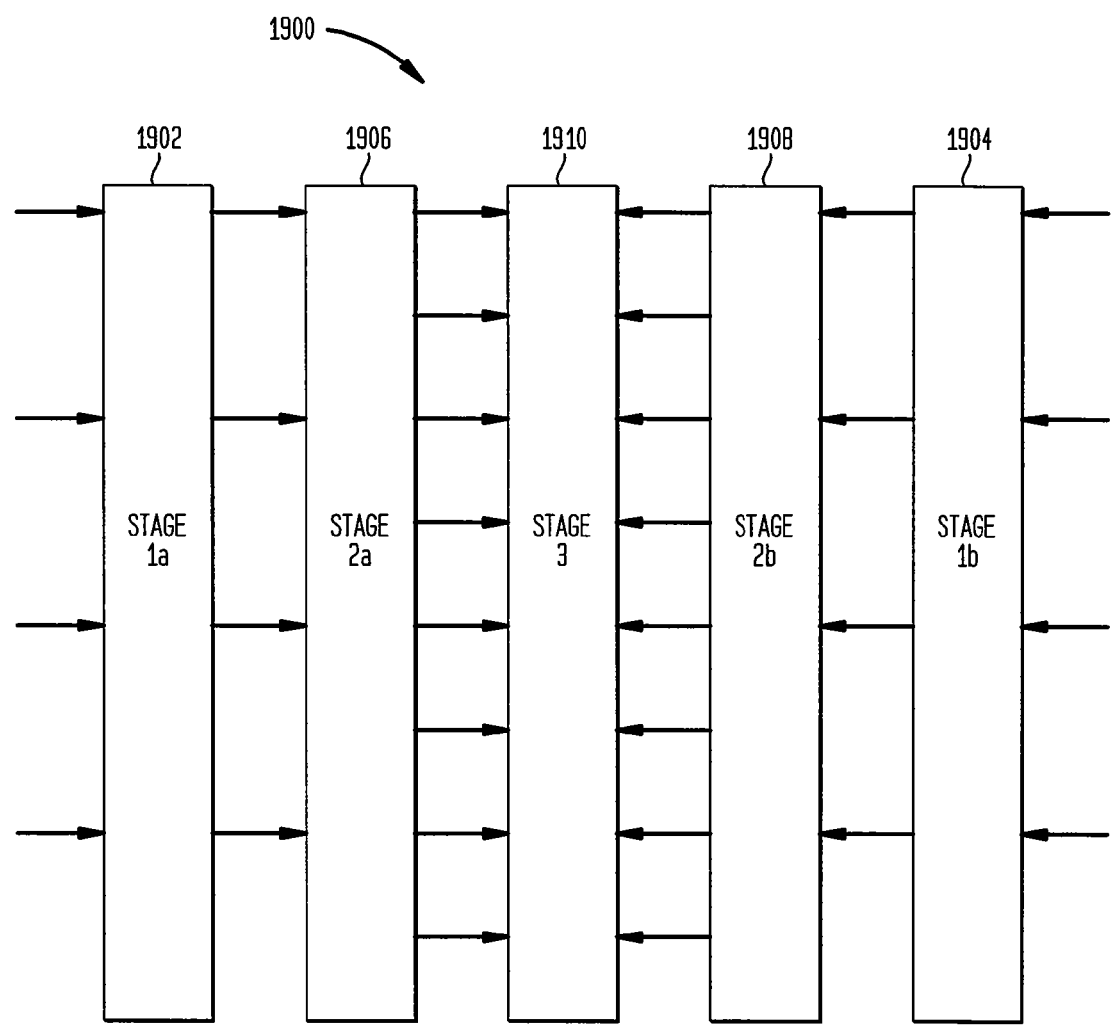
FIG. 19 is a block diagram of connection stages for an example simplified architecture FCT 1900, including stages 1a, 1b, 2a, 2c, and 3.

Table 6 shows the 64 correlate outputs as a function of $B_0 \ldots B_7$ and $B_{16} \ldots B_{23}$. Note that 40 distinct summations, or subtractions, are used to calculate the 128 results in the final stage. FIG. 19 is a block diagram of connection stages 1a, 1b, 2a, 2b, and 3 for an example simplified architecture FCT 1900. Note the reduction in states between stages from the FCT 1300 in FIG. 13 and the FCT 1900 in FIG. 19. The FCT 1900 includes stages 1a (1902), 1b (1904), 2a (1906), 2c (1908), and 3 (1910), which are described below.

Figure 20:
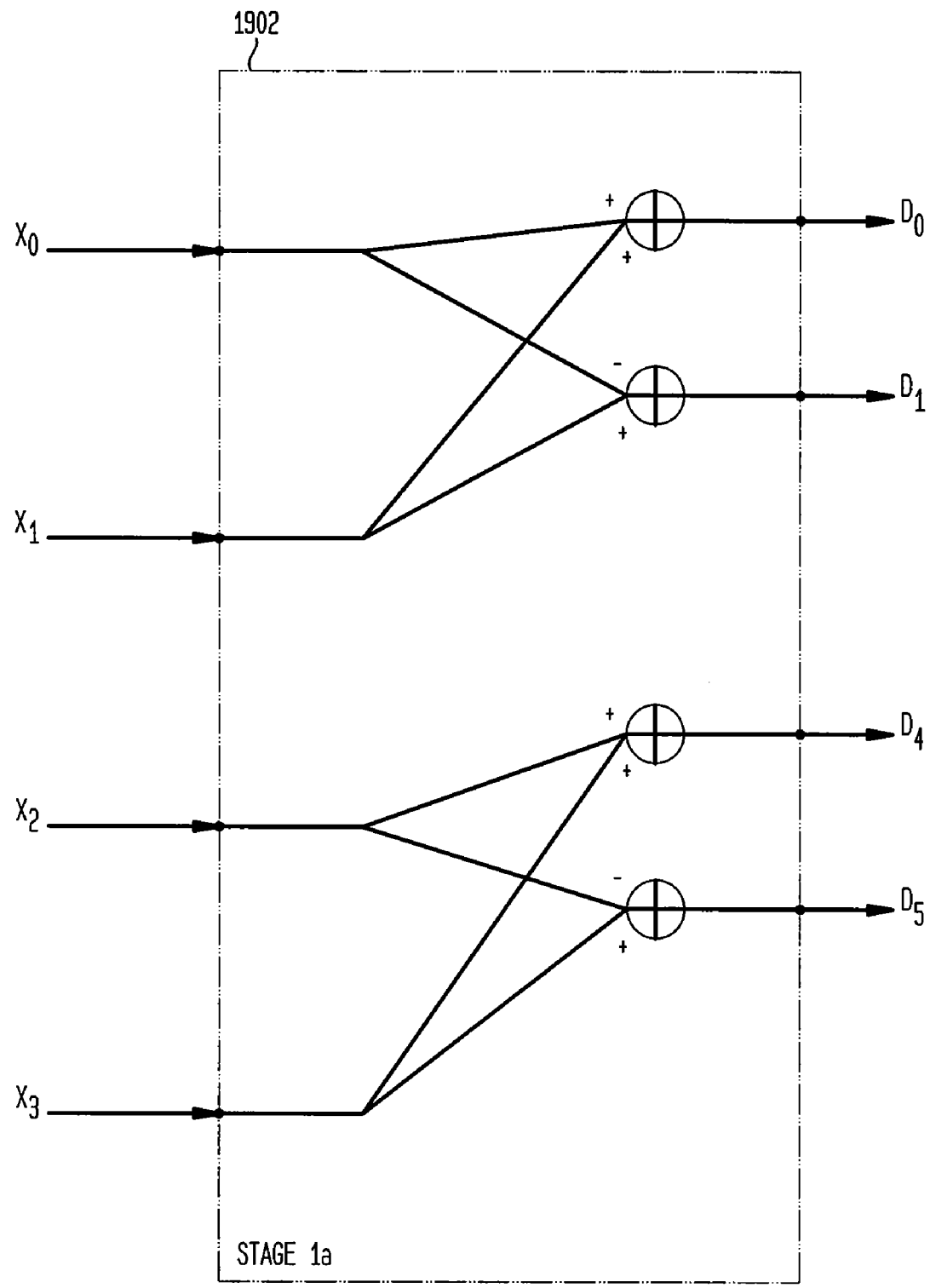
FIG. 20 is an example block diagram of stage 1a of the FCT 1900.

FIG. 20 is an example block diagram of the stage 1a of the FCT 1900. In the example of FIG. 20, stage 1a includes 4 additions and subtractions, which implement the following:

$$D_0=x_0+x_1, D_1=-x_0+x_1$$

$$D_4=x_2+x_3, D_5=-x_2+x_3$$

Figure 21:
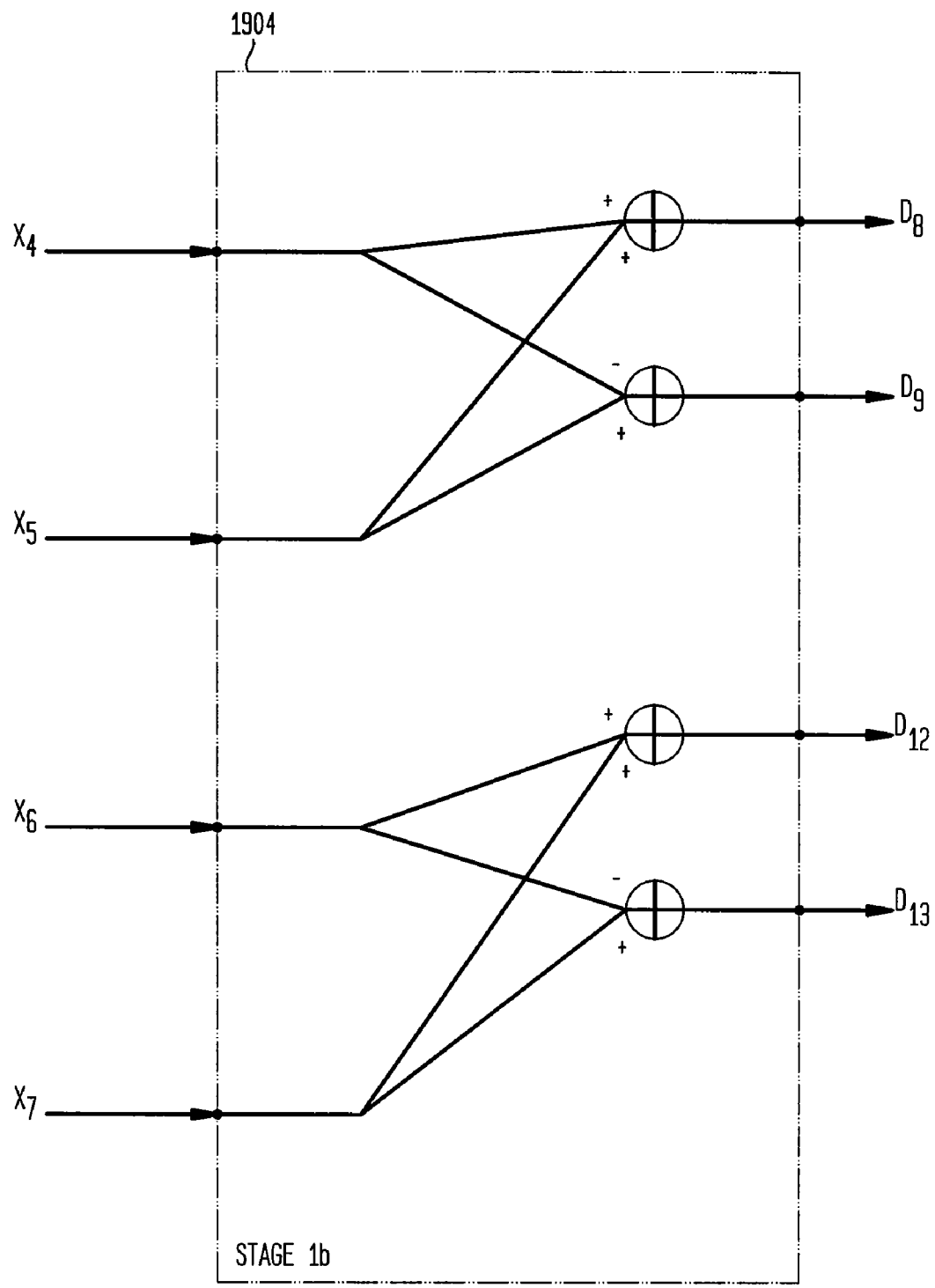
FIG. 21 is an example block diagram of stage 1b of the FCT 1900.

FIG. 21 is an example block diagram of the stage 1b of the FCT 1900. In the example of FIG. 21, stage 1b includes 4 additions or subtractions, which implement the following:

$$D_8=x_4+x_5, D_9=-x_4+x_5$$

$$D_{12}=x_6+x_7, D_{13}=-x_6+x_7$$

Figure 22:
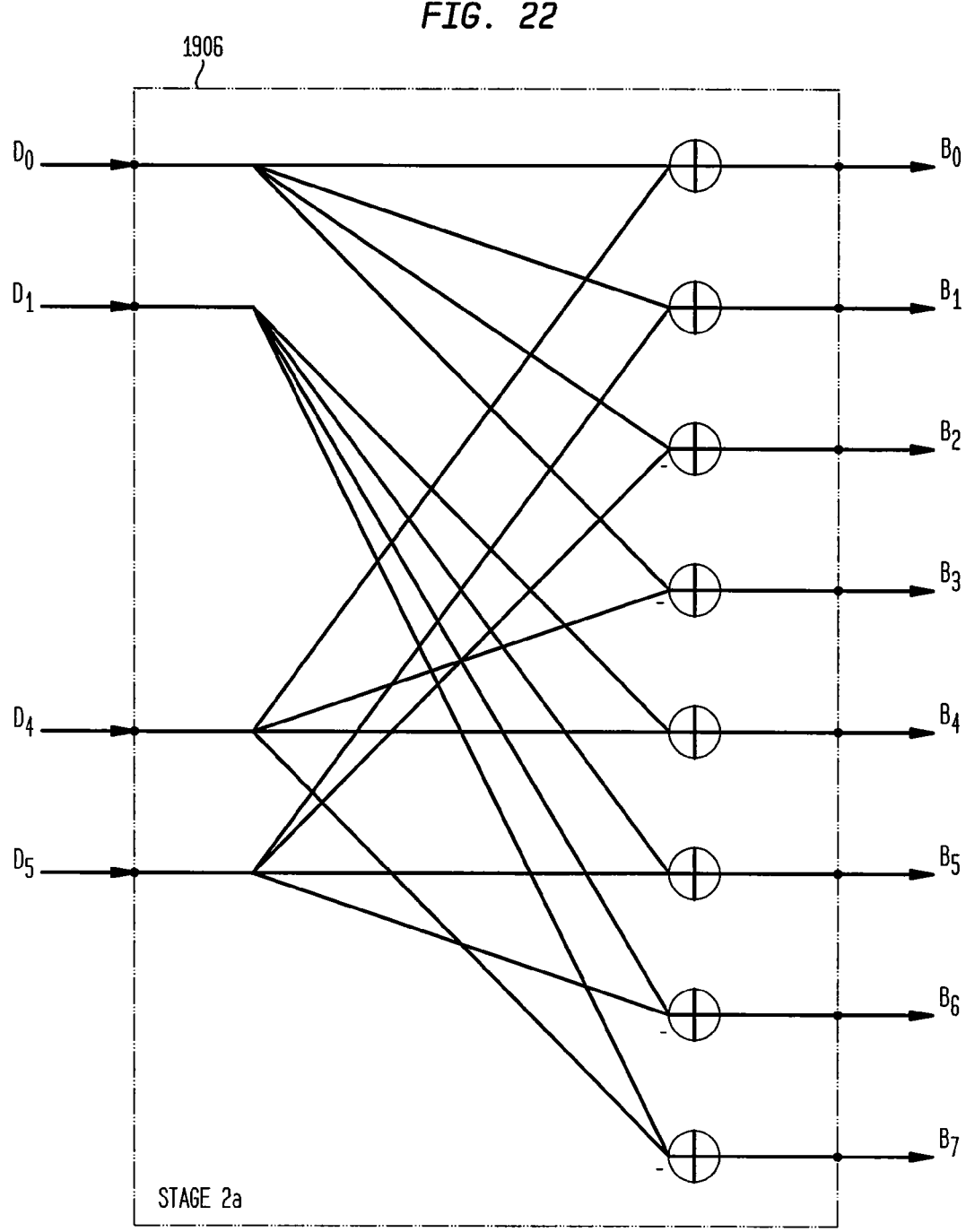
FIG. 22 is an example block diagram of stage 2a of the FCT 1900.

FIG. 22 is an example block diagram of stage 2a of the FCT 1900. In the example of FIG. 22, stage 2a includes 8 additions or subtractions, which implement the following:

$$B_0=D_0+D_4, B_1=D_0+D_5, B_2=D_0-D_5, B_3=D_0-D_4$$

$$B_4=D_1+D_4, B_5=D_1+D_5, B_6=D_1-D_5, B_7=D_1-D_4$$

FIG. 23 is an example block diagram of stage 2b of the FCT 1900. In the example of FIG. 23, stage 2b includes 8 additions, which implement the following:

$$B_{16} = D_8 + D_{12}, B_{17} = D_9 + D_{12}, B_{18} = -D_9 + D_{12},$$

$$B_{19} = -D_8 + D_{12}$$

$$B_{20} = D_8 + D_{13}, B_{21} = D_9 + D_{13}, B_{22} = -D_9 + D_{13},$$

$$B_{23} = -D_8 + D_{13}$$

Figure 24B:
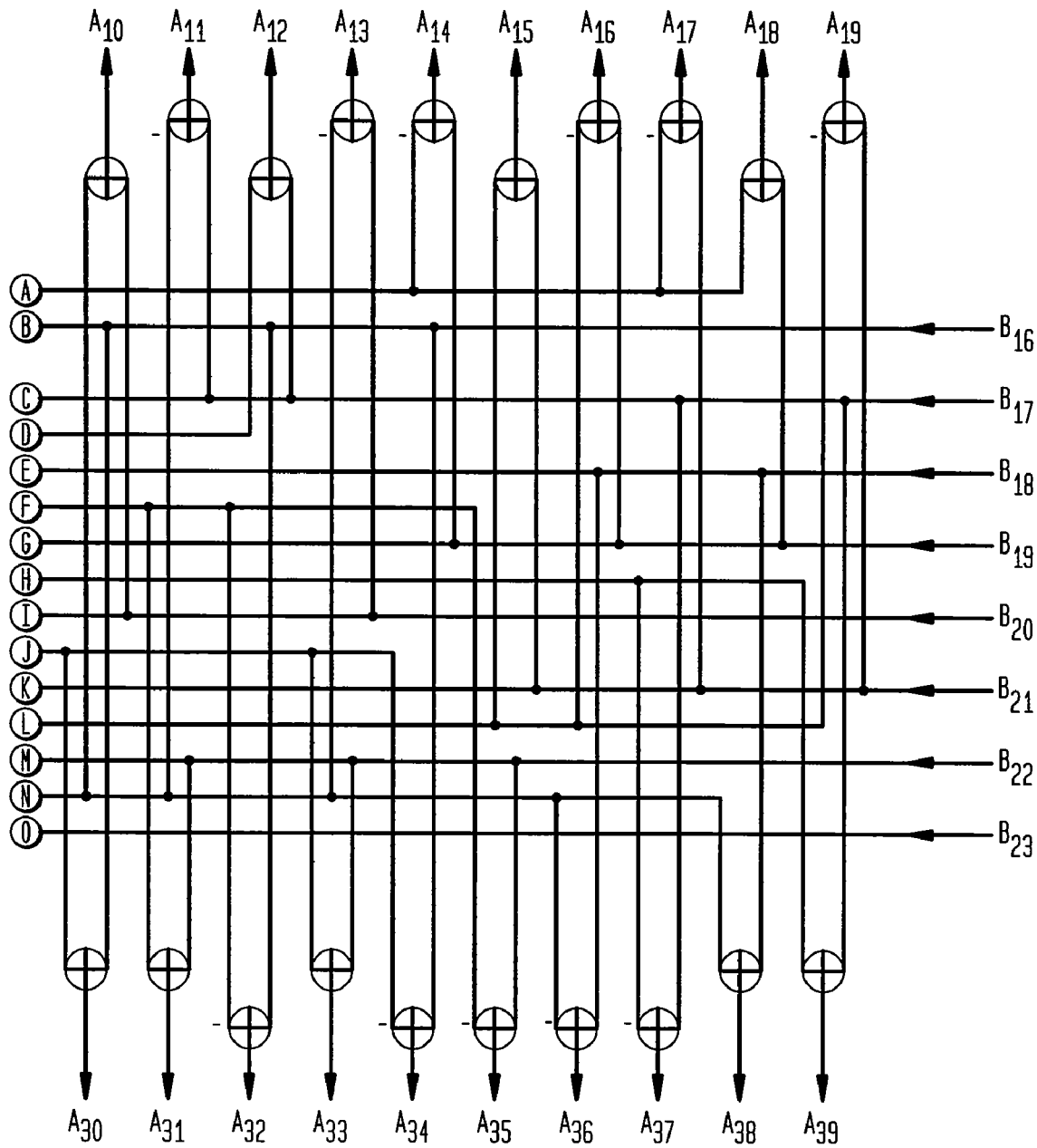

FIGS. 24A and 24B illustrate an example block diagram of stage 3 of the FCT 1900. In the example of FIGS. 24A and 24B, stage 3 includes 40 additions or subtractions, which implement the following:

$$A_0 = B_2 + B_{20}, A_1 = -B_2 + B_{20}, A_2 = -B_1 + B_{23},$$

$$A_3 = -B_2 + B_{23}$$

$$A_4 = -B_1 + B_{20}, A_5 = B_1 + B_{23}, A_6 = B_2 + B_{23}, A_7 = B_1 + B_{20}$$

$$A_8 = B_7 + B_{17}, A_9 = -B_2 + B_{17}, A_{10} = B_7 + B_{20},$$

$$A_{11} = -B_7 + B_{17}$$

$$A_{12} = B_2 + B_{17}, A_{13} = -B_7 + B_{20}, A_{14} = -B_0 + B_{19},$$

$$A_{15} = B_6 + B_{21}$$

$$A_{16} = -B_6 + B_{19}, A_{17} = -B_0 + B_{21}, A_{18} = B_0 + B_{19},$$

$$A_{19} = -B_6 + B_{21}$$

$$A_{20} = B_6 + B_{19}, A_{21} = B_0 + B_{21}, A_{22} = -B_4 + B_{18},$$

$$A_{23} = B_1 + B_{18}$$

$$A_{24} = -B_4 + B_{23}, A_{25} = B_4 + B_{18}, A_{26} = -B_1 + B_{18},$$

$$A_{27} = B_4 + B_{23}$$

$$A_{28} = B_3 + B_{16}, A_{29} = -B_5 + B_{22} A_{30} = B_5 + B_{16},$$

$$A_{31} = B_3 + B_{22}$$

$$A_{32} = -B_3 + B_{16}, A_{33} = B_5 + B_{22}, A_{34} = -B_5 + B_{16},$$

$$A_{35} = -B_3 + B_{22}$$

$$A_{36} = -B_7 + B_{18}, A_{37} = -B_4 + B_{17}, A_{38} = B_7 + B_{18},$$

$$A_{39} = B_4 + B_{17}$$

Final outputs are calculated using 128 additions or subtractions.

$Y_{I0} = A_{I0} + A_{Q0}, Y_{Q0} = A_{Q0} - A_{I0}, Y_{I1} = A_{I1} + A_{Q0},$ $Y_{Q1} = A_{Q1} - A_{I0}$ $Y_{I2} = A_{I1} + A_{Q1}, Y_{Q2} = A_{Q1} - A_{I1}, Y_{I3} = A_{I0} + A_{Q1},$ $Y_{Q3} = A_{Q0} - A_{I1}$ $Y_{I4} = A_{I2} + A_{Q0}, Y_{Q4} = A_{Q2} - A_{I0}, Y_{I5} = A_{I3} + A_{Q4},$ $Y_{Q5} = A_{Q3} - A_{I4}$ $Y_{I6} = A_{I5} + A_{Q1}, Y_{Q6} = A_{Q5} - A_{I1}, Y_{I7} = A_{I6} + A_{Q7},$ $Y_{Q7} = A_{Q6} - A_{I7}$ $Y_{I8} = A_{I2} + A_{Q2}, Y_{Q8} = A_{Q2} - A_{I2}, Y_{I9} = A_{I5} + A_{Q2},$ $Y_{Q9} = A_{Q5} - A_{I2}$ $Y_{I10} = A_{I5} + A_{Q5}, Y_{Q10} = A_{Q5} - A_{I5}, Y_{I11} = A_{I2} + A_{Q5},$ $Y_{Q11} = A_{Q2} - A_{I5}$ $Y_{I12} = A_{I0} + A_{Q2}, Y_{Q12} = A_{Q0} - A_{I2}, Y_{I13} = A_{I7} + A_{Q6},$ $Y_{Q13} = A_{Q7} - A_{I6}$ $Y_{I14} = A_{I1} + A_{Q5}, Y_{Q14} = A_{Q1} - A_{I5}, Y_{I15} = A_{I4} + A_{Q3},$ $Y_{Q15} = A_{Q4} - A_{I3}$ $Y_{I16} = A_{I8} + A_{Q0}, Y_{Q16} = A_{Q8} - A_{I0}, Y_{I17} = A_{I9} + A_{Q10},$ $Y_{Q17} = A_{Q9} - A_{I10}$ $Y_{I18} = A_{I11} + A_{Q1}, Y_{Q18} = A_{Q11} - A_{I1}, Y_{I19} = A_{I12} + A_{Q13},$ $Y_{Q19} = A_{Q12} - A_{I13}$ $Y_{I20} = A_{I14} + A_{Q15}, Y_{Q20} = A_{Q14} - A_{I15}, Y_{I21} = A_{I16} + A_{Q17},$ $Y_{Q21} = A_{Q16} - A_{I17}$ $Y_{I22} = A_{I18} + A_{Q19}, Y_{Q22} = A_{Q18} - A_{I19}, Y_{I23} = A_{I20} + A_{Q21},$ $Y_{Q23} = A_{Q20} - A_{I21}$ $Y_{I24} = A_{I22} + A_{Q2}, Y_{Q24} = A_{Q22} - A_{I2}, Y_{I25} = A_{I23} + A_{Q24},$ $Y_{Q25} = A_{Q23} - A_{I24}$ $Y_{I26} = A_{I25} + A_{Q5}, Y_{Q26} = A_{Q25} - A_{I5}, Y_{I27} = A_{I26} + A_{Q27},$ $Y_{Q27} = A_{Q26} - A_{I27}$ $Y_{I28} = A_{I28} + A_{Q29}, Y_{Q28} = A_{Q28} - A_{I29}, Y_{I29} = A_{I30} + A_{Q31},$ $Y_{Q29} = A_{Q30} - A_{I31}$ $Y_{I30} = A_{I32} + A_{Q33}, Y_{Q30} = A_{Q32} - A_{I33}, Y_{I31} = A_{I34} + A_{Q35},$ $Y_{Q31} = A_{Q43} - A_{I35}$ $Y_{I32} = A_{I8} + A_{Q8}, Y_{Q32} = A_{Q8} - A_{I8}, Y_{I33} = A_{I11} + A_{Q8},$ $Y_{Q33} = A_{Q11} - A_{I8}$ $Y_{I34} = A_{I11} + A_{Q11}, Y_{Q34} = A_{Q11} - A_{I11}, Y_{I35} = A_{I8} + A_{Q11},$ $Y_{Q35} = A_{Q8} - A_{I11}$ $Y_{I36} = A_{I22} + A_{Q8}, Y_{Q36} = A_{Q22} - A_{I8}, Y_{I37} = A_{I36} + A_{Q37},$ $Y_{Q37} = A_{Q36} - A_{I37}$ $Y_{I38} = A_{I25} + A_{Q11}, Y_{Q38} = A_{Q25} - A_{I11}, Y_{I39} = A_{I38} + A_{Q39},$ $Y_{Q39} = A_{Q38} - A_{I39}$ $Y_{I40} = A_{I22} + A_{Q22}, Y_{Q40} = A_{Q22} - A_{I22}, Y_{I41} = A_{I25} + A_{Q22},$ $Y_{Q41} = A_{Q25} - A_{I22}$ $Y_{I42} = A_{I25} + A_{Q25}, Y_{Q42} = A_{Q25} - A_{I25}, Y_{I43} = A_{I22} + A_{Q25},$ $Y_{Q43} = A_{Q22} - A_{I25}$ $Y_{I44} = A_{I8} + A_{Q22}, Y_{Q44} = A_{Q8} - A_{I22}, Y_{I45} = A_{I39} + A_{Q38},$ $Y_{Q45} = A_{Q39} - A_{I38}$ $Y_{I46} = A_{I11} + A_{Q25}, Y_{Q46} = A_{Q11} - A_{I25}, Y_{I47} = A_{I37} + A_{Q36},$ $Y_{Q47} = A_{Q37} - A_{I36}$ $Y_{I48} = A_{I0} + A_{Q8}, Y_{Q48} = A_{Q0} - A_{I8}, Y_{I49} = A_{I13} + A_{Q12},$ $Y_{Q49} = A_{Q13} - A_{I12}$ $Y_{I50} = A_{I1} + A_{Q11}, Y_{Q50} = A_{Q1} - A_{I11}, Y_{I51} = A_{I10} + A_{Q9},$ $Y_{Q51} = A_{Q10} - A_{I9}$ $Y_{I52} = A_{I29} + A_{Q28}, Y_{Q52} = A_{Q29} - A_{I28}, Y_{I53} = A_{I35} + A_{Q34},$ $Y_{Q53} = A_{Q35} - A_{I34}$ $Y_{I54} = A_{I33} + A_{Q32}, Y_{Q54} = A_{Q33} - A_{I32}, Y_{I55} = A_{I31} + A_{Q30},$ $Y_{Q55} = A_{Q31} - A_{I30}$ $Y_{I56} = A_{I2} + A_{Q22}, Y_{Q56} = A_{Q2} - A_{I22}, Y_{I57} = A_{I27} + A_{Q26},$ $Y_{Q57} = A_{Q27} - A_{I26}$ $Y_{I58} = A_{I5} + A_{Q25}, Y_{Q58} = A_{Q5} - A_{I25}, Y_{I59} = A_{I24} + A_{Q23},$ $Y_{Q59} = A_{Q24} - A_{I23}$ $Y_{I60} = A_{I15} + A_{Q14}, Y_{Q60} = A_{Q15} - A_{I14}, Y_{I61} = A_{I21} + A_{Q20},$ $Y_{Q61} = A_{Q21} - A_{I20}$ $Y_{I62} = A_{I19} + A_{Q18}, Y_{Q62} = A_{Q19} - A_{I18}, Y_{I63} = A_{I17} + A_{Q16},$ $Y_{Q63} = A_{Q17} - A_{I16}$

The number of adders in the final stage can be reduced by almost half from 128 to 72 by sharing adders. The adders are shared between codewords that are complex conjugates pairs as listed in Table 5. There are a total of 36 complex conjugate pairs where 8 of the codewords are complex conjugates of themselves (real coefficients). Consider, as an example, the pair of codeword 1 and codeword 3, from Table 5, with the following output equations:

$$Y_{I1} = A_{I1} + A_{Q0}, Y_{Q1} = A_{Q1} - A_{I0} \quad (\text{Eq. 15})$$

$$Y_{I3} = A_{I0} + A_{Q1}, Y_{Q3} = A_{Q0} - A_{I1} \quad (\text{Eq. 16})$$

The four additions, or subtractions, can be reduced to two additions by using the architecture shown in FIG. 18. A control signal sets the branches shown to opposite signs and the registers are loaded on opposite edges of the clock. Outputs include four output values stored in the four registers. This structure is repeated 36 times for each of the conjugate a, b codeword pairs in Table 5.

To summarize, the total number of complex additions, or subtractions, for the simplified parallel correlator 1900 are:

Stage #1=8

Stage #2=16

Stage #3=40+36=76

---------------------------

TOTAL=100

TABLE 5

Codeword Conjugate Pairs

| Codeword Index a | Codeword Index b |
|---|---|
| 0 | — |
| 1 | 3 |
| 2 | — |
| 4 | 12 |
| 5 | 15 |
| 6 | 14 |
| 7 | 13 |
| 8 | — |
| 9 | 11 |
| 10 | — |
| 16 | 48 |
| 17 | 51 |
| 18 | 50 |
| 19 | 49 |
| 20 | 60 |
| 21 | 63 |
| 22 | 62 |
| 23 | 61 |
| 24 | 56 |
| 25 | 59 |
| 26 | 58 |
| 27 | 57 |
| 28 | 52 |
| 29 | 55 |
| 30 | 54 |
| 31 | 53 |
| 32 | — |
| 33 | 35 |
| 34 | — |
| 36 | 44 |
| 37 | 47 |
| 38 | 46 |
| 39 | 45 |
| 40 | — |
| 41 | 43 |
| 42 | — |

D. FCT Based on CCK Code Properties

Another less complex embodiment can be derived by considering the equations for generating the CCK correlation output:

$$d = c_7 x_7 + c_6 x_6 + c_5 x_5 + c_4 x_4 + c_3 x_3 + c_2 x_2 + c_1 x_1 + c_0 x_0 \quad \text{(Eq. 16)}$$

where $c_7, c_6, c_5, c_4, c_3, c_2, c_1, c_0$ are the complex coefficients and $x_7, x_6, x_5, x_4, x_3, x_2, x_1, x_0$ are the complex input buffer samples. The codewords can be uniquely defined by the three coefficients, $c_6, c_5, c_3$, with the other coefficients defined by $$c_0 = c_6 c_5 c_3$$

$$c_1 = c_5 c_3$$

$$c_2 = c_6 c_3$$

$$c_4 = c_6 c_5$$

$$c_7 = 1$$

Thus, after substituting coefficient relationships and rearranging, the correlation output becomes:

$$d = x_7 + c_6 x_6 + c_5(x_5 - c_6 x_4) + c_3 \{x_3 + c_6 x_2 + c_5 [x_1 + c_6 x_0]\} \quad \text{(Eq. 17)}$$

For correlation with a single codeword, the resulting structure for equation 170 is shown in FIG. 25.

The FCT is derived from the single correlate by converting each coefficient branch, starting at the input, to a positive and negative branch. The resulting structure is shown in FIGS. 26 and 27.

Stage 1 consists of 4 additions or subtractions.

$$D_0 = x_0 + x_1, \; D_1 = -x_0 + x_1, \; D_2 = x_2, \; D_3 = x_3$$

$$D_4 = x_4 + x_5, \; D_5 = -x_4 + x_5, \; D_6 = x_6, \; D_7 = x_7$$

Stage 2 consists of 8 additions or subtractions.

$$E_0 = D_0 + D_2, \; E_1 = D_2 - D_0, \; E_2 = D_1 + D_2, \; E_3 = D_1 - D_2$$

$$E_4 = D_4 + D_6, \; E_5 = D_6 - D_4, \; E_6 = D_5 + D_6, \; E_7 = D_5 - D_6$$

Stage 3 consists of 16 additions or subtractions.

$$B_0 = E_0 + D_3, \; -B_3 = E_1 + D_3, \; -B_2 = -E_0 + D_3,$$

$$B_1 = -E_1 + D_3$$

$$B_4 = E_2 + D_3, \; B_5 = E_3 + D_3, \; -B_6 = -E_2 + D_3,$$

$$-B_7 = -E_3 + D_3$$

$$B_{16} = E_4 + D_7, \; B_{18} = E_5 + D_7, \; B_{23} = -E_4 + D_7,$$

$$B_{20} = -E_5 + D_7$$

$$B_{17} = E_6 + D_7, \; B_{21} = E_7 + D_7, \; B_{22} = -E_6 + D_7,$$

$$B_{18} = -E_7 + D_7$$

Stage 4 consists of 40 additions or subtractions.

$$A_0 = B_2 + B_{20}, \; A_1 = -B_2 + B_{20}, \; A_2 = -B_1 + B_{23},$$

$$A_3 = -B_2 + B_{23}$$

$$A_4 = -B_1 + B_{20}, \; A_5 = B_1 + B_{23}, \; A_6 = B_2 + B_{23}, \; A_7 = B_1 + B_{20}$$

$$A_8 = B_7 + B_{17}, \; A_9 = -B_2 + B_{17}, \; A_{10} = B_7 + B_{20},$$

$$A_{11} = -B_7 + B_{17}$$

$$A_{12} = B_2 + B_{17}, \; A_{13} = -B_7 + B_{20}, \; A_{14} = -B_0 + B_{19},$$

$$A_{15} = B_6 + B_{21}$$

$$A_{16} = -B_6 + B_{19}, \; A_{17} = -B_0 + B_{21}, \; A_{18} = B_0 + B_{19},$$

$$A_{19} = -B_6 + B_{21}$$

$$A_{20} = B_6 + B_{19}, \; A_{21} = B_0 + B_{21}, \; A_{22} = -B_4 + B_{18},$$

$$A_{23} = B_1 + B_{18}$$

$$A_{24} = -B_4 + B_{23}, \; A_{25} = B_4 + B_{18}, \; A_{26} = -B_1 + B_{18},$$

$$A_{27} = B_4 + B_{23}$$

$$A_{28} = B_3 + B_{16}, \; A_{29} = -B_5 + B_{22} \; A_{30} = B_5 + B_{16},$$

$$A_{31} = B_3 + B_{22}$$

$$A_{32} = -B_3 + B_{16}, \; A_{33} = B_5 + B_{22}, \; A_{34} = -B_5 + B_{16},$$

$$A_{35} = -B_3 + B_{22}$$

$$A_{36} = -B_7 + B_{18}, \; A_{37} = -B_4 + B_{17}, \; A_{38} = B_7 + B_{18},$$

$$A_{39} = B_4 + B_{17}$$

TABLE 6

| Index | Bits | Complex Codeword | I, Q Codeword | I, Q Combo |
|---|---|---|---|---|
| 0 | 000000 | +1+1+1−1+1+1−1+1 | +1+1+1−1+1+1−1+1<br>+1+1+1−1+1+1−1+1 | B2+B20<br>B2+B20 |
| 1 | 000001 | +j+j+j−j+1+1−1+1 | −1−1−1+1+1+1−1+1<br>+1+1+1−1+1+1−1+1 | −B2+B20<br>B2+B20 |
| 2 | 000010 | −1−1−1+1+1+1−1+1 | −1−1−1+1+1+1−1+1<br>−1−1−1+1+1+1−1+1 | −B2+B20<br>−B2+B20 |
| 3 | 000011 | −j−j−j+j+1+1−1+1 | +1+1+1−1+1+1−1+1<br>−1−1−1+1+1+1−1+1 | B2+B20<br>−B2+B20 |
| 4 | 000100 | +j+j+1−1+j−j−1+1 | −1−1−1−1−1−1−1+1<br>+1+1+1−1+1+1−1+1 | −B1+B23<br>B2+B20 |
| 5 | 000101 | −1−1+j−j+j−j−1+1 | −1−1+1−1−1−1−1+1<br>−1−1−1+1+1+1−1+1 | −B2+B23<br>−B1+B20 |
| 6 | 000110 | −j−j−1+1+j−j−1+1 | +1+1−1+1−1−1−1+1<br>−1−1−1+1+1+1−1+1 | B1+B23<br>−B2+B20 |
| 7 | 000111 | +1+1−j+j+j−j−1+1 | +1+1−1−1−1−1−1+1<br>+1+1+1−1+1+1−1+1 | B2+B23<br>B1+B20 |
| 8 | 001000 | −1−1+1−1−1−1−1+1 | −1−1+1−1−1−1−1+1<br>−1−1+1−1−1−1−1+1 | −B1+B23<br>−B1+B23 |
| 9 | 001001 | −j−j+j−j−1−1−1+1 | +1+1−1+1−1−1−1+1<br>−1−1+1−1−1−1−1+1 | B1+B23<br>−B1+B23 |
| 10 | 001010 | +1+1−1+1−1−1−1+1 | +1+1−1+1−1−1−1+1<br>+1+1−1+1−1−1−1+1 | B1+B23<br>B1+B23 |
| 11 | 001011 | +j+j−j+j−1−1−1+1 | −1−1+1−1−1−1−1+1<br>+1+1−1+1−1−1−1+1 | −B1+B23<br>B1+B23 |
| 12 | 001100 | −j−j+1−1−j−j−1+1 | +1+1+1−1+1+1−1+1<br>−1−1+1−1−1−1−1+1 | B2+B20<br>−B1+B23 |
| 13 | 001101 | +1+1+j−j−j−j−1+1 | +1+1−1−1+1+1−1+1<br>+1+1−1+1−1−1−1+1 | B1+B20<br>B2+B23 |
| 14 | 001110 | +j+j−1+1−j−j−1+1 | −1−1+1+1+1+1−1+1<br>+1+1−1+1−1−1−1+1 | −B2+B20<br>B1+B23 |
| 15 | 001111 | −1−1−j+j−j−j−1+1 | −1−1−1+1+1+1−1+1<br>−1−1+1−1−1−1−1+1 | −B1+B20<br>−B2+B23 |
| 16 | 010000 | +j+1−j−1+j+1−j+1 | −1−1−1−1−1+1+1+1<br>+1+1+1−1+1+1−1+1 | B7+B17<br>B2+B20 |
| 17 | 010001 | −1+j−1−j+j+1−j+1 | −1−1+1−1−1+1+1+1<br>−1−1−1−1−1+1+1+1 | −B2+B17<br>B7+B20 |
| 18 | 010010 | −j−1+j+1+j+1−j+1 | +1−1+1+1−1+1+1+1<br>−1−1−1−1−1+1+1+1 | −B7+B17<br>−B2+B20 |
| 19 | 010011 | +1−j+1+j+j+1−j+1 | +1+1+1−1−1+1+1+1<br>+1−1+1+1+1+1−1+1 | B2+B17<br>−B7+B20 |
| 20 | 010100 | −1+j+j−1−1−j−j+1 | −1−1−1−1−1−1−1+1<br>−1+1−1−1+1+1−1+1 | −B0+B19<br>B6+B21 |
| 21 | 010101 | −j−1−1−j+1+j−j+1 | +1−1+1−1−1+1+1+1<br>−1−1−1−1−1−1−1+1 | −B6+B19<br>−B0+B21 |
| 22 | 010110 | +1−j+j+1−1−j−j+1 | +1+1+1+1−1−1−1+1<br>+1−1+1−1+1+1−1+1 | B0+B19<br>−B6+B21 |
| 23 | 010111 | +j+1+1+j−1−j−j+1 | −1−1−1−1+1+1+1+1<br>+1+1+1+1+1+1−1+1 | B6+B19<br>B0+B21 |
| 24 | 011000 | −j−1+j−1−j−1−j+1 | +1−1−1+1+1+1+1+1<br>−1−1+1−1−1−1−1+1 | −B4+B18<br>−B1+B23 |
| 25 | 011001 | +1−j−1−j−j−1−j+1 | +1+1−1−1−1+1+1+1<br>−1−1−1−1−1−1−1+1 | B1+B18<br>−B4+B23 |
| 26 | 011010 | +j+1−j+1−j−1−j+1 | −1+1+1+1+1+1+1+1<br>+1+1−1+1−1−1−1+1 | B4+B18<br>B1+B23 |
| 27 | 011011 | −1+j+1+j−j−1−j+1 | −1−1+1−1−1+1+1+1<br>−1+1+1+1−1−1−1+1 | −B1+B18<br>B4+B23 |
| 28 | 011100 | +1−j+j−1+1−j−j+1 | +1+1−1−1+1+1−1+1<br>+1−1+1−1−1−1−1+1 | B3+B16<br>−B5+B22 |
| 29 | 011101 | +j+1−1−j+1−j−j+1 | −1−1−1−1+1+1+1+1<br>+1−1−1−1−1−1−1+1 | B5+B16<br>B3+B22 |
| 30 | 011110 | −1+j−j+1+1−j−j+1 | −1−1+1+1+1+1+1+1<br>−1+1−1−1−1−1−1+1 | −B3+B16<br>B5+B22 |
| 31 | 011111 | −j−1+1+j+1−j−j+1 | +1−1−1+1+1+1+1+1<br>−1−1+1+1+1−1−1+1 | −B5+B16<br>−B3+B22 |
| 32 | 100000 | −1+1−1−1−1+1+1+1 | −1+1−1−1−1+1+1+1<br>−1+1−1−1−1+1+1+1 | B7+B17<br>B7+B17 |
| 33 | 100001 | −j+j−j−j−1+1+1+1 | +1−1+1+1−1+1+1+1<br>−1+1−1−1−1+1+1+1 | −B7+B17<br>B7+B17 |
| 34 | 100010 | +1−1+1+1−1+1+1+1 | +1−1+1+1−1+1+1+1<br>+1−1+1+1−1+1+1+1 | −B7+B17<br>−B7+B17 |
| 35 | 100011 | +j−j+j+j−1+1+1+1 | −1+1−1−1−1+1+1+1<br>+1−1+1+1−1+1+1+1 | B7+B17<br>−B7+B17 |
| 36 | 100100 | −j+j−1−1−j+j+1+1 | +1−1−1−1+1+1+1+1<br>−1+1−1−1−1+1+1+1 | −B4+B18<br>B7+B17 |
| 37 | 100101 | +1−1−j−j−j+j+1+1 | +1+1+1+1−1+1+1+1<br>+1−1−1−1+1+1+1+1 | −B7+B18<br>−B4+B17 |

TABLE 6-continued

| Index | Bits | Complex Codeword | I, Q Codeword | I, Q Combo |
|---|---|---|---|---|
| 38 | 100110 | +j−j+1+1−j+j+1+1 | −1+1+1+1−1+1+1 | B4+B18 |
|   |   |   | +1−1+1+1−1+1+1+1 | −B7+B17 |
| 39 | 100111 | −1+1+j+j−j+j+1+1 | −1+1−1−1+1−1+1+1 | B7+B18 |
|   |   |   | −1+1+1+1−1+1+1+1 | B4+B17 |
| 40 | 101000 | +1−1−1−1+1−1+1+1 | +1−1−1−1+1−1+1+1 | −B4+B18 |
|   |   |   | +1−1−1−1+1−1+1+1 | −B4+B18 |
| 41 | 101001 | +j−j−j−j+1−1+1+1 | −1+1+1+1+1−1+1+1 | B4+B18 |
|   |   |   | +1−1−1−1+1−1+1+1 | −B4+B18 |
| 42 | 101010 | −1+1+1+1+1−1+1+1 | −1+1+1+1+1−1+1+1 | B4+B18 |
|   |   |   | −1+1+1+1+1−1+1+1 | B4+B18 |
| 43 | 101011 | −j+j+j+j+1−1+1+1 | +1−1−1−1+1−1+1+1 | −B4+B18 |
|   |   |   | −1+1+1+1+1−1+1+1 | B4+B18 |
| 44 | 101100 | +j−j−1−1+j−j+1+1 | −1+1−1−1−1+1+1+1 | B7+B17 |
|   |   |   | +1−1−1−1+1−1+1+1 | −B4+B18 |
| 45 | 101101 | −1+1−j−j−j−j+1+1 | −1+1+1+1−1+1+1+1 | B4+B17 |
|   |   |   | −1+1−1−1−1+1+1+1 | B7+B18 |
| 46 | 101110 | −j+j+1+1+j−j+1+1 | +1−1+1+1−1+1+1+1 | −B7+B17 |
|   |   |   | −1+1+1+1−1+1+1+1 | B4+B18 |
| 47 | 101111 | +1−1+j+j−j+j+1+1 | +1−1−1−1+1−1+1+1 | −B4+B17 |
|   |   |   | +1−1+1+1−1+1+1+1 | −B7+B18 |
| 48 | 110000 | −j+1−j−1−j+1+j+1 | +1+1+1−1+1+1−1+1 | B2+B20 |
|   |   |   | −1−1−1−1−1−1−1+1 | B7+B17 |
| 49 | 110001 | +1+j+1−j−j+1+j+1 | +1−1+1+1+1+1−1+1 | −B7+B20 |
|   |   |   | +1+1+1−1+1−1−1+1 | B2+B17 |
| 50 | 110010 | +j−1+j+1−j+1+j+1 | −1−1+1+1+1+1−1+1 | −B2+B20 |
|   |   |   | +1+1−1−1+1−1−1+1 | −B7+B17 |
| 51 | 110011 | −1−j−1+j−j+1+j+1 | −1+1−1−1+1+1−1+1 | B7+B20 |
|   |   |   | −1−1−1−1+1−1−1+1 | −B2+B17 |
| 52 | 110100 | +1+j−j−1+1+j+j+1 | +1−1+1−1+1+1−1−1 | −B5+B22 |
|   |   |   | +1+1−1−1+1+1+1+1 | B3+B16 |
| 53 | 110101 | +j−1+1−j+1+j+j+1 | −1+1+1+1+1+1−1−1 | −B3+B22 |
|   |   |   | +1−1+1−1+1+1+1+1 | −B5+B16 |
| 54 | 110110 | −1−j+j+1+1+j+j+1 | −1+1−1+1+1+1−1−1 | B5+B22 |
|   |   |   | −1−1+1+1+1+1+1+1 | −B3+B16 |
| 55 | 110111 | −j+1−1+j+1+j+j+1 | +1+1−1−1+1+1−1−1 | B3+B22 |
|   |   |   | −1+1−1+1+1+1+1+1 | B5+B16 |
| 56 | 111000 | +j−1−j−1+j−1+j+1 | −1−1+1−1−1−1−1+1 | −B1+B23 |
|   |   |   | +1−1+1−1+1−1+1+1 | −B4+B18 |
| 57 | 111001 | −1−j+1−j+j−1+j+1 | −1+1+1+1−1−1−1+1 | B4+B23 |
|   |   |   | −1−1+1−1+1−1+1+1 | −B1+B18 |
| 58 | 111010 | −j+1+j+1+j−1+j+1 | +1−1−1+1−1−1−1+1 | B1+B23 |
|   |   |   | −1+1+1+1−1+1+1+1 | B4+B18 |
| 59 | 111011 | +1+j−1+j+j−1+j+1 | +1−1−1−1−1−1−1+1 | −B4+B23 |
|   |   |   | +1+1+1+1−1+1+1+1 | B1+B18 |
| 60 | 111100 | −1−j−j−1−1−j+j+1 | −1+1+1−1−1+1−1+1 | B6+B21 |
|   |   |   | −1−1−1−1−1+1+1+1 | −B0+B19 |
| 61 | 111101 | −j+1−1−j−1−j+j+1 | +1+1+1+1−1+1−1+1 | B0+B21 |
|   |   |   | −1+1−1−1−1+1+1+1 | B6+B19 |
| 62 | 111110 | +1+j+j+1−1−j+j+1 | +1−1−1+1−1+1−1+1 | −B6+B21 |
|   |   |   | +1+1+1+1−1+1+1+1 | B0+B19 |
| 63 | 111111 | +j−1+1−j−1−j+j+1 | −1−1−1−1+1−1+1+1 | −B0+B21 |
|   |   |   | +1−1−1+1−1+1+1+1 | −B6+B19 |

XI. Conclusion

While various embodiments of the present invention have been described above, it should be understood that they have been presented by way of example only, and not limitation. Other embodiments are possible and are covered by the invention.

What is claimed is:

1. A method for decoding, comprising:
   (a) receiving a transmitted encoded data word;
   (b) generating in-phase (I) and quadrature-phase (Q) components of the transmitted encoded data word based on the transmitted encoded data word;
   (c) determining whether a phase shift occurred in the transmitted encoded data word;
   (d) independently applying a fast correlator transform (FCT) to each of the I and Q components of the transmitted encoded data word to generate I and Q correlation outputs;
   (e) combining the I and Q correlation outputs to generate a decoded data word.

2. The method of claim 1, wherein the transmitted encoded data word is encoded according to a Cyclic Code Keying (CCK) scheme.

3. The method of claim 1, wherein the transmitted encoded data word is encoded according to the IEEE 802.11 signaling scheme.

4. The method of claim 1, wherein step (b) comprises generating the I and Q components of the transmitted encoded data word based on a mapping of encoded input to I and Q encoded outputs according to an encoding scheme.

5. The method of claim 1, wherein the phase shift in the transmitted encoded data word is due to a differential encoding of the encoded data word.

6. The method of claim 1, wherein step (c) further comprises:

determining whether the I component of the transmitted encoded data word is inverted, thereby corresponding to a π/2 phase shift in the transmitted encoded data word; and determining whether the Q component of the transmitted encoded data word is inverted, thereby corresponding to a 3π/2 phase shift in the transmitted encoded data word.

7. The method of claim 6, further comprising:
swapping the I and Q components when a π/2 phase shift or a 3π/2 phase shift is determined in the transmitted encoded data word.

8. The method of claim 1, wherein step (d) further comprises:
generating a respective plurality of correlation outputs for each of the I and Q components;
selecting for each of the I and Q components a respective maximum correlation output value from its respective plurality of correlation outputs.

9. The method of claim 8, wherein the maximum correlation output value has an absolute value of 8.

10. The method of claim 8, wherein step (e) further comprises:
combining the respective I and Q maximum correlation output values to generate the decoded data word.

11. A decoder, comprising:
input circuitry to receive a transmitted encoded data word;
mapping circuitry to map the transmitted encoded data word to corresponding in-phase (I) and quadrature (Q) components of the transmitted encoded data word;
phase shift detection circuitry to determine whether a phase shift occurred in the transmitted encoded data word;
I and Q fast correlator transform (FCT) circuitry to independently perform FCT correlation on each of the I and Q components of the transmitted encoded data word and to generate I and Q correlation outputs;
adder circuitry to combine the I and Q correlation outputs and generate a decoded data word.

12. The decoder of claim 11, wherein the transmitted encoded data word is encoded according to a Cyclic Code Keying (CCK) scheme.

13. The decoder of claim 11, wherein the transmitted encoded data word is encoded according to the IEEE 802.11 signaling scheme.

14. The decoder of claim 11, wherein the mapping circuitry comprises a mapping of encoded input to I and Q encoded outputs according to an encoding scheme.

15. The decoder of claim 11, wherein the phase shift in the transmitted encoded data word is due to a differential encoding of the encoded data word.

16. The decoder of claim 11, wherein the phase detection circuitry further comprises:
inverted channel detection circuitry to determine whether the I component of the transmitted encoded data word is inverted, thereby corresponding to a π/2 phase shift in the transmitted encoded data word; and to determine whether the Q component of the transmitted encoded data word is inverted, thereby corresponding to a 3π/2 phase shift in the transmitted encoded data word.

17. The decoder of claim 16, further comprising:
circuitry to swap the I and Q components when a π/2 phase shift or a 3π/2 phase shift is determined in the transmitted encoded data word.

18. The decoder of claim 11, wherein the I and Q FCT circuitry:

circuitry to generate a respective plurality of correlation outputs for each of the I and Q components;
circuitry to select for each of the I and Q components a respective maximum correlation output value from its respective plurality of correlation outputs.

19. The decoder of claim 18, wherein the maximum correlation output value has an absolute value of 8.

20. The decoder of claim 18, wherein the adder circuitry combines the respective I and Q maximum correlation output values to generate the decoded data word.

21. An apparatus, comprising:
(a) means for receiving a transmitted encoded data word;
(b) means for generating in-phase (I) and quadrature-phase (Q) components of the transmitted encoded data word based on the transmitted encoded data word;
(c) means for determining whether a phase shift occurred in the transmitted encoded data word;
(d) means for independently applying a fast correlator transform (FCT) to each of the I and Q components of the transmitted encoded data word to generate I and Q correlation outputs;
(e) means for combining the I and Q correlation outputs to generate a decoded data word.

22. The apparatus of claim 21, wherein the transmitted encoded data word is encoded according to a Cyclic Code Keying (CCK) scheme.

23. The apparatus of claim 21, wherein the transmitted encoded data word is encoded according to the IEEE 802.11 signaling scheme.

24. The apparatus of claim 21, wherein said generating means comprises means for generating the I and Q components of the transmitted encoded data word based on a mapping of encoded input to I and Q encoded outputs of an encoding scheme.

25. The apparatus of claim 21, wherein the phase shift in the transmitted encoded data word is due to a differential encoding of the encoded data word.

26. The apparatus of claim 21, wherein said determining means further comprises:
means for determining whether the I component of the transmitted encoded data word is inverted, thereby corresponding to a π/2 phase shift in the transmitted encoded data word; and
means for determining whether the Q component of the transmitted encoded data word is inverted, thereby corresponding to a 3π/2 phase shift in the transmitted encoded data word.

27. The apparatus of claim 26, further comprising:
means for swapping the I and Q components when a π/2 phase shift or a 3π/2 phase shift is determined in the transmitted encoded data word.

28. The apparatus of claim 21, wherein said independently applying means further comprises:
means for generating a respective plurality of correlation outputs for each of the I and Q components;
means for selecting for each of the I and Q components a respective maximum correlation output value from its respective plurality of correlation outputs.

29. The apparatus of claim 28, wherein the maximum correlation output value has an absolute value of 8.

30. The apparatus of claim 28, wherein said combining means further comprises:
means for combining the respective I and Q maximum correlation output values to generate the decoded data word.

* * * * *